United States Patent [19]

McGuire et al.

[11] Patent Number: 4,497,027

[45] Date of Patent: Jan. 29, 1985

[54] METHOD AND APPARATUS FOR AUTOMATIC WARP PREVENTION OF CORRUGATED BOARD

[75] Inventors: Richard McGuire, Danbury, Conn.; Herbert M. Donhowe, Rogers, Ark.

[73] Assignees: Textrix Corporation, Danbury, Conn.; Corrugated Industry Development Corp., Milwaukee, Wis.

[21] Appl. No.: 388,468

[22] Filed: Jun. 14, 1982

[51] Int. Cl.³ .............................................. G06F 15/46

[52] U.S. Cl. .................................... 364/471; 364/568; 156/64

[58] Field of Search ............... 364/471, 568, 469, 470; 156/64; 162/254, 262; 162/263

[56] References Cited

U.S. PATENT DOCUMENTS

| | | | |
|---|---|---|---|
| 3,004,880 | 10/1961 | Lord | 156/64 |
| 3,562,500 | 2/1971 | Grant | 364/471 X |
| 3,711,688 | 1/1975 | Stout et al. | 364/471 |
| 3,930,934 | 1/1976 | Spitz | 364/471 X |
| 3,936,665 | 2/1976 | Donoghue | 364/563 X |
| 3,981,758 | 9/1976 | Thayer et al. | 156/64 |
| 4,284,445 | 8/1981 | Shimizu et al. | 156/64 |
| 4,314,878 | 2/1982 | Lee | 364/471 X |

*Primary Examiner*—Edward J. Wise
*Attorney, Agent, or Firm*—Mattern, Ware, Stoltz & Fressola

[57] ABSTRACT

A method and apparatus are disclosed for preventing warp in the manufacture of corrugated board formed from three webs; namely, a single face liner, a medium, and a double face liner. The method includes moisture measurements of the single-face liner and double-face liner over a plurality of zones transverse to the direction of liner motion. For each zone of each liner an iteratively determined asymptotic zonal time average moisture value is calculated. If the zonal time average difference is greater than a predefined amount, corrective action is taken by increasing or decreasing the amount of water sprayed onto the single-face liner for that particular zone. Furthermore, an average moisture content reading for the single-face and double-face liners is taken and if outside a predetermined range, corrective action is taken by adjusting the preheater wrap arm angle for some or all of the webs. Adjustments of the corrective action in view of web speeds are automatically made.

77 Claims, 43 Drawing Figures

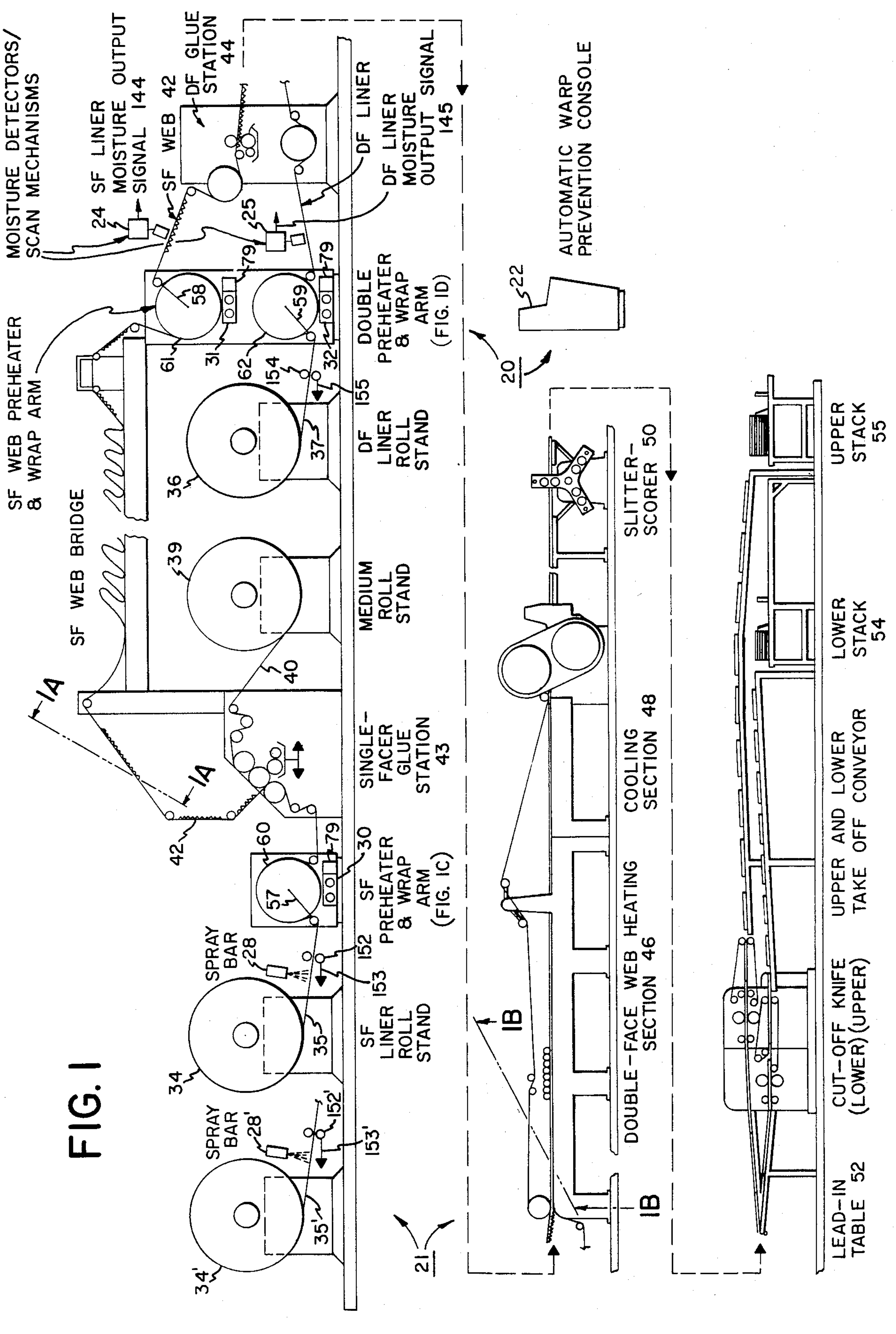
FIG. I

FIG. 1A
SF WEB
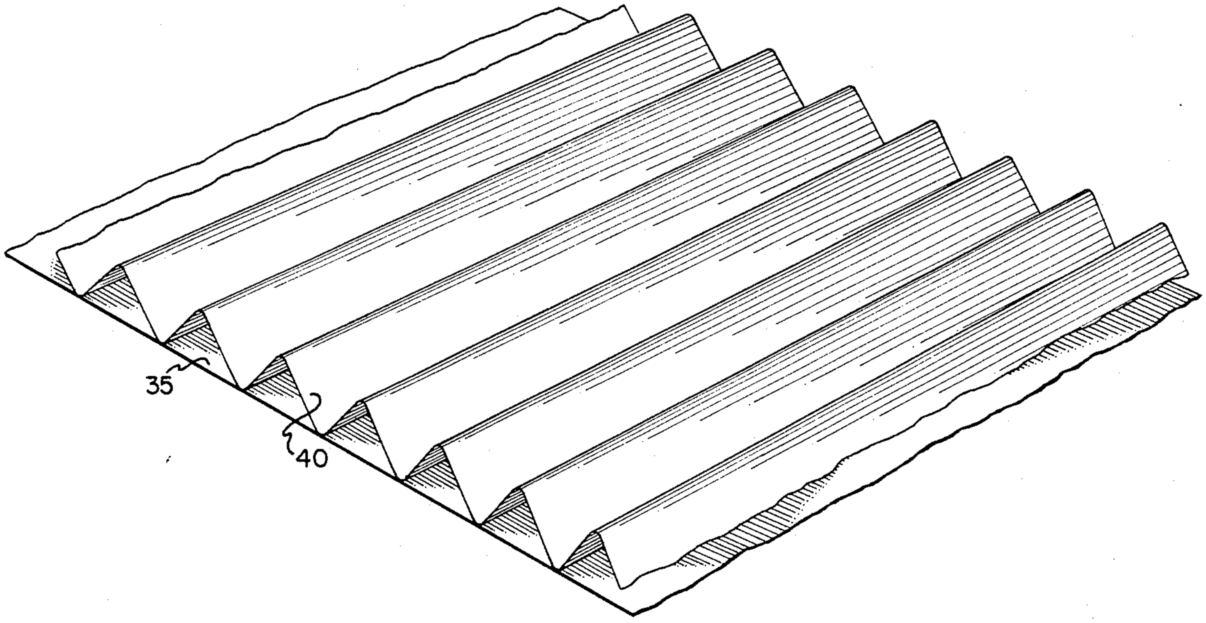
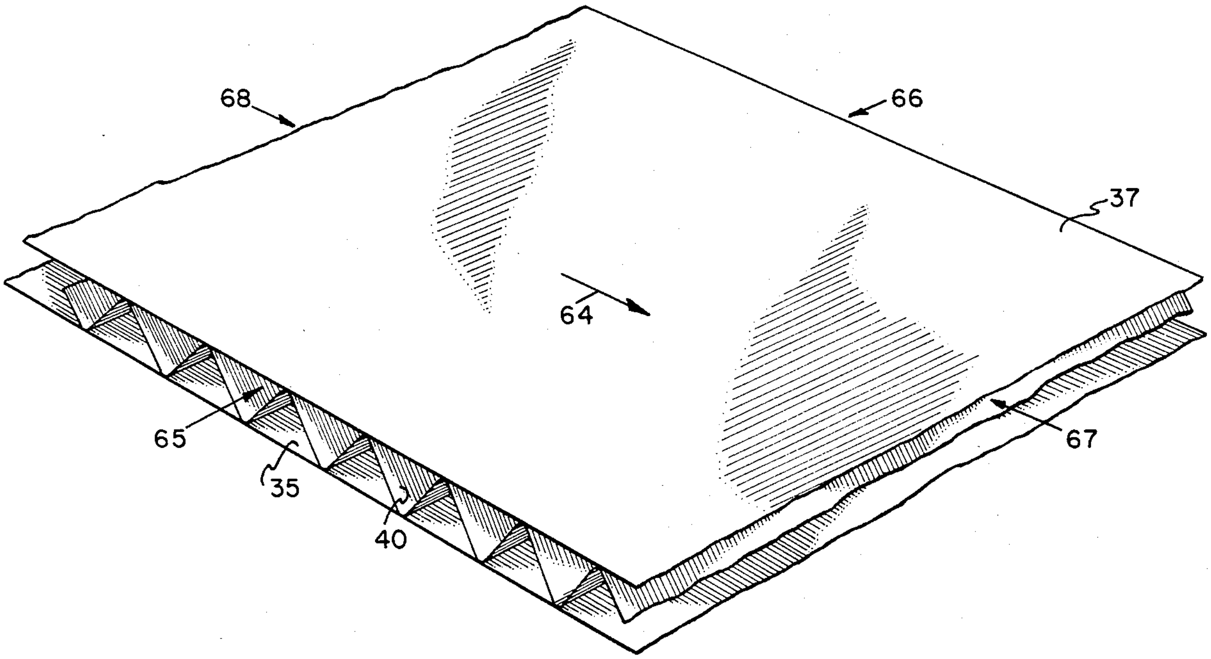
FIG. 1B

SF PREHEATER & WRAP ARM

SF WEB & DF PREHEATERS & WRAP ARMS

FIG. 5
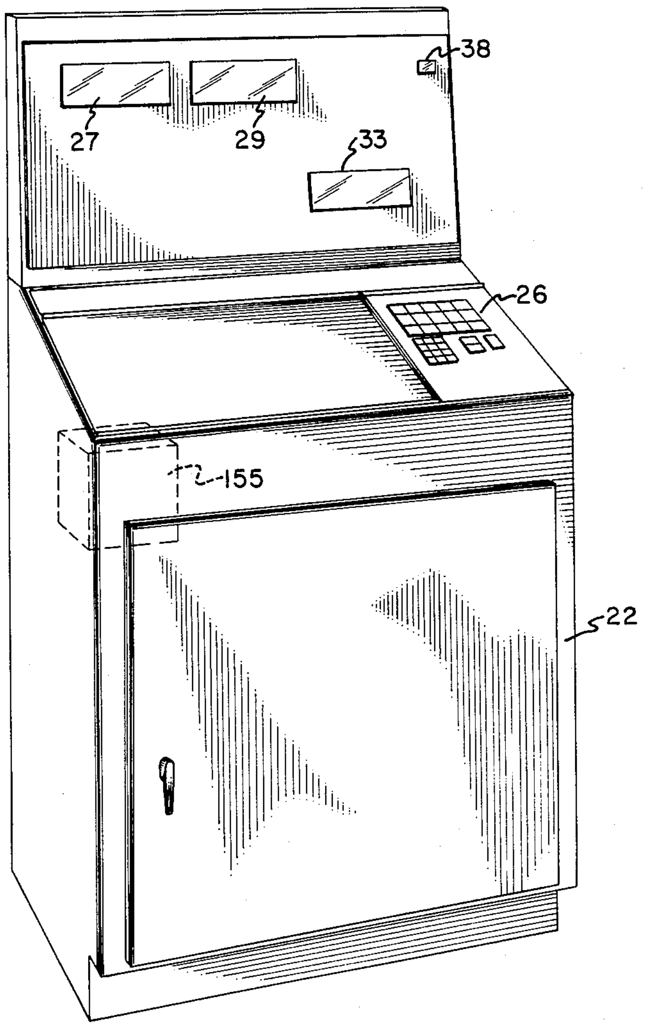
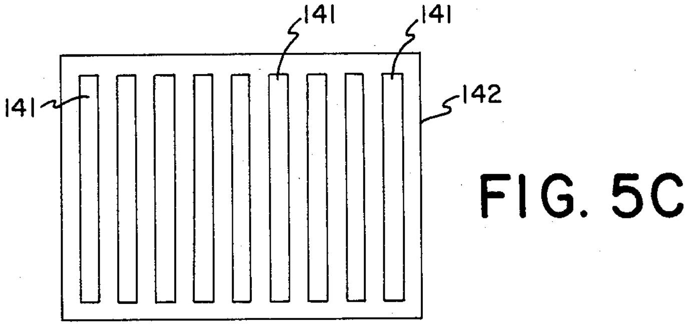
FIG. 5C

CONSOLE DISPLAY FORMAT

*ALL ODD PINS, (*1 THRU 43 = GND)

CTR #1: TRACKS KNIFE CUT TO ACTIVATE GRABBER. KNIFE SOFTWARE INITIATES KNIFE WEB ENC CNT

CTR #2: TRACKS 2nd CUT TO STOP STKR WEB. KNIFE SOFTWARE INITIATES KNIFE WEB ENC CNT

CTR #3: SCALED CLK GEN, AS OPTIONAL INPUT TO PTM C (REAL TIME INTERRUPT GEN)

CTR #1: TRACKS KNIFE CUT TO ACTIVATE GRABBER. KNIFE SOFTWARE INITIATES KNIFE WEB ENC CNT

CTR #2: TRACKS 2nd CUT TO STOP STKR WEB. KNIFE SOFTWARE INITIATES KNIFE WEB ENC CNT

CTR #3: REAL TIME INTERRUPT GENERATOR. OPERATES ON EITHER Ø2 OR PRESCALED CLK FROM PTM B

CTR #1: TRACKS UPPER GAP TO GATE MECH. SOFTWARE INITIALIZED BY GRABBER, CNTS U STKR WEB ENC.
CTR #2: TRACKS LOWER GAP TO GATE MECH. SOFTWARE INITIALIZED BY GRABBER, CNTS L STKR WEB ENC.
CTR #3: OPTIONAL REAL TIME INTERRUPT GEN. OPERATES ON EITHER Ø2 OR PRESCALED CLK FROM PTM B

*ALL ODD PINS = GND

*NOTES: a) P4, PINS 1-6 = VCC (+5V)
b) P4, PINS 8,10,12,14,16,18,20,22,24,26,28,30,32,34,36,38,40 = GND
c) DECOUPLE, VCC/GND AT P4 WITH 100μfCAP

*NOTE: P3, PINS 1 THRU 11 = VCC (+5V)
P3, PINS 13 THRU 49 = GND

METHOD AND APPARATUS FOR AUTOMATIC WARP PREVENTION OF CORRUGATED BOARD

REFERENCE TO MICROFICHE APPENDIX

Reference is hereby made to a microfiche appendix embodying the program listing used in the implementation of the present invention. This microfiche appendix contains one sheet of microfiche comprising 65 frames of program listings.

TECHNICAL FIELD

The present invention relates to devices for controlling the moisture content in the liners used to fabricate corrugated board. In particular the invention relates to controlling moisture so as to minimize warp in the manufacture of corrugated board. The invention generally relates to controlling observed parameters of moving multiple webs that are combined to form an overall product.

BACKGROUND ART

The present invention relates to improvements in corrugated board manufacture. Typically, such corrugated board is manufactured from two liners, called the single-face liner and double-face liner (or double-backer), and a fluted medium. The fluted medium is first glued to the single-face liner to form a single-face web. This web is then glued to the double-face liner to form the corrugated board. Since the corrugated board cannot be tightly rolled (as can paper when it is manufactured), the board is much more susceptible to warping than other paper products. In particular, the warping is related to the differential average moisture content and the differential transverse moisture content in the two liners. It is therefore desirable to maintain a uniform differential average and transverse moisture content for both liners so that the overall product will have minimal or no warpage.

Although some of the prior art references as disclosed below have been directed to the manufacture of corrugated paper products, they have not incorporated the automatic warp prevention techniques utilized in the present invention. Table 1 is a list of prior art references with a breakdown of these references in five groups. Copies of these references will be made part of the file history of this patent.

TABLE 1

| U.S. Pat. No. | Inventor | Date of Issue |
|---|---|---|
| | Group I<br>Corrugated Board and Other Machines<br>With Warp Control Systems | |
| 3,004,880 | Lord | 1961 |
| 3,936,665 | Donoghue | 1976 |
| 3,981,758 | Thayer et al | 1976 |
| | Group II<br>Control Systems Used By The<br>Paper Industry | |
| 3,596,071 | Doering | 1971 |
| 3,622,448 | Adams et al | 1971 |
| 3,678,594 | Goerz, Jr. et al | 1972 |
| 3,196,072 | Wirtz | 1965 |
| 3,711,688 | Stout et al | 1973 |
| 3,779,843 | Knapp | 1973 |
| 3,994,602 | Howarth | 1976 |
| 4,174,237 | Hemming Jr. et al | 1979 |
| 4,184,204 | Flohr | 1980 |
| | Group III<br>Zig-Zag Zone Scan<br>and Averaging Techniques | |

TABLE 1-continued

| U.S. Pat. No. | Inventor | Date of Issue |
|---|---|---|
| 3,496,344 | Chope | 1970 |
| 3,508,035 | Worthley | 1970 |
| 3,510,374 | Walker | 1970 |
| 3,562,500 | Grant | 1971 |
| 3,626,165 | McCall | 1971 |
| 3,691,940 | Hays et al | 1972 |
| | Group IV<br>Infrared Sensors | |
| 3,150,264 | Ehlert | 1964 |
| 3,662,170 | Keyes IV | 1972 |
| | Group V<br>Wrap Arm Control | |
| 4,038,122 | DeLigt | 1977 |
| 4,056,417 | League IV | 1977 |
| 4,071,392 | Chaudhuri | 1978 |

In Group I, U.S. Pat. No. 3,004,880, Lord, describes a conventional corrugator machine in existence during the late 1950's and further describes a control method for preventing transverse warping or curl as shown in its FIGS. 2 and 3. This reference uses radiation pyrometers 192, 194, 196 and 198 to sense the temperature conditions of the upper liner 14, a bottom liner 22, a flute or corrugated medium 18 and the single-face board 72 comprising a combination of the single-face liner and medium. The pyrometers transmit electrical signals proportional to their sensed temperatures (and thus moisture) to controllers 172, 174, 180 and 182 which in turn transmit output signals by way of conductors 200, 202, 204 and 206 to their associated electric motors and gear reduction units 208, 210, 212, and 214 which in turn control the angular position of wrap arms 26, 80, 98 and 44. These wrap arms thus control the amount of drying for the webs moving across the associated heater roller 34, 88, 106 and 52. The pyrometer readings are compared to a set point pressure signal delivered by respective ratio relays 148, 149, 150 and 151, to index mechanisms 170, 175, 168 and 178, and the signals are then sent to each of the controllers.

The disclosed system in Lord requires in one embodiment for an observer to sense curling and then to make adjustments to regulators 127, 128, 129 and 130 so as to change the pressures which in turn are used in conjunction with the pyrometer readings to adjust the wrap angle of the wrap arms. In addition, sensors such as those shown in FIGS. 6 and 7 of Lord can be used to automatically sense either convex or concave transverse warp such as shown in FIGS. 2 and 3. However, the control action is to adjust the wrap arm. No zonal measurements are made, and no zonal corrective action is taken.

Lord also discloses the use of a tachometer generator to sense the speed at which the tension roll 54 is rotating and to transmit an electrical signal proportional to the speed to controller 234. This in turn can adjust the amount of steam spray emitted at header 56 onto medium 18. However, Lord does not disclose or suggest sampling the moisture content transversely along the longitudinally moving medium nor taking weighted zonal time averages to determine appropriate adjustments to corresponding spray heads associated with the moving medium.

Thus, zonal measurements are not made on the single-face liner and double-face liner as in the present invention nor are zonal adjustments made to the moisture content based upon the overall difference of the moisture measurements for corresponding zones. In this latter aspect of the present invention, differential zonal offsets and average offsets are used to determine the amount of corrective action. None of these aspects are disclosed or suggested by Lord.

In addition, the present invention provides overall control of the absolute moisture content of the single-face liner and double-face liner through adjustments in the wrap arms for the respective liners. The present invention also provides for moisture measuring offsets depending upon the weight of the liner being used to form the corrugated board and thereby is able to make adjustments in these moisture measurements when such is necessitated by the moisture sensor's characteristics. None of these aspects of the present invention are either disclosed or suggested by Lord.

U.S. Pat. No. 3,936,665, Donoghue, discloses a sheet material measuring, monitoring and controlling apparatus which utilizes a series of transverse sensors to sense such parameters as density, moisture content, resistivity or other physical or chemical characteristic of the moving sheet. It also discloses use of averaging circuitry 31, 32, and 33 whose average inputs are transferred to a computer curve fitting and profile derivation circuit which uses what is known in mathematics as regression equations to determine the appropriate control to take by a sheet material characteristic controller means 10 (see FIG. 3). In particular, Donoghue discloses taking a series of measurements across a moving sheet material and based upon the sensed values, determining the coefficients of a corresponding regression equation. Once the coefficients are calculated, the value of the parameter for points between the sensed locations can then be computed. The parameter is averaged over the entire transverse length and the computed average compared to desired values so that corrective action can be taken.

This reference does not disclose or suggest transversely scanning the moving sheet but actually suggests that this technique is not as desirable for the applications disclosed. Donoghue further does not disclose or suggest transversely sensing two moving liners, making average zonal measurements, comparing corresponding zonal measurements and taking corrective action in response thereto. Donoghue also does not suggest the use of offsets and variable gain factors for taking corrective action.

Donoghue further does not suggest taking multiple consecutive readings of parameters and asymptotically computing the magnitude of the parameter and thus the amount of corrective action to take.

U.S. Pat. No. 3,981,758, Thayer et al, discloses an apparatus for producing double-face corrugated paperboard webs and for controlling warping. In the background section of this reference, the various factors contributing to corrugated paperboard warp are discussed. The disclosed system has a console with speed indicators and the like with a system programmed to respond to symptoms of poor quality such as warp which are manually observed and indicated to the system. The system then makes the needed corrections and adjustments. These adjustments include preheater web wrap at one of three locations to control the amount of heat applied to the lamina and adjustment of water sprays to control the amount of moisture applied to the lamina. In instances of extreme warp, an adjustment of the thickness of the adhesive applied to the corrugated medium flute tips is made to control both moisture content and overall quality of the final blanks. The present invention's technique for zonally sensing moisture and taking asymptotic time averages thereof to provide appropriate control to the water spray heads is not shown or suggested by Thayer et al. Other aspects of the present invention, including differential offsets, moisture measuring offsets, and variable zonal gain factors (sometimes called damping) are also neither disclosed or suggested by Thayer et al.

The references in Group II are directed to control systems used in the paper industry. They illustrate the various techniques used for sensing and taking corrective actions to a continuous sheet material fabrication apparatus. None of these references disclose or suggest the control method and system of the present invention.

The references in Group III disclose various zig-zag zone scanner averaging devices used in conjunction with the fabrication of various types of sheet material. U.S. Pat. No. 3,562,500, Grant, discloses that a plurality of readings may be taken across a moving sheet and that averages of sampled values can be taken. Grant does not disclose or suggest taking parameter readings over corresponding zonal locations of two liners or to use such information, in combination with offsets, variable gain factors and sensor compensation factors in order to take corrective action. Grant also does not disclose asymptotic measurement of zonal parameters and corresponding corrective action so as to obtain a desired correction with minimal overshoot.

The other patents in this group, although disclosing scanning and averaging techniques, similarly do not disclose the methods and apparatus of the present invention as referred to above.

The Group IV patents, namely U.S. Pat. Nos. 3,150,264. Ehlert, and 3,662,170. Keyes IV, both disclose the use of infrared sensors for measuring the moisture content of paper generated by paper making machinery. Although such sensors are used in the preferred embodiment of the present invention, the other aspects of the present invention as detailed above are neither disclosed nor suggest by these references.

Finally, the references in Group V disclose various apparatus for wrap arm control. In particular, League IV discloses an open-loop digitally operable method and apparatus for controlling the application of heat to webs in preconditioning sections of corrugating machinery as a function of various production factors. The disclosure is directed to producing finished blanks with minimum warpage. The control here utilized is the application of heat to the webs in preconditioning sections of the corrugating machine. Neither zonal parameter sensing of two liners nor the other aspects of the present invention are disclosed or suggested by League IV or any other references in this group. The present automatic warp prevention apparatus and method makes a number of improvements on the prior art so as to result in corrugated board manufacture with increased throughput, higher quality board, and less machine down time.

DISCLOSURE OF THE INVENTION

The present invention is directed to a method and apparatus for producing corrugated board with minimal warpage. Due to the fact that corrugated board typically comprises a first and second liner and a fluted medium placed in between (the first liner typically called the single-face liner and the second liner typically called the double-face liner or double backer), a variation in the moisture content of the two liners and transverse differences in the moisture content for either liner can cause differential shrinkage during the drying process, which results in warpage. It has been experimentally found that to maintain uniformly flat corrugated board with minimal warpage it is necessary to maintain the moisture content of the single-face liner and double-face liner and medium within predetermined limits depending upon the weight of the paper used. Variations in the medium moisture content is less critical since the medium is fluted and sandwiched between the two outer liners in the corrugating process. It has also been experimentally found that not only must the average moisture content of the constituent elements be maintained within a preferred range but also that the differential variation of the moisture content across each liner must also be kept within predetermined limits so as to minimize differential shrinking. Thus, absolute moisture level control for the two liners as well as transverse measurements taken along a plurality of points for both liners are utilized in the present invention so as to maintain absolute, overall average moisture and zonal average moisture differences of the liners within predetermined limits. Corrective action is undertaken when the overall average moisture difference exceeds some offset value and comprises adjusting the wrap arm positions of preheaters associated with the single-face liner as it comes off the roll, the double-face liner as it comes off its roll, and the single-face web formed by the fluted medium and single facer. The wrap arms in conventional fashion may be adjusted so that the moving liner has greater or lesser circumferential contact with a preheater drum and thereby can adjust the amount of moisture removed from the moving material as it passes over the drum.

The present invention incorporates infrared moisture sensing devices which scan transverse to the direction of motion of both the single-face web and the double-face liner. Although the preferred embodiment of the present invention obtains moisture readings from the single-face web, the readings are made with respect to the single-face liner portion of the web. The moisture readings could of course be taken before the medium is glued to the single-face liner. Throughout the specification, reference to the moisture content of the single-face web refers to the moisture content of its single-face liner. The analog signals for both sensors are correspondingly digitized for a first plurality of readings across each liner. The data is then processed to take into account the type of paper used and the type of sensor used. The readings are thus made along a diagonal with respect to the paper due to the paper travel in the machine direction (MD).

An overall average moisture measurement is then determined for the single face liner and double face liner. If either reading is outside of preset respective minimum and maximum moisture limits, wrap arm adjustments are made to the appropriate liner.

If the average difference between the two count average measurements is outside of a range of permissible values, then corrective action is taken by adjusting the wrap arms of the preheaters so as to reduce the average moisture content difference.

Typically, there is an average differential offset value and a dead zone tolerance associated with that offset. In a given example, it may be desired that the average moisture difference between the double-face liner and the single-face liner be equal to −0.3 (that is the single face liner moisture content is ideally 0.3 percent greater than the double-face liner moisture content). However, to minimize small adjustments occurring on each scan of the liners, a dead zone of permissible readings is defined about this offset. Thus, a typical dead zone might be plus or minus 0.3 percent about the differential offset and therefore acceptable overall values for the average difference in liner moisture contents could range from 0 to −0.6 percent. If a value is obtained outside of this zone of permissible values, then wrap arm corrective action is taken.

The amount of wrap arm adjustment is not only dependent upon the average moisture difference for the liner but also the speed of the respective liners. It is intuitively apparent that if the moisture content of the single-face liner is to be reduced with respect to the double-face liner, the amount of time that any portion of the single-face liner is in contact with the single face liner preheater drum (as controlled by the wrap arms) should be increased. However, if the speed of this liner is increased from its previous speed, the wrap arm adjustment must be further increased so that the desired drum contact time is obtained.

In other words, if $\theta$ equals the circumferential contact of the liner with the drum, then this angle is related to the drum's angular velocity by the equation:

| | |
|---|---|
| $\theta =$ | wt |
| where w = | the angular velocity of the drum, and |
| t = | contact time of the liner with the drum for any location on the liner. |
| Thus t = | $\theta/w$. |

Since w equals the liner velocity (v) divided by the drum radius (r); (i.e., w=v/r), if the liner speed increases, w increases. Therefore, to maintain a given contact time, $\theta$ must be correspondingly increased. This is done by moving the preheater wrap arms.

In addition to overall average measurements and difference calculations made with appropriate corrections when outside of permissible values, the present invention also makes zonal readings of the moisture for each of a plurality of zones for both the single-face liner and double-face liner. Typically, between 16 and 20 readings are made per zone with a typical zone being 8 inches (19.3 cm) in transverse width. The processed data based on each reading is then checked to determine if other factors are met to ensure that reliable zonal information is available. If the data is reliable, the readings for each zone of each liner are count averaged. The zonal count average moisture measurement is then processed into a zonal time averaged moisture percentage—this process using a time average weighting factor. More particularly, a zonal time average moisture percentage for both the single-face liner and double-face liner is calculated based upon a weighted average of the current zonal count average moisture measurement and the previous zonal time average moisture measurement. In a typical example, the current zonal count average value is multiplied by 0.45 and the result added to (1-0.45) times the previous zonal time average moisture value. Thus, the zonal time average moisture is based upon a weighted summation of its previous value plus a fractional amount of the current zonal count average value.

A number defined as "Z difference" or zone difference value is equal to the double-face liner zonal time average moisture value for a given zone minus the single-face liner zonal time average moisture value for the same zone. This Z difference number is then used to determine if any zonal corrective action should be taken for that particular zone.

The corrective action is determined by calculating what is known as the "spray value." The "spray value" is equal to the Z difference number minus any zone offset and for overall moisture difference offset, times a gain factor (sometimes called a damping factor). In a typical example, the Z difference value might be 0.26 and the zone offset might be +0.1 (this example assumes the overall moisture difference offset equals zero). The difference between Z difference and the zone offset is then 0.16 (0.26–0.1). If this value is positive, it is multiplied by a spray increase gain factor (damping factor) and if the number is negative, it is multiplied by a spray decrease gain factor (damping factor). The current spray value is equal to this number plus the previous spray value number. If the spray value number is greater than 1 percent, then spray is emitted from the spray nozzles associated with that zone so as to increase the moisture content of the single-face liner. The actual amount of spray emitted is proportional to the liners' speed and is determined by the spray bar controller in view of the received spray value.

There are spray heads of relative spray volumes of 1, 2, 4 and 8 percent moisture and thus spray adjustments from 1 to 15 percent for each zone can be obtained by appropriate selection of any head or thereof.

The spray emitted at each zone is proportional to the spray value number and since the spray value number is updated, it decreases as the moisture detector senses more moisture for that zone. This decrease in the spray value consequently causes less water to be applied to the zone until finally no additional water is applied. To cause a more rapid decrease in the zone spray, a decrease spray gain factor is used which is typically larger than the spray increase gain factor.

The above zone measurements and calculations and corrective actions are taken for each of a plurality of zones for the two liners. Since the moisture measurements can be taken for the single-face liner and double-face liner spaced from the area where corrective action is made, such as at the wrap arm or spray head bars, the next readings are not made until the liner or web to which the previous corrective action was made has traveled to where its moisture can be detected by the moisture detectors. In this way, overcompensation is eliminated.

The present invention further incorporates the ability to sense if the single-face liner and double-face liner are skewed with respect to each other widthwise. This can be sensed by the moisture sensors and indicated to the operator. Moisture corrective action is not taken when this condition exists since the readings do not correspond to corresponding zones for the two liners.

Other conditions can also cause no action to be taken regardless of the moisture content readings. These conditions include differential liner speeds beyond a predetermined value, and liner speeds below predetermined values.

Furthermore, the present invention can be configured to operate with different weight liners and medium and flutes so that all types of corrugated board can be manufactured with the automatic warp prevention mechanism and method described herein. In this regard, due to the fact that the moisture detectors may produce readings too low for lightweight liners, a moisture sensing offset value can be added to the moisture reading to compensate for this condition.

The overall result yields an apparatus and method for improving the overall quality of corrugated board so as to minimize warpage and yet be easily incorporated and operated in new or existing machines.

OBJECTS OF THE INVENTION

It is therefore a principal object of the present invention to provide an automatic corrugated board warp prevention system in which moisture readings are made transverse to the direction of the single-face liner and double-face liner movement, wherein overall average moisture offset values and dead zones can be utilized to determine when wrap arm control for changing the average moisture content of the liners is to be effectuated.

Another object of the present invention is to provide an automatic corrugated board warp prevention system in which zone measurements are made over a plurality of zones for each liner and the corresponding values are both averaged over the number of readings taken for the zone as well as time averaged with respect to previous corresponding zone readings so as to asymptotically obtain a time average zone reading for each zone of each liner.

A still further object of the present invention is to provide an automatic corrugated board warp prevention system of the above description in which the zonal time average moisture difference between the two liners is used to determine if zonal spray moisture correction should be made, taking into account the desired zonal offset differences between the single-face liner and the double-face liner as well as the overall average moisture offset for the liners.

A still further object of the present invention is to provide an automatic corrugated board warp prevention system of the above description in which certain conditions such as speed equilibriums between the liners can be sensed so as to prevent corrective action from being taken if such conditions occur.

A still further object of the present invention is to provide an automatic corrugated board warp prevention system of the above description in which the moisture detector readings can be compensated so that readings obtained are correct for various weight liners.

A still further object of the present invention is to provide an automatic corrugated board warp prevention system of the above description in which the average moisture corrective action to be taken is dependent upon the speed at which the liner is moving.

Another object of the present invention is to provide an automatic corrugated board warp prevention system of the above description in which the user can easily monitor the control system and enter data related to variables used by the control system.

A further object of the present invention is to provide a method of manufacturing corrugated board with little or no warp by sensing the difference in average and zonal moisture of two liners and making average and zonal moisture corrections if the average and zonal moisture differences are beyond predetermined limits.

A still further object of the present invention is to provide a method of manufacturing corrugated board with little or no warp as described above in which zonal time average moisture measurements are made by asymptotically adding a weighted factor of the previous zonal measurement to a presently determined moisture measurement.

Other objects of the present invention will in part be obvious and will in part appear hereinafter.

BRIEF DESCRIPTION OF THE DRAWINGS

For a further understanding of the nature and objects of the present invention, reference should be made to the following detailed description taken in connection with the following drawings in which:

FIG. 1 is an overall diagrammatic representation of a corrugated board manufacturing facility incorporating the moisture detectors and scan mechanisms of the present invention for sensing the moisture on the double-face liner and single-face liner at the single face-web web as well as showing the spray bar associated with the present invention for adjusting the moisture content of the single-face liner over a plurality of zones;

FIG. 1A is a perspective view of the single face web produced by the corrugating machine showing the single face liner and fluted medium, the view taken along line 1A—1A of FIG. 1;

FIG. 1B is a perspective view of the corrugated board produced by the corrugating machine showing the single face liner, fluted medium (combining to form the single face web) and the double face liner, the view taken along line 1B—1B of FIG. 1;

FIG. 5 is a perspective view of the automatic warp prevention system control panel (console) illustrating the keyboard area for operator use and the displays visible to the operator;

FIG. 5C is a rear elevational view of the mother board and connectors to which boards forming the modules in FIG. 2 are connected, the mother board and module electronics housed within the console shown in FIG. 5;

BEST MODE FOR CARRYING OUT THE INVENTION

Overview of System

Figure 1C:
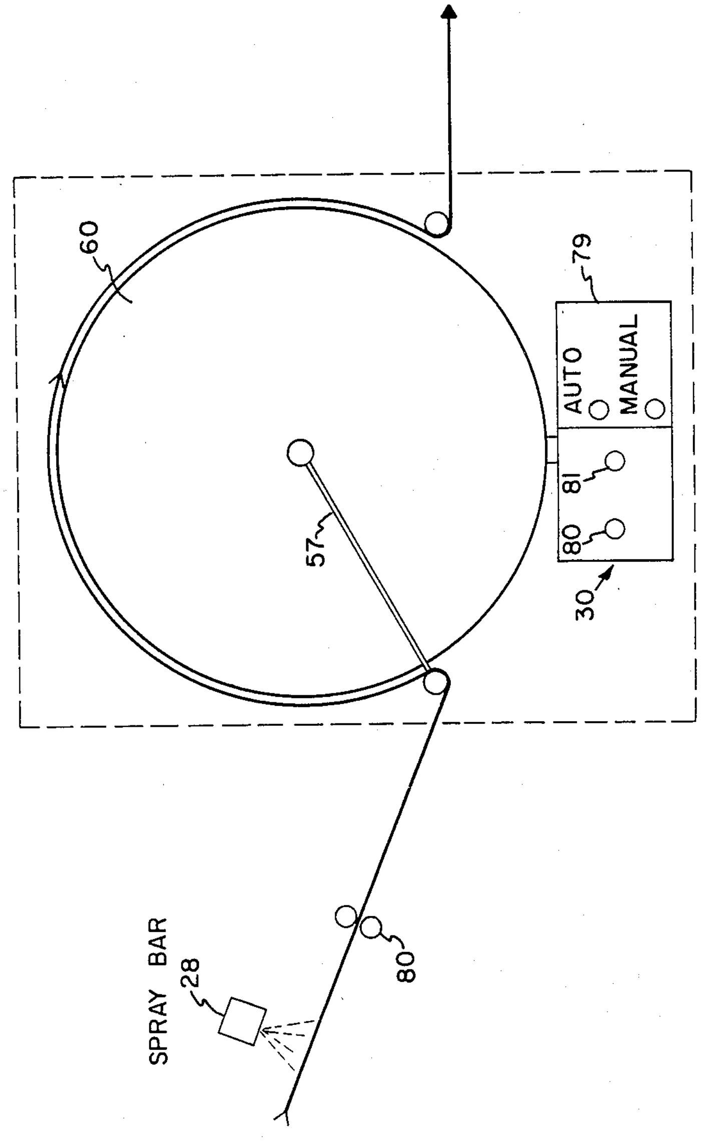
FIG. 1C is an expanded diagrammatic view of the single face liner preheater, wrap arm and associated controls and displays.
Figure 1D:
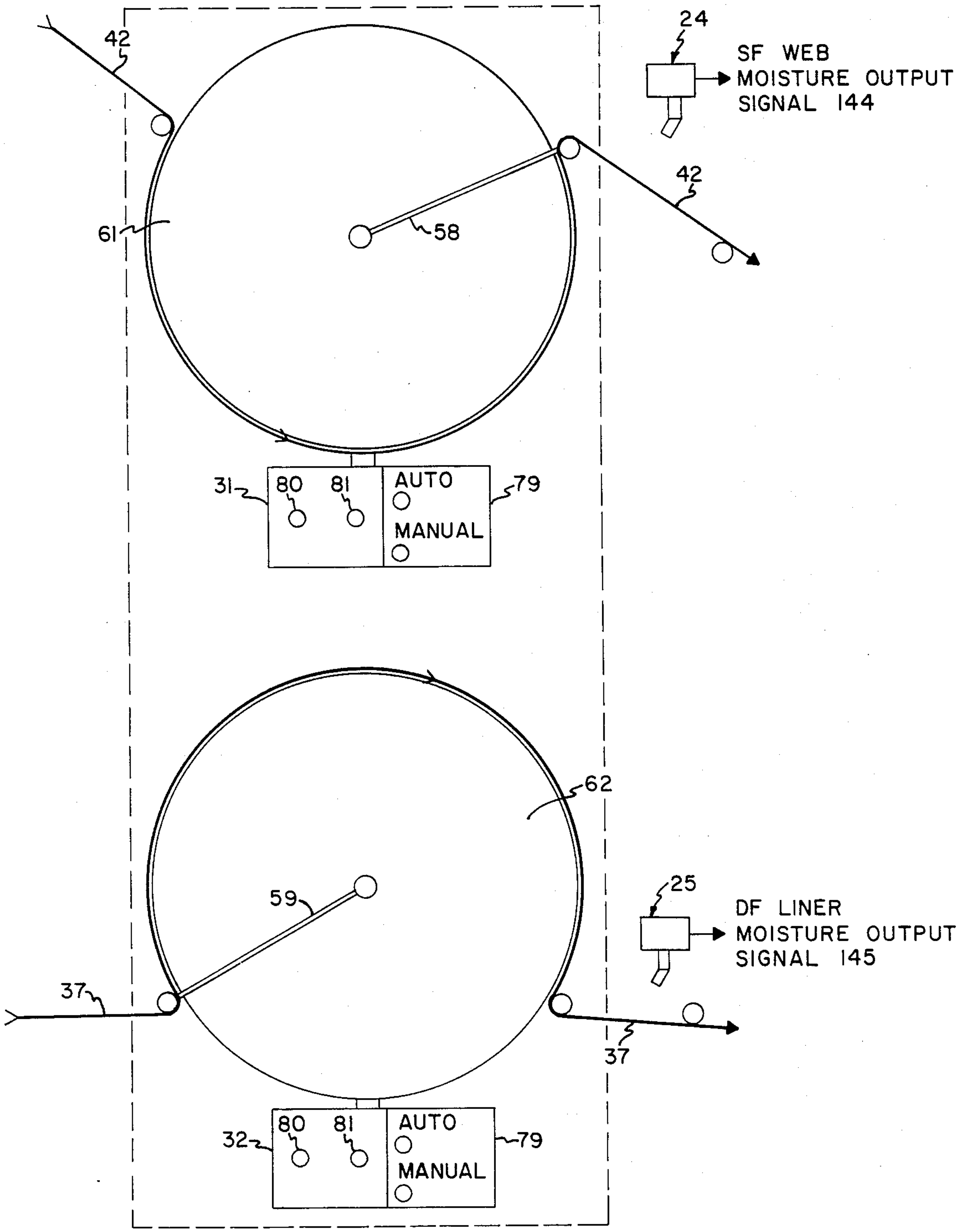
FIG. 1D is an expanded diagrammatic view of the single face web and double face liner preheaters and wrap arms and their respective controls and displays.

As best seen in FIG. 1 an automatic warp prevention control system 20 comprises a console 22 for storage of the electronic circuitry, moisture detector scan mechanisms 24 and 25, a zonal spray bar 28 and wrap arm control mechanisms and indicator units 30, 31 and 32. FIG. 1 also shows a typical corrugator machine generally denoted by the numeral 21 used to form double-face corrugated paperboard. In particular, such a typical machine includes one or more single-face liner rolls 34, 34' which contain a large quantity of Kraft or other paper typically having a width of between 60 and 96 inches (152.40 cm and 243.84 cm). The corrugator machine also has a second roll 36 which contains Kraft or other paper, double face liner 37, and another roll 39 which contains semi-chemical or other paper.

The medium is fluted and combined with the single-face liner 35 at the bottom corrugating roll/pressure roll nip of the single facer 43 to form a single-face web 42. The single-face web appears as shown in FIG. 1A and is glued to the double-face liner 37 in the double-facer 44. The corrugated board has the shape as shown in FIG. 1B.

The corrugated board is then transferred to a heating section 46, a cooling section 48 and a slitter scorer 50 and then to a lead-in table 52 to the cut-off knives and then to the stackers where the board is deposited on lower and upper stacks 54 and 55. The components as described above with respect to the corrugator machinery are well known in the art.

In a conventional corrugated board system the wrap arms 57, 58 and 59 are adjusted for the single-face liner, single-face web and double-face liner respectively so as to control overall moisture content for each web within some overall amount so as to maintain a relatively uniform moisture content in the fabricated corrugated board. Thus if more drying is required for the single-face liner 35, the angular position of the wrap arm 57 is increased, (moved counterclockwise), so that the liner is in contact with the preheater drum 60 for a greater amount of time thereby removing more moisture from the liner before it exits from the drum. The single-face web wrap arm 58 and the double-face liner wrap arm 59 operate similarly with respect to their preheater drums 61 and 62 respectively.

A problem which has been present in corrugated board manufacturing is the various types of warp which can accompany the finished product. One type of warp is that transverse to the direction of the board (see arrow 64 in FIG. 1B) as it is manufactured; that is, it tends to curl upward or downward on transverse sides 65 and 66. This type of warp is typically called cross-machine warp or C-D warp. The warp may also be in the direction of travel as shown by arrow 64 in such a manner that the blank is curled upward or downward at ends 67 and 68 after it is scored, slit and cut to length. This type of warp is usually called machine direction warp or M-D warp.

A third type of warp is known as S warp wherein the transverse sides of the corrugated board warp in opposite directions. Thus at side 65 a warp may be downward while at side 66 the warp may be upward, or vice versa. It has been experimentally found by the present invention that this particular type of warp is related to transverse non-uniformities in the moisture difference between the single-face and double-face liners.

A fourth type of warp is known as twist warp. It is a diagonal combination of C-D and M-D warp wherein sides 67 and 68 have opposite C-D warp.

The present invention addresses itself to all types of warp by maintaining uniformity in the average moisture content of both the single-face liner and the double-face liner as well as cross-sectional moisture control of the single-face liner with respect to the double-face liner. Control of absolute average moisture content is also performed. Through this combination of control, the resulting corrugated board has minimal warp for all types of warp.

Figure 3:
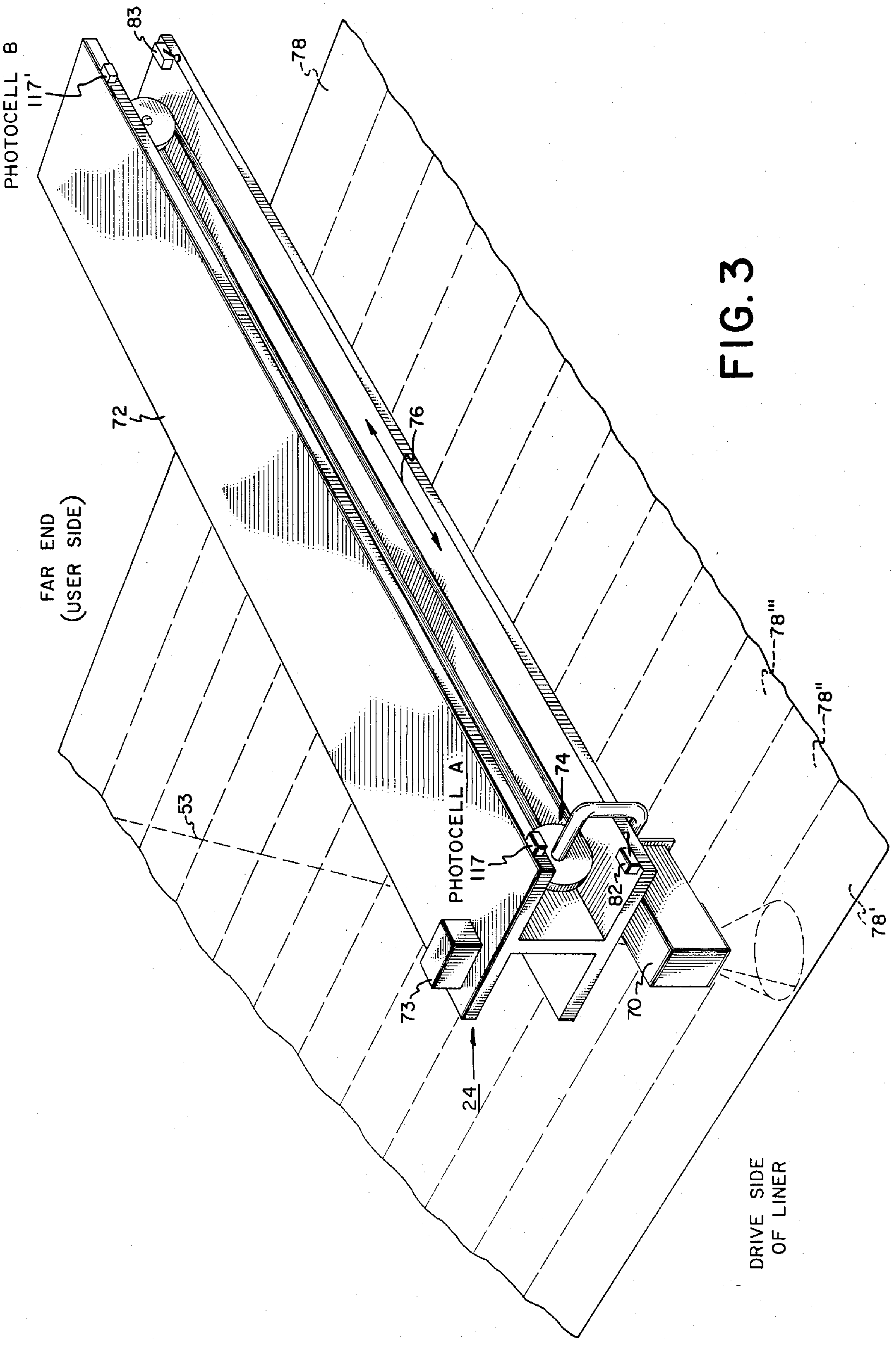
FIG. 3 is a diagrammatic view of the moisture detection system showing in phantom the zones created and used by the present invention.

As shown in FIG. 1, in order to achieve this result, the present invention incorporates a moisture detector mechanism 24 for sensing the single-face liner 35 moisture content and a moisture detector mechanism 25 for sensing the moisture content across the double-face liner 37. In the preferred embodiment, the single-face liner moisture content is measured after the medium has been glued to the liner. As seen in FIG. 3, the moisture detector mechanism comprises a moisture detector 70, a cross member track 72 and a gear train assembly 74 for driving the detector 70 across the track 72 in a manner shown by arrow 76. The mechanism also includes switches 82 and 83 and photodetectors 117 and 117'. The moisture detector 70 in the preferred embodiment is a Model 475 infrared sensor (Quadra-Beam TM) manufactured by the Moisture Systems Corporation, Hopkintown, Mass. 01748. Other moisture sensors could be used. The infrared type sensors illuminate the object to be tested with an infrared beam. Here the liner and single face web are illuminated by separate sensors and the reflected energy as sensed by the detector is related to the moisture content of the item being sampled. The output of these detectors includes an analog voltage, typically from 0 to 10 volts. Although scanning type moisture detectors are used in the preferred embodiment of the present invention, stationary moisture detectors could be used. With such detectors, moisture readings could be simultaneously made over the web or liner.

In the preferred embodiment of the present invention, the detectors 24 and 25 simultaneously move across the transverse width of the respective web and liner taking readings at one-tenth of a second intervals, with approximately sixteen to twenty readings being taken for an 8-inch zone (20.3 cm) 78. These zones 78 are shown in FIG. 3 with a dotted line separating the zones. In a typical application there are from ten to twelve zones for a liner or web, each zone having a width of between eight and twelve inches (20.3 to 30.5 cm) with the normal scan time for the mechanism shown in FIG. 3 being approximately twenty seconds to traverse the moving liner or web and a return time of approximately twenty seconds so as to be able to initiate the next scan with or without an additional time delay. The readings made with respect to the moving liner or web are thus in a diagonal path as shown by dashed lines 53 in FIG. 3. If stationary moisture detectors are used with simultaneous readings, the readings made with respect to the liner or web would be perpendicular to the direction of travel. Conventional circuitry (not shown) controls the driving of the detector 70 across the transverse path of the moving web or liner.

It should be noted that since the double-face liner or single-face web is moving beneath the scanner as the moisture readings are taken that the readings are actually made in a transverse diagonal path with respect to the moving liner or web.

Figure 4A:
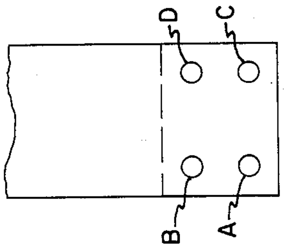
FIG. 4A is a partial top plan view of an alternative embodiment of the spray head bar wherein the nozzles for each zone are arranged in a rectangular pattern.
Figure 4:
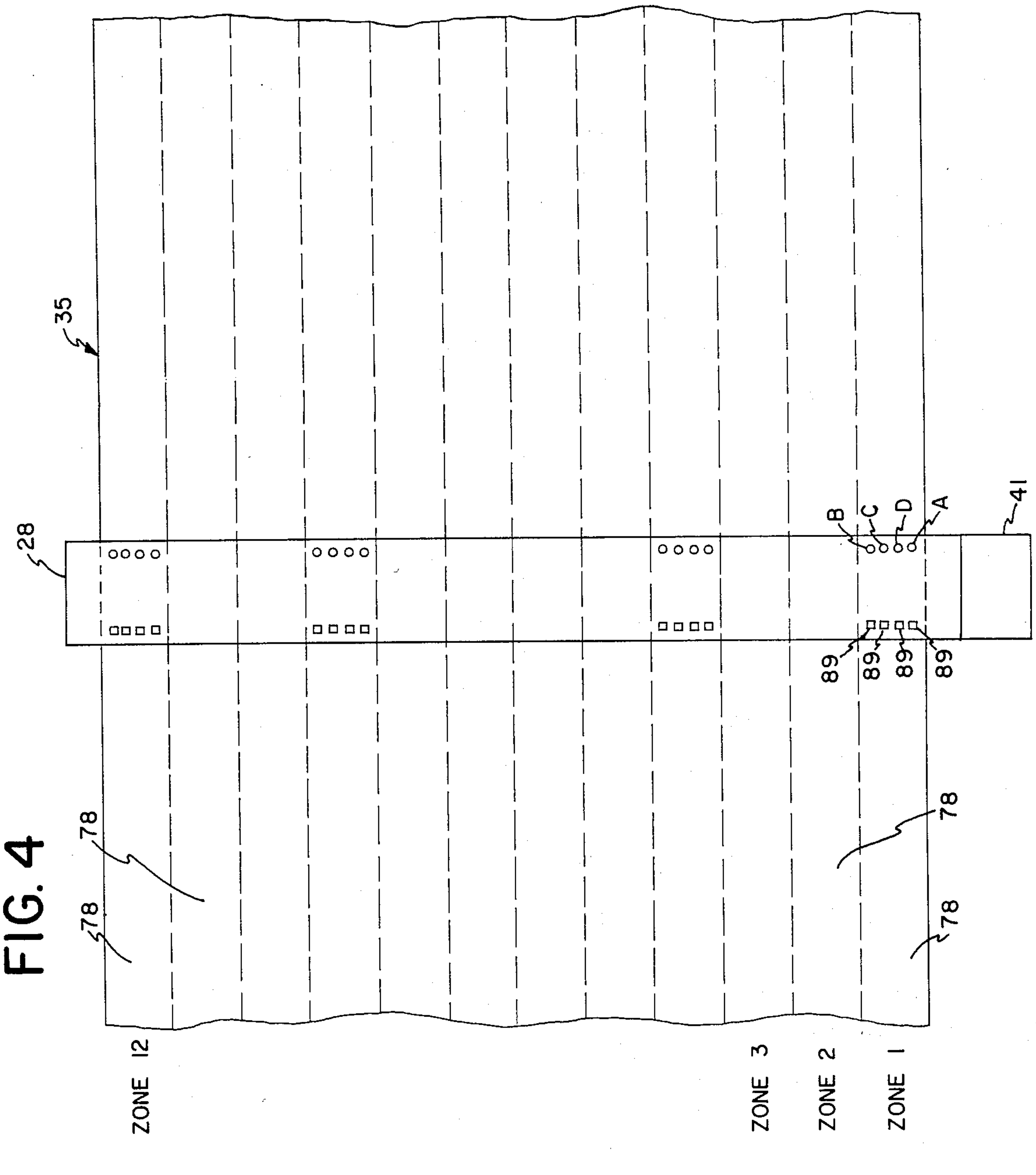
FIG. 4 is a top plan view of the spray head bar shown in FIG. 1, illustrating its physical relationship with the single-face liner so as to effectively control the moisture content of the single-face liner over the plurality of conceptual zones, the spray nozzles for each zone shown in phantom.

As shown in FIG. 1, moisture detector mechanisms 24 and 25 make similar type readings with respect to both double-face liner 37 and the single-face liner 35 respectively. The readings for corresponding zones are then used by the control system to compute zonal moisture differences and depending upon the observed conditions causing spray to be applied to the single-face liner via zonal spray bar 28 as seen in both FIGS. 1, 4 and 4A. FIGS. 4 and 4A show that for each zone there are four nozzles associated with the spray bar; namely, nozzles A, B, C and D. The nozzles are individually controlled by solenoids 89 (four solenoids are shown for the nozzles associated with the first zone); which in turn are controlled by a spray bar controller 41. The controller in the preferred embodiment of the present invention is either the Copar Corporation (5744 W. 77th St., Oaklawn, Ill. 60459) type SWS-2 spray bar controller or the Nitchie Associates (3840 Lakebriar Drive, Boulder, Colo. 80303) type CID Mod-U-Spray II spray bar controller. The inputs to the spray bar controller come from the signals of output module 130 (see FIG. 2).

The nozzles are arranged either in a straight line as shown in FIG. 4 or in a rectangular pattern as shown in FIG. 4A. Each nozzle A, B, C, and D has a different fluid flow rate so that various amounts of water can be applied to a given zone of the single-face liner. In the preferred embodiment of the present invention, the spray nozzles for each zone have the following relative flow rates: A—one percent; B—two percent; C—four percent; and D—eight percent. With these nozzles, the moisture content of the liner can be increased from 0 to 15% in 1% increments for each zone. It has been found desirable to have the spray bar arrangement for each zone as shown in FIG. 4 or 4A so as to minimize over spray from one zone to the next. Of course, other moisture applying mechanisms could be used in lieu of spray nozzles. Alternatively, zonal moisture adjustments can be made by decreasing the zonal liner moisture. Such devices as infrared heaters, microwave heaters, and segmented pressure applications can be employed. A segmented pressure application for use with preheaters is manufactured by the Rengo Company of Osaka, Japan.

Automatic Warp Control System Operation

Figure 2:
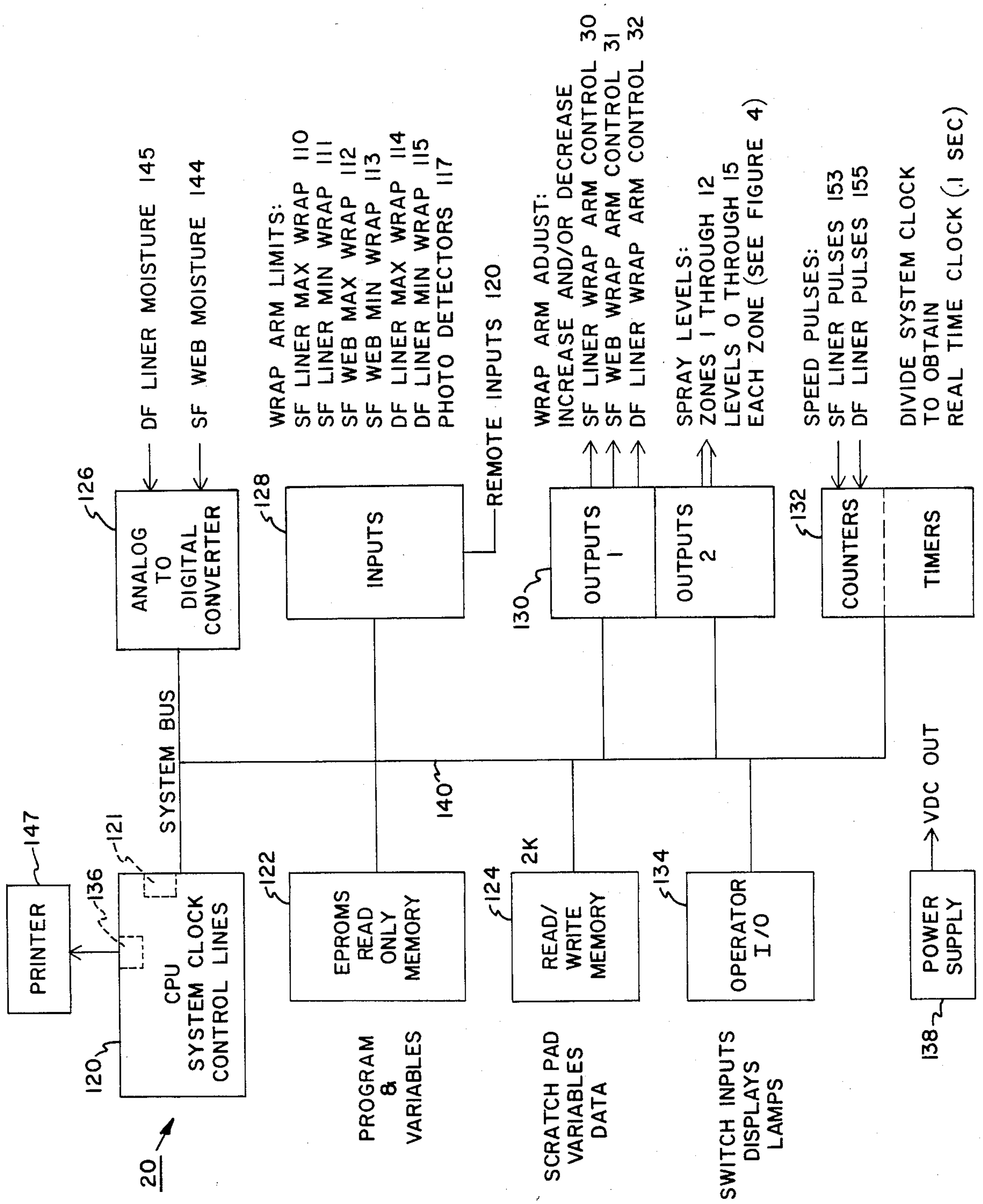
FIG. 2 is an overall block diagram of the control electronics of the present invention.

The automatic warp prevention control system 20 shown in FIG. 1 has two modes of operation, automatic and manual. As shown in FIG. 2, upon application of power to the control system via power supply 138, the CPU module 120 causes an initialization process to occur which places the overall control system in the manual mode as indicated by energization of lamp 123 associated with manual key 121 (see FIG. 5A). In order to enable the system to enter the automatic mode, various conditions regarding movement of the single face and double face liners must be obtained in addition to the other parameters which when set, allow entry into the automatic mode by depression of key 131 or key 133 for the first single face liner roll 34 or the second single face liner roll 34' respectively. When in automatic mode, lamps 160 or 161 are activated depending upon which key is depressed. Furthermore, if the PRINT ON key 135 is depressed, a "print on" lamp 162 is activated to indicate to the user that the system is in the PRINT ON mode; whereby data is presented to printer 147 for obtaining hard copy data similar to that shown in Tables 1A and 1B. An explanation of the variables used in Tables 1A and 1B is given in Table 1C. In addition, a power-up message is presented on display 27, 29 or 33, so as to indicate that the sequence has been successfully entered.

Figure 5A:
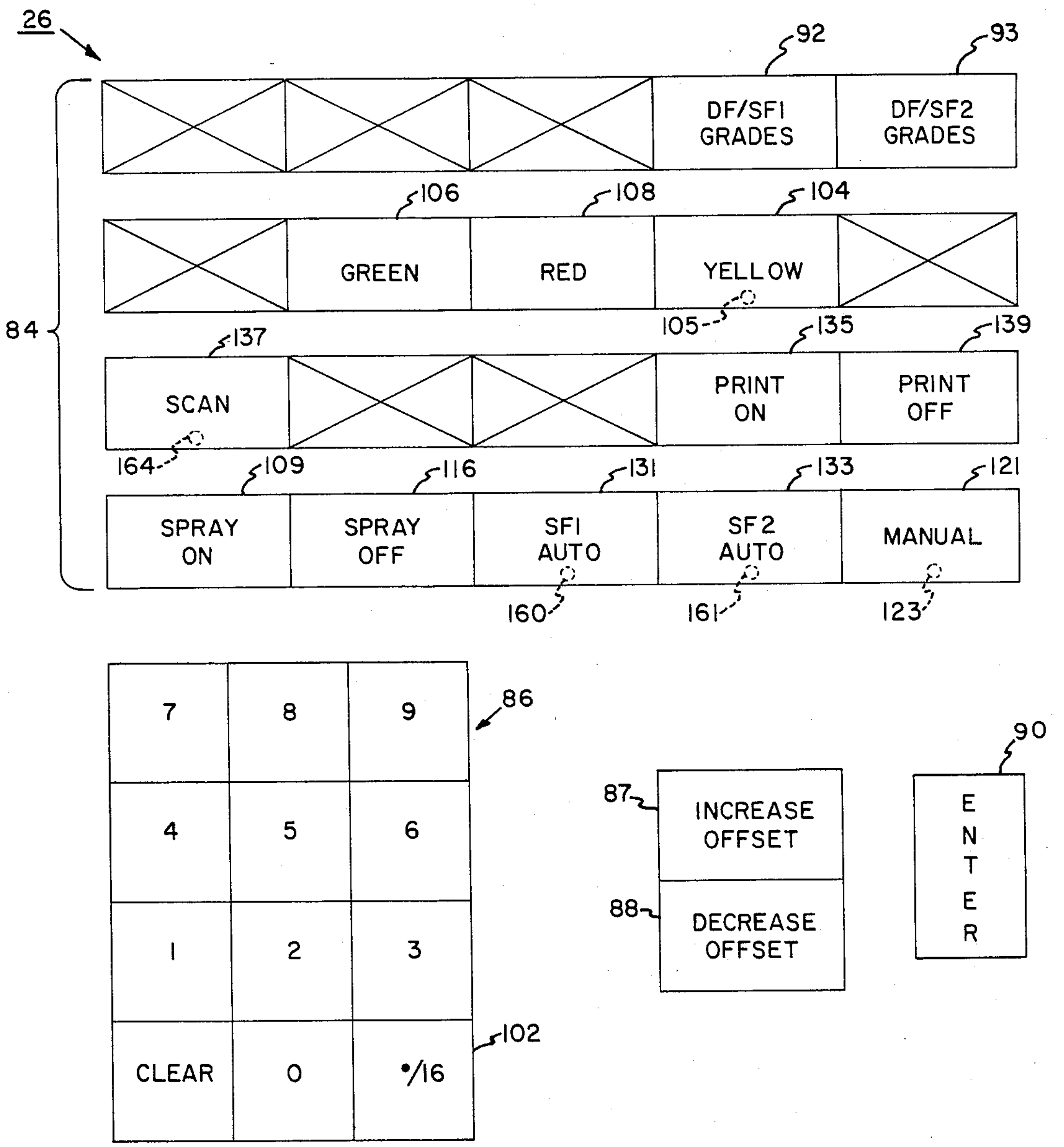
FIG. 5A is a top plan view of the console keyboard area shown in FIG. 5.
Figure 5B:
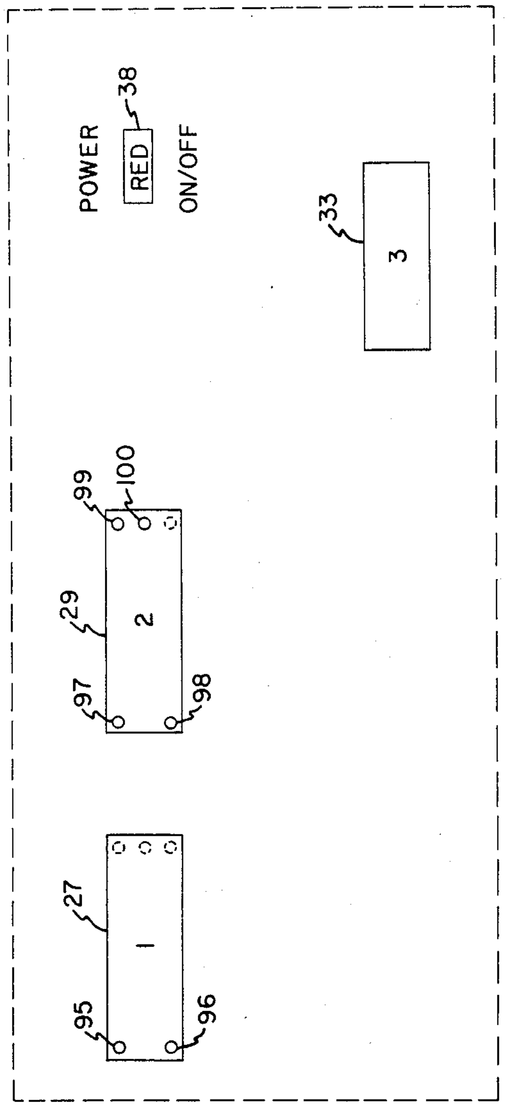
FIG. 5B is a front elevational view of the console displays shown in FIG. 5.

As shown in FIG. 5B, displays 27, 29 and 33 of console 22 are initially blank until the system is powered up by on/off power key 101 and thereafter upon depressing a key from keyboard area 26, display 33 shows the double-face liner speed if its liner is passing under the double facer measuring wheel 154 (see FIG. 1). If the double face wrap arm is in the "full on" or "full off" position; that is the wrap arm is in the maximum or minimum position and signal 114 or 115 has been received by input module 128 (see FIG. 2), a double face wrap arm limit indication is presented at display 27 via light emitting diode 95 or 96. Details of the display functions are presented in Table 5.

TABLE 1A

Automatic Mode Printout

SF1* SCAN # 8 SPEEDS: DF=494 FPM, SF = 487 FPM
WRAP ARM ADJUST: DF= −1.8 SEC, SF@DF= 1.7 SEC, SF@SF= 0.0 SEC
AVG DIFF DF-SF 1.21% AVG DF 4.78% AVG SF 3.57% OFFSET (DF-SF) 150 (1.50%)

| ZONE | 1 | 2 | 3 | 4 | 5 | 6 | 7 | 8 | 9 | 10 | 11 | 12 |
|---|---|---|---|---|---|---|---|---|---|---|---|---|
| SAMPLES | 0 | 16 | 16 | 16 | 16 | 16 | 16 | 16 | 16 | 16 | 16 | 0 |
| TIME AVG DF | 0 | 426 | 503 | 484 | 478 | 468 | 516 | 559 | 462 | 384 | 367 | 0 |
| TIME AVG SF | 0 | 352 | 332 | 347 | 383 | 405 | 358 | 344 | 365 | 351 | 350 | 0 |
| Z DIFF | 0 | 74 | 171 | 137 | 95 | 63 | 158 | 215 | 97 | 33 | 17 | 0 |
| SPRAY VALUE | 0 | 2 | 6 | 4 | 3 | 3 | 6 | 8 | 3 | 1 | 1 | 0 |

AUTO MODE SCAN: SHOWS SF1 OR SF2, DF SPEED

TABLE 1B

Manual Mode Printout

SF0* SCAN # 4 SPEEDS: DF=493 FPM, SF= 0 FPM
WRAP ARM ADJUST: DF= 0.0 SEC, SF@DF= 0.0 SEC, SF@SF= 0.0 SEC
AVG DIFF DF-SF 0.39% AVG DF 4.10% AVG SF 3.71% OFFSET 0 NA**

| ZONE | 1 | 2 | 3 | 4 | 5 | 6 | 7 | 8 | 9 | 10 | 11 | 12 |
|---|---|---|---|---|---|---|---|---|---|---|---|---|
| SAMPLES | 0 | 16 | 16 | 16 | 16 | 16 | 16 | 16 | 16 | 16 | 16 | 0 |
| TIME AVG DF | 0 | 348 | 427 | 399 | 407 | 365 | 428 | 487 | 448 | 357 | 350 | 0 |
| TIME AVG SF | 0 | −25 | 57 | 5 | −26 | −50 | 54 | 125 | 70 | −22 | −14 | 0 |
| SPRAY VALUE | 0 | 0 | 0 | 0 | 0 | 0 | 0 | 0 | 0 | 0 | 0 | 0 |

MANUAL MODE SCAN: SHOWS SFO, SF SPEED ALWAYS 0
OFFSET ALWAYS 0, SPRAYS ALL 0

*0 = Manual Mode
1 = SF Liner #1 (Roll 34, See FIG. 1)
2 = SF Liner #2 (Roll 34', See FIG. 1)
**NA indicates a fault condition. No corrections are made when a fault is present.

TABLE 1C

SF - Single-face liner 35 (see FIG. 1).
DF - Double-face liner 37 (see FIG. 1).
FPM - Feet per minute.
SEC - Seconds.
AVG DIFF DF − SF - Overall average diffence moisture content between the double-face liner and the single-face liner expressed as a percentage.
AVG DF - Overall average moisture percentage of the double-face liner.
AVG SF - Overall average moisture percentage TABLE 1C-continued of the single-face liner.
OFFSET - The desired overall average moisture offset factor between the double-face liner and the single-face liner expressed as 100 times the moisture percentage difference. Thus, as shown in Table 1A, the offset value is 150 which represents a desired moisture offset of 1.5%; that is, that the double-face liner should be 1.5% more moist than the single-face liner.
ZONE - This corresponds to the zones of the single-face web (liner) or double-face liner as measured by the moisture detector apparatus 24 or 25 respectively (see FIG. 1).
SAMPLES - This line of Table 1A defines the number of moisture samples made by the moisture detector for the single-face liner and the double-facer liner. As will be explained more fully elsewhere, there is a minimum number of samples which must be made before any action is taken to insure that the zone moisture measurements are trustworthy.
TIME AVG DF - This line of Table 1A defines the zonal time average moisture percentage of the double-face liner and is equal to the present scanned zonal count average of the double-face liner readings times a multiplying factor and added to the previous zonal time average moisture percentage for the double-face liner times one minus the multiplying factor. This variable is discussed more fully in the disclosure.
TIME AVG SF - This line of Table 1A indicates the zonal time average moisture percentage for the single-face liner similar to that for the double back liner.
Z DIFF - This line denotes the zonal time average moisture difference between the double backer and single face liner.
SPRAY VALUE - This line denotes the moisture being sprayed onto the single-face liner for the corresponding zone. The spray value is presented in percent moisture TABLE 1C-continued

| |
|---|
| and corresponds to one or more of the spray nozzles shown in FIGS. 4 and 4A. Thus, in Table 1A, zone 2 for the scan being presented received two percent moisture from the spray bar while zone 3 received six percent moisture, etc. The amount of moisture is dependent upon calculations as defined by the Z difference number and the previous spray value for that zone. This is discussed more fully in the disclosure. The actual nozzles used on the spray bar are determined by the spray bar controller as a function of the liner speed. |

At this point in the procedure, the central processing unit module 120 (see FIG. 2) is performing an initial program check for ascertaining switch closure states, reading the contents of variables as well as determining the double face liner speed at intervals of 0.1 seconds. This information is updated on displays 27, 29 and 33 as well as the lamps associated with keyboard panel 26.

Figure 7A:
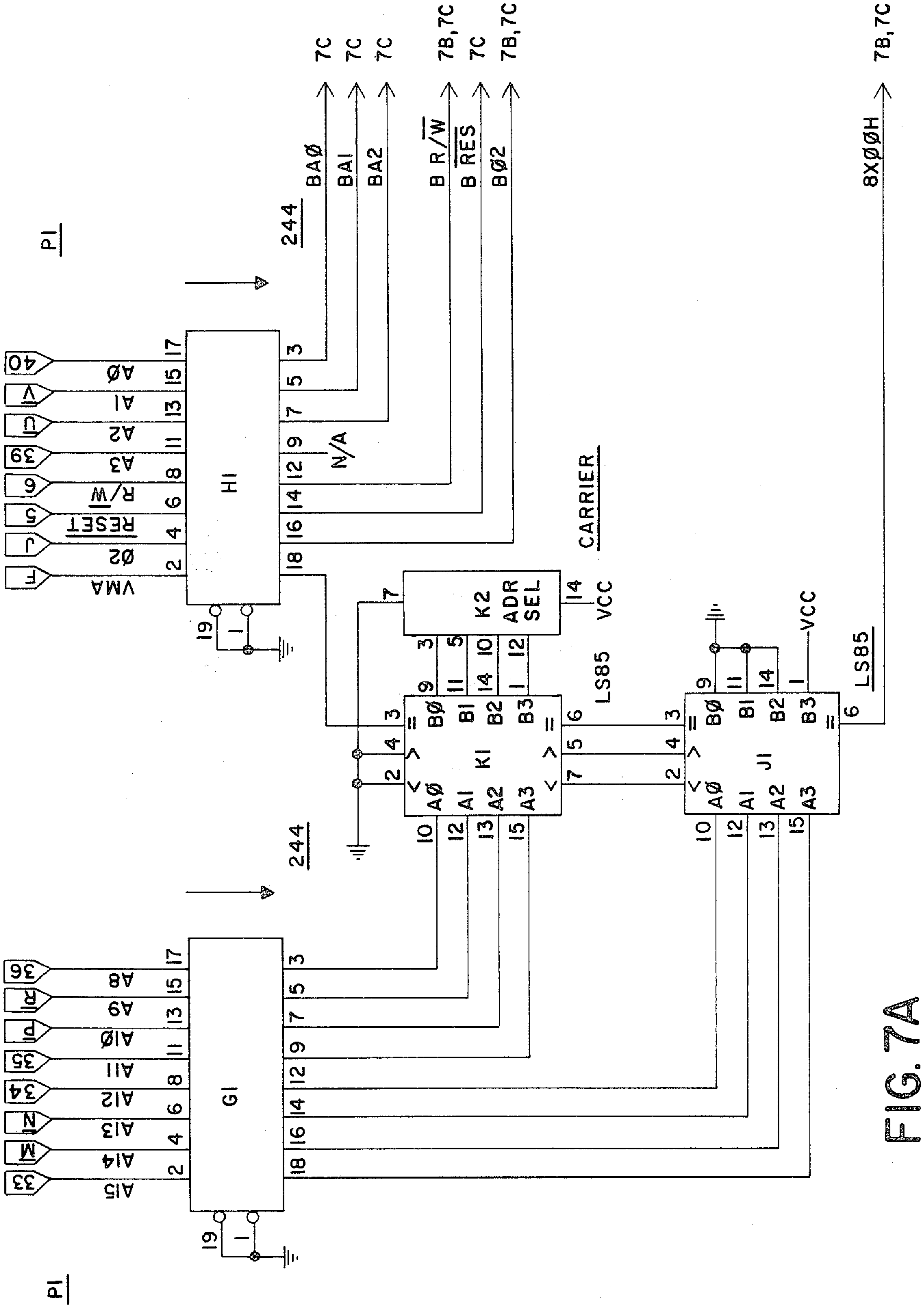
FIGS. 7A–7E are detailed schematic diagrams of the output control module shown in FIG. 2, including the wrap arm adjustment circuitry for the single-face liner, the single-face web and the double-face liner, as well as the spray level outputs for each zone monitored by the present invention.
Figure 7B:
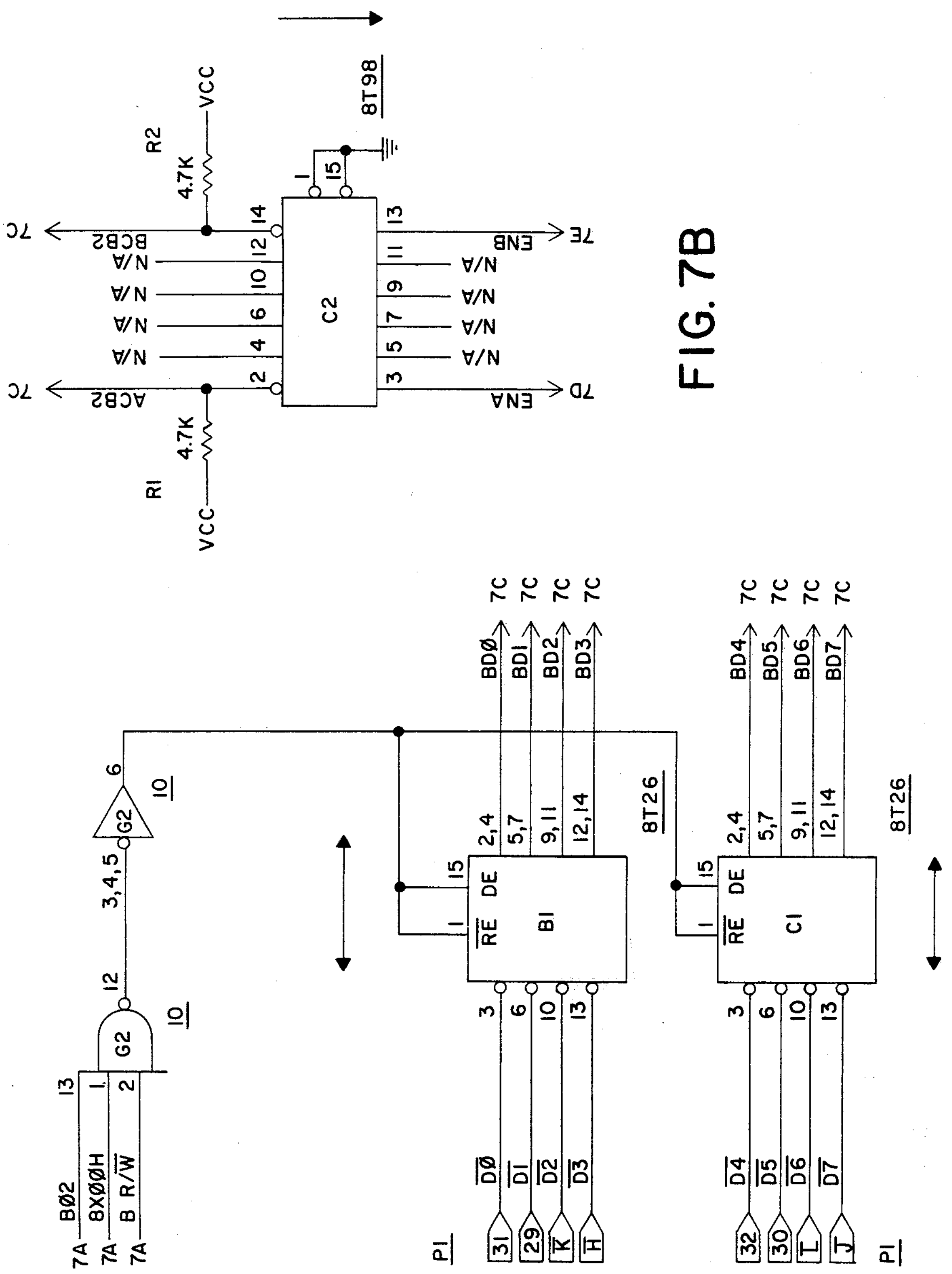
Figure 7C:
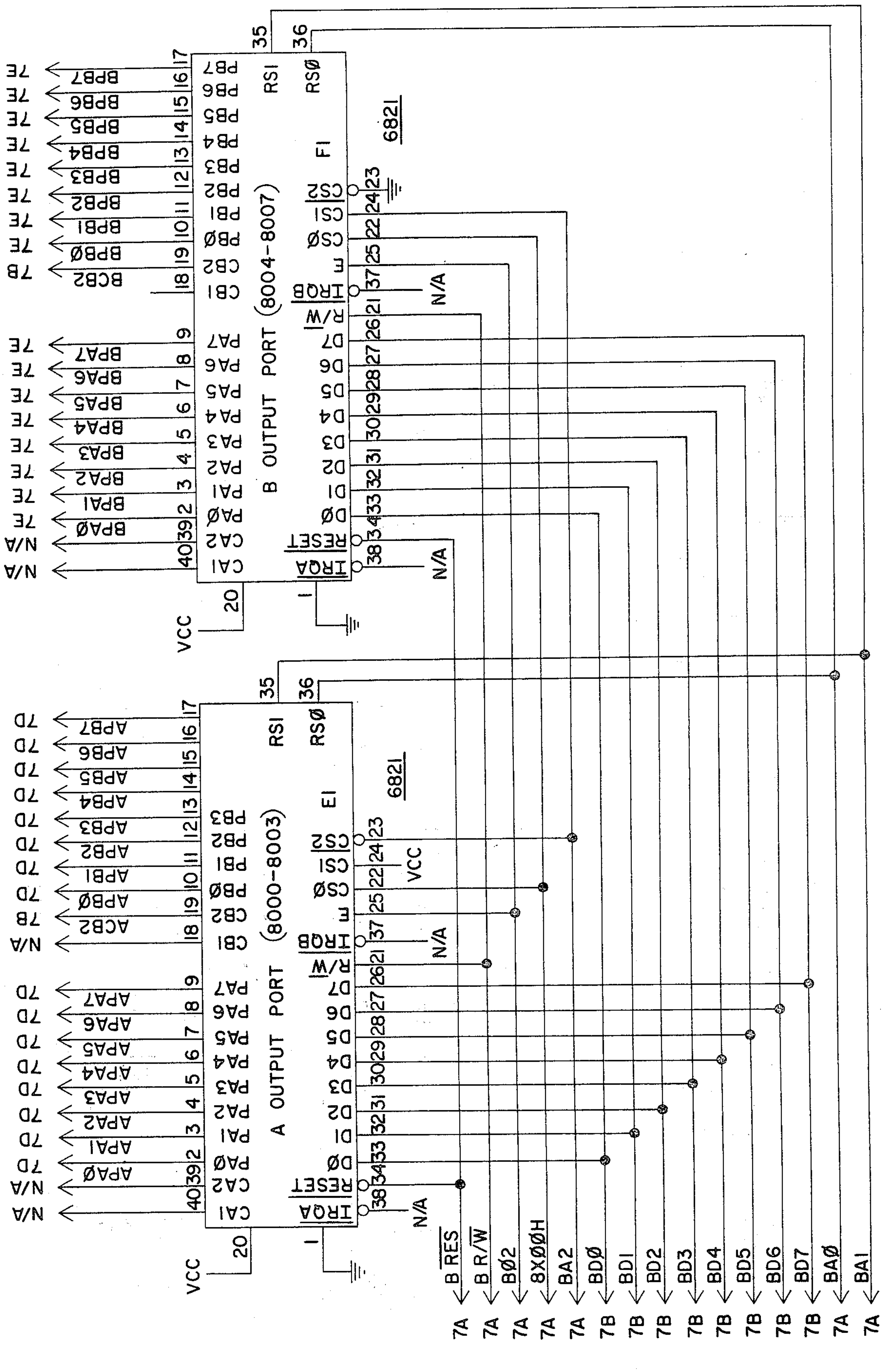
Figure 7D:
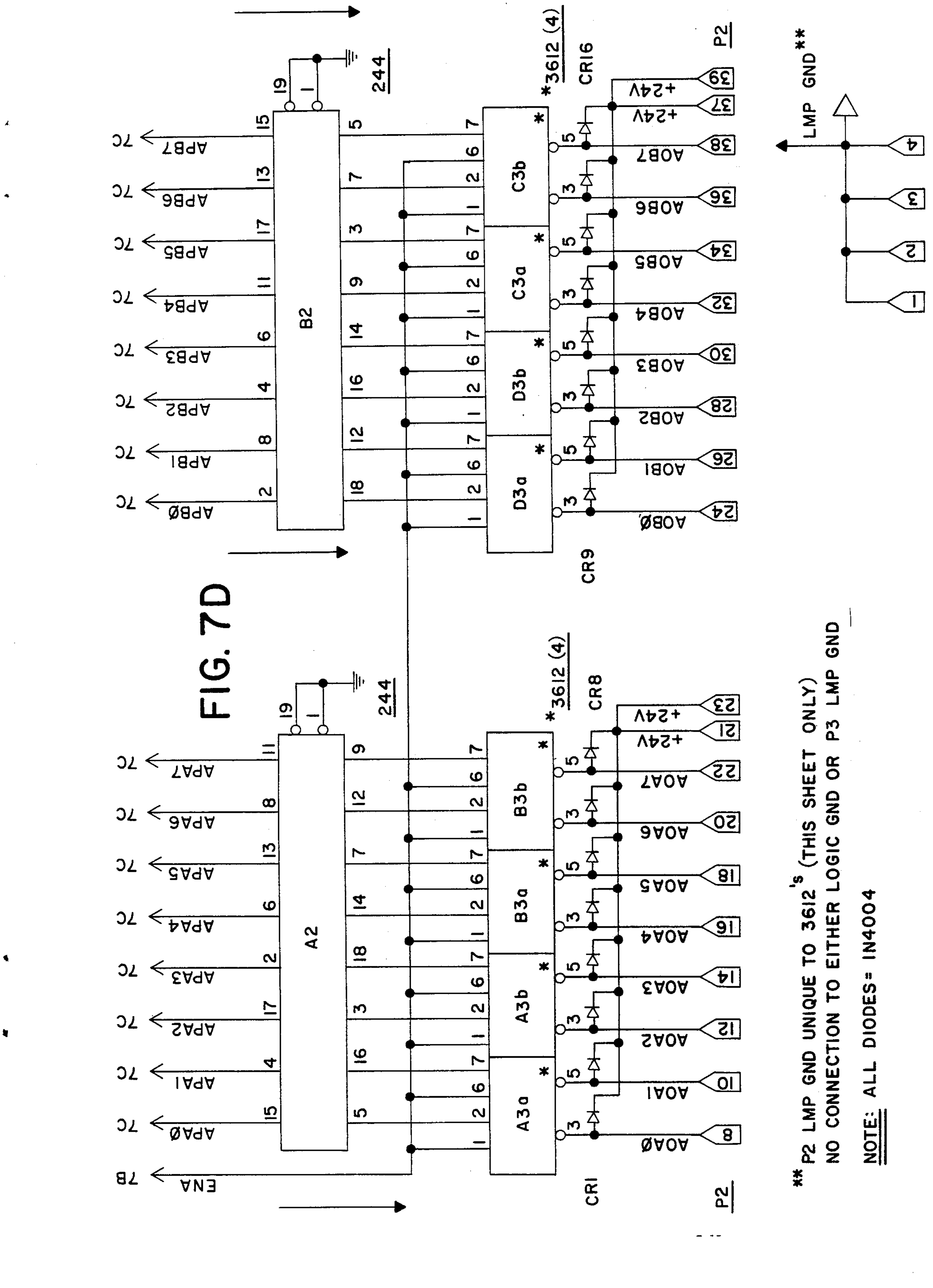
Figure 7E:
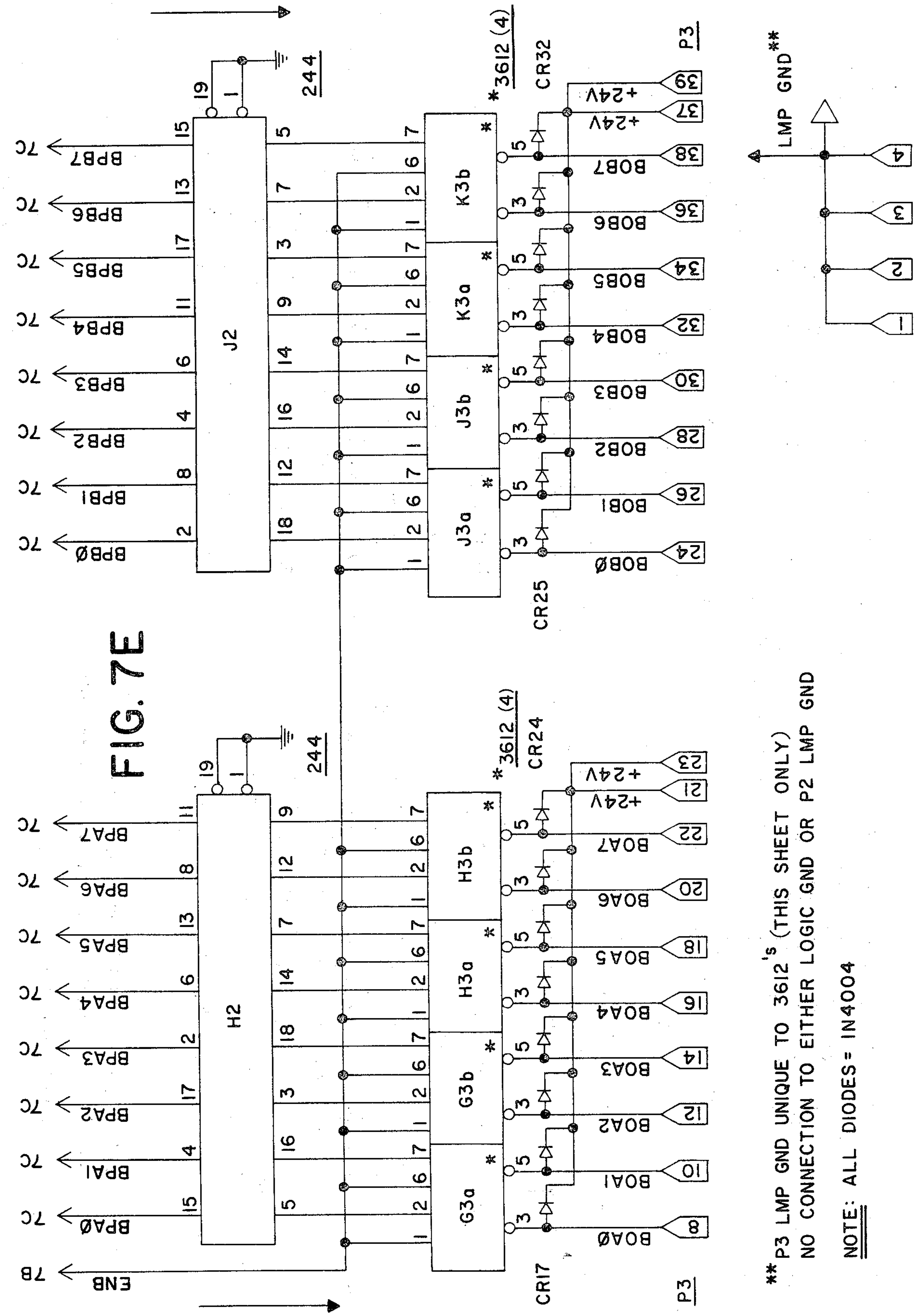
Figure 8A:
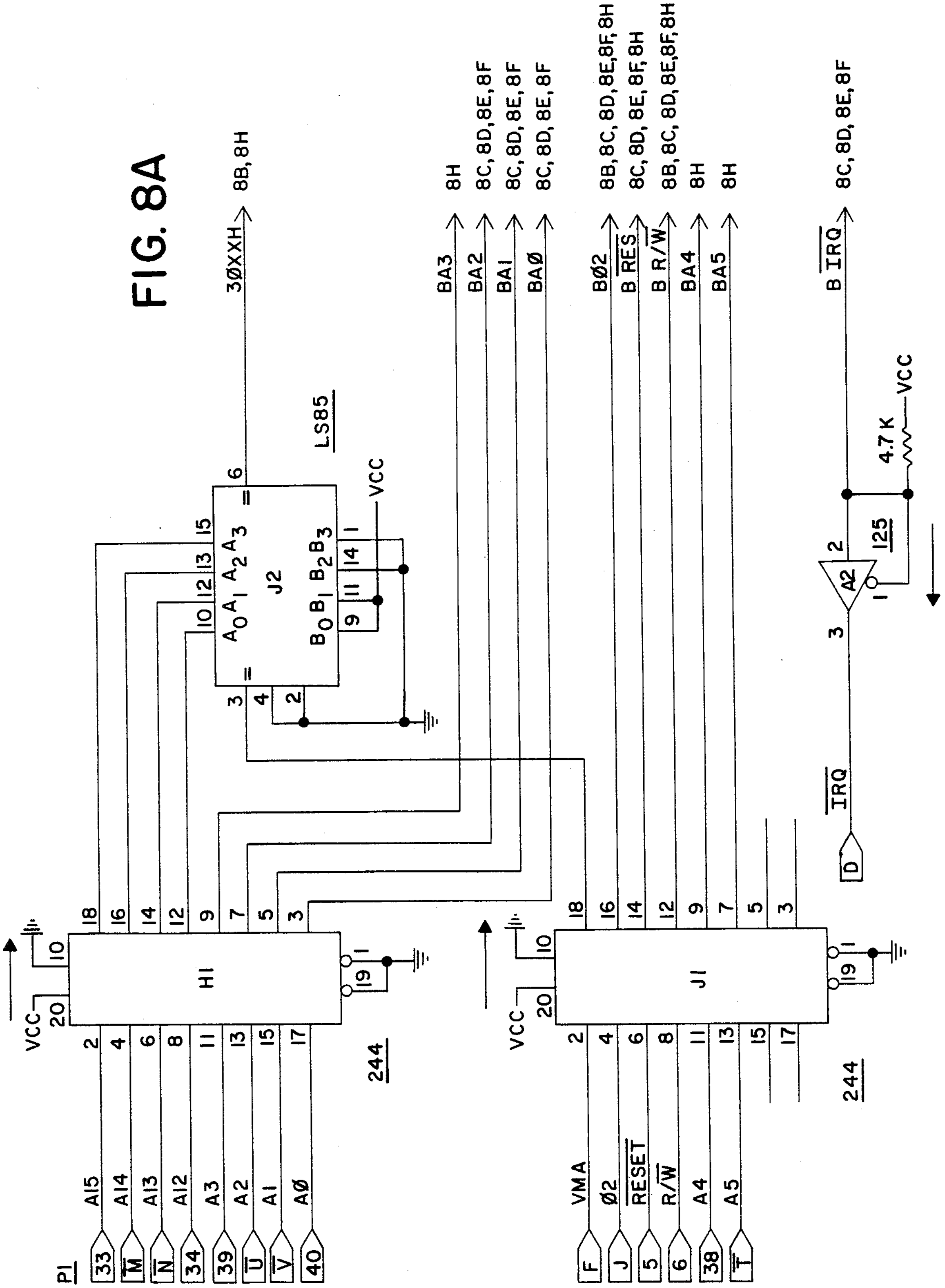
FIGS. 8A–8I are detailed schematic diagrams of the counter and timer module shown in FIG. 2.
Figure 8B:
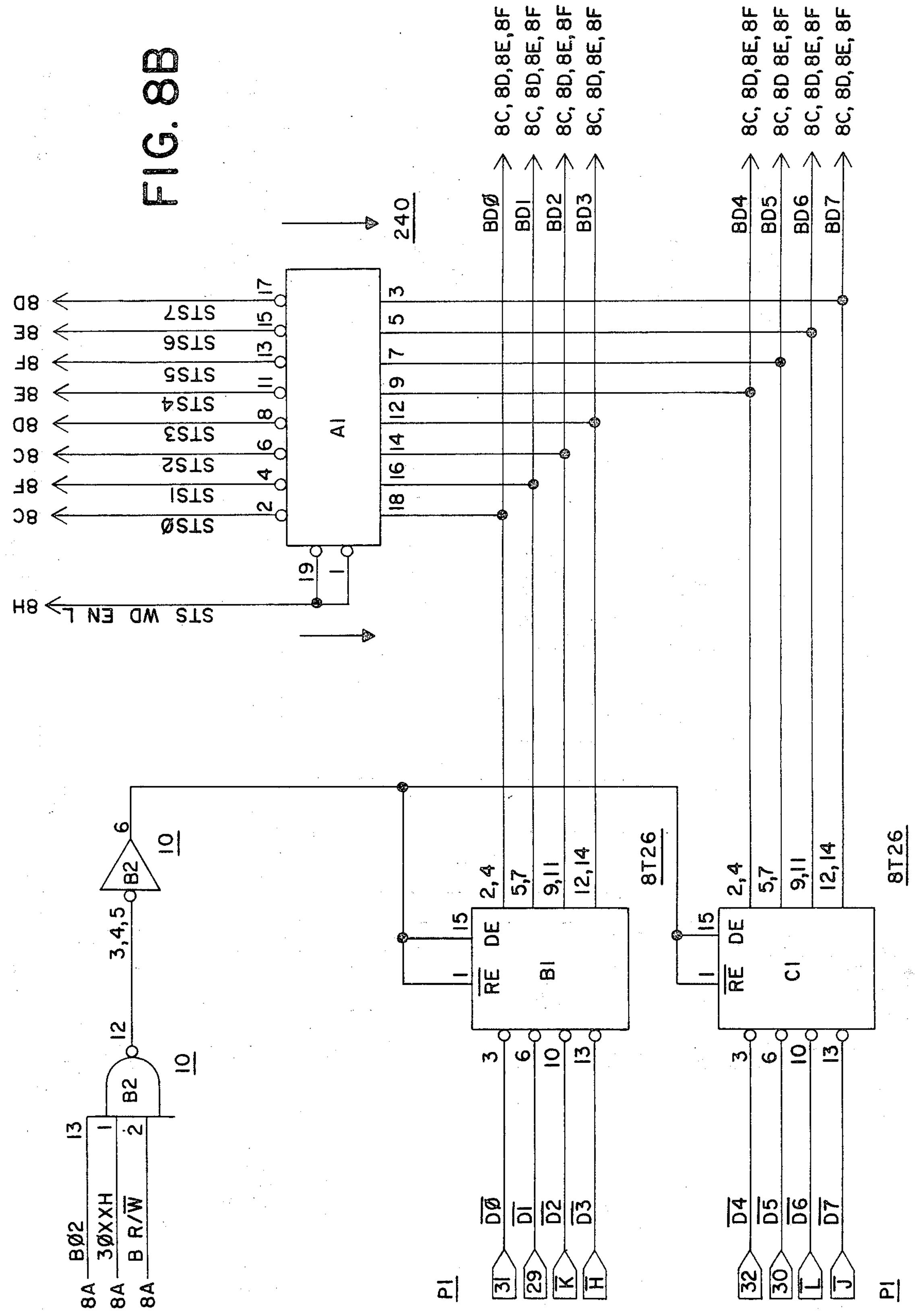
Figure 8C:
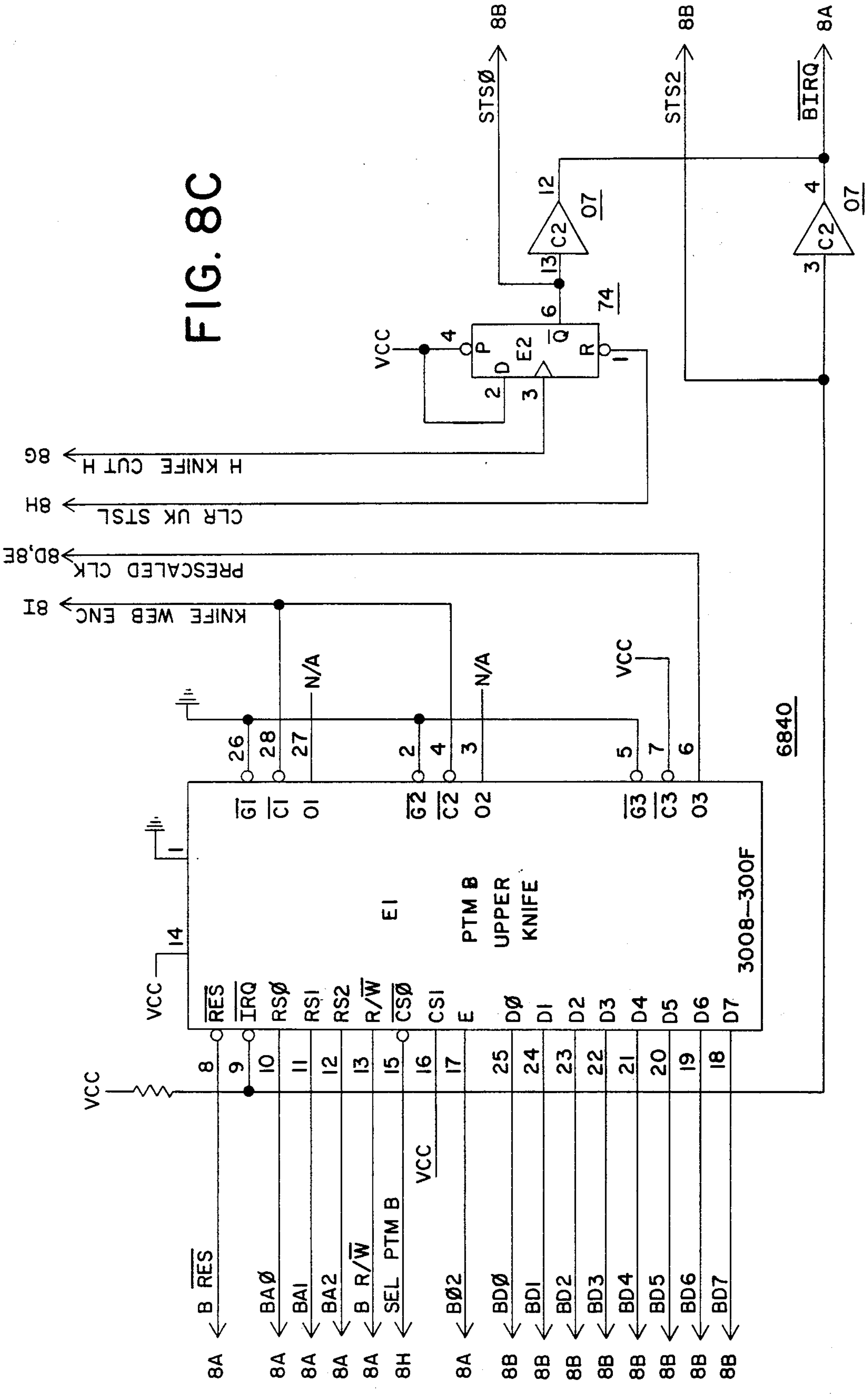
Figure 8D:
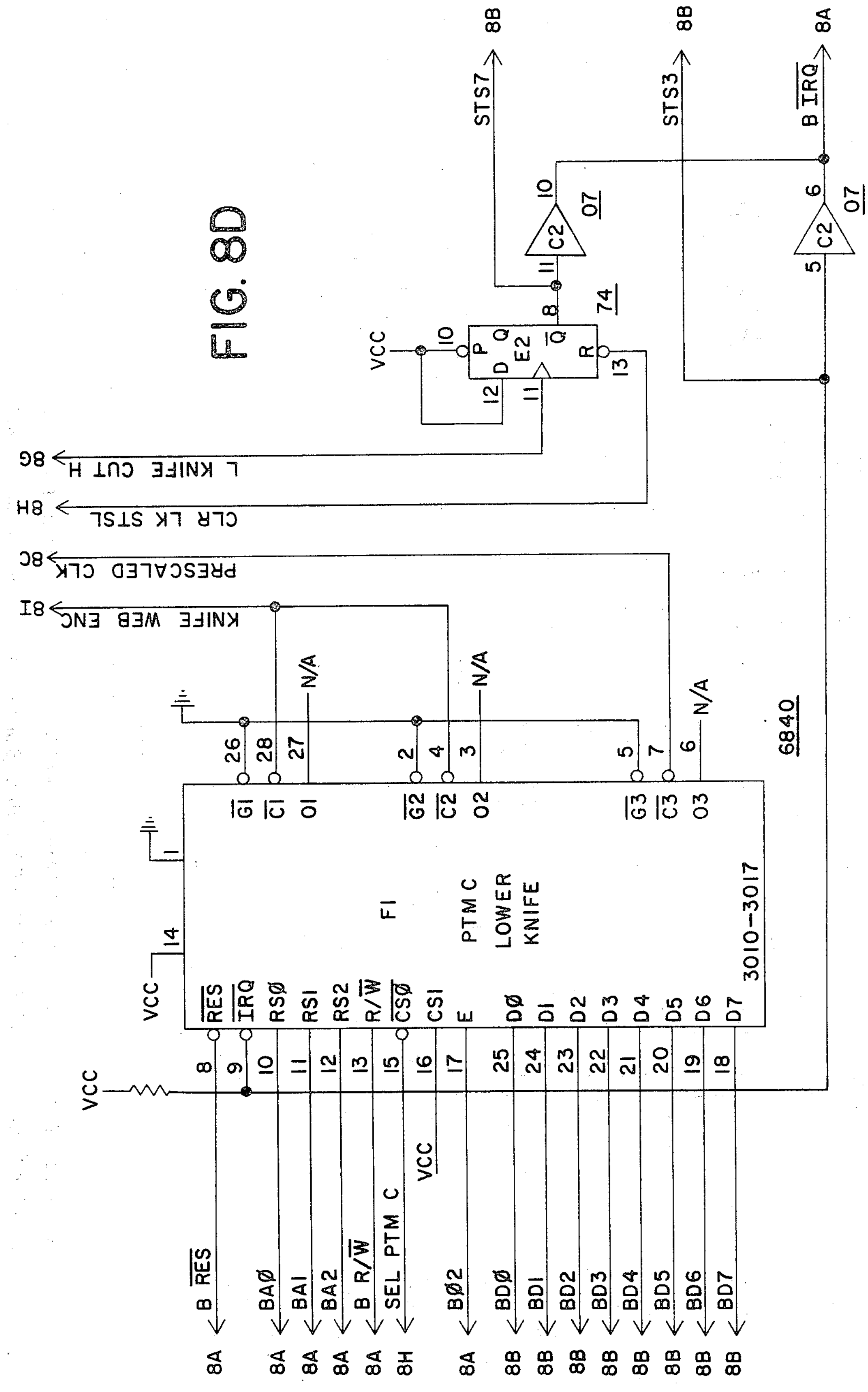
Figure 8E:
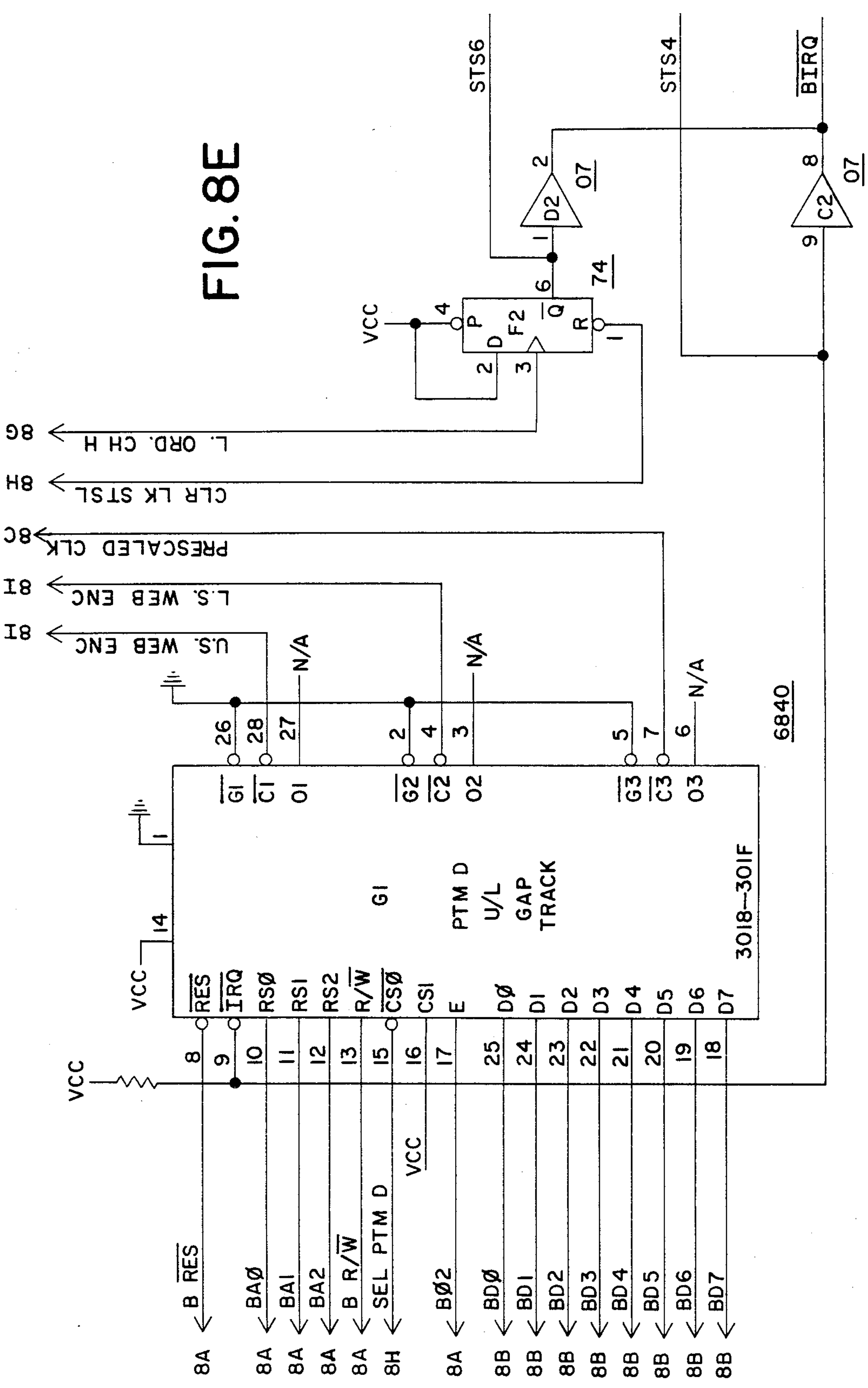
Figure 8F:
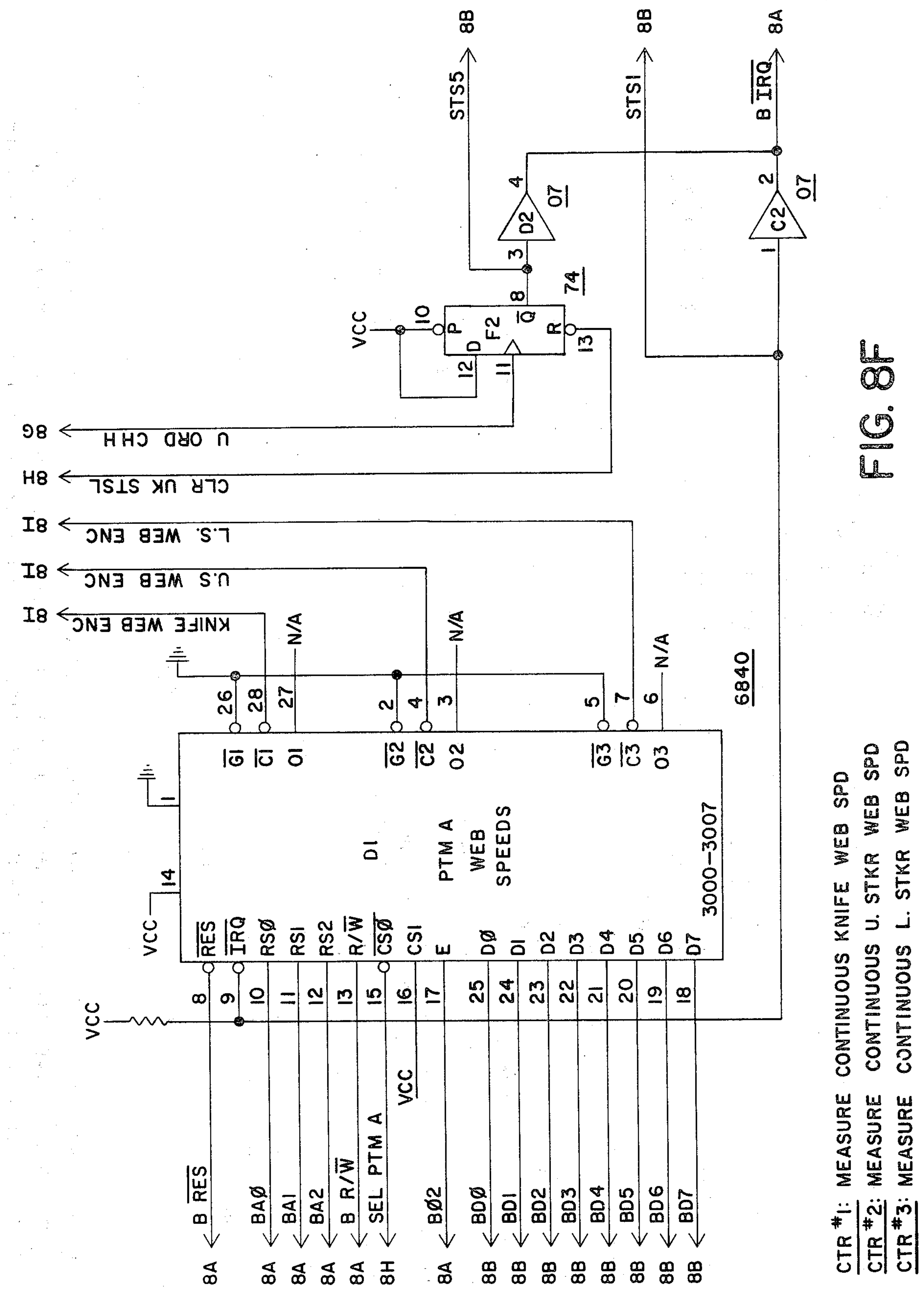
Figure 8G:
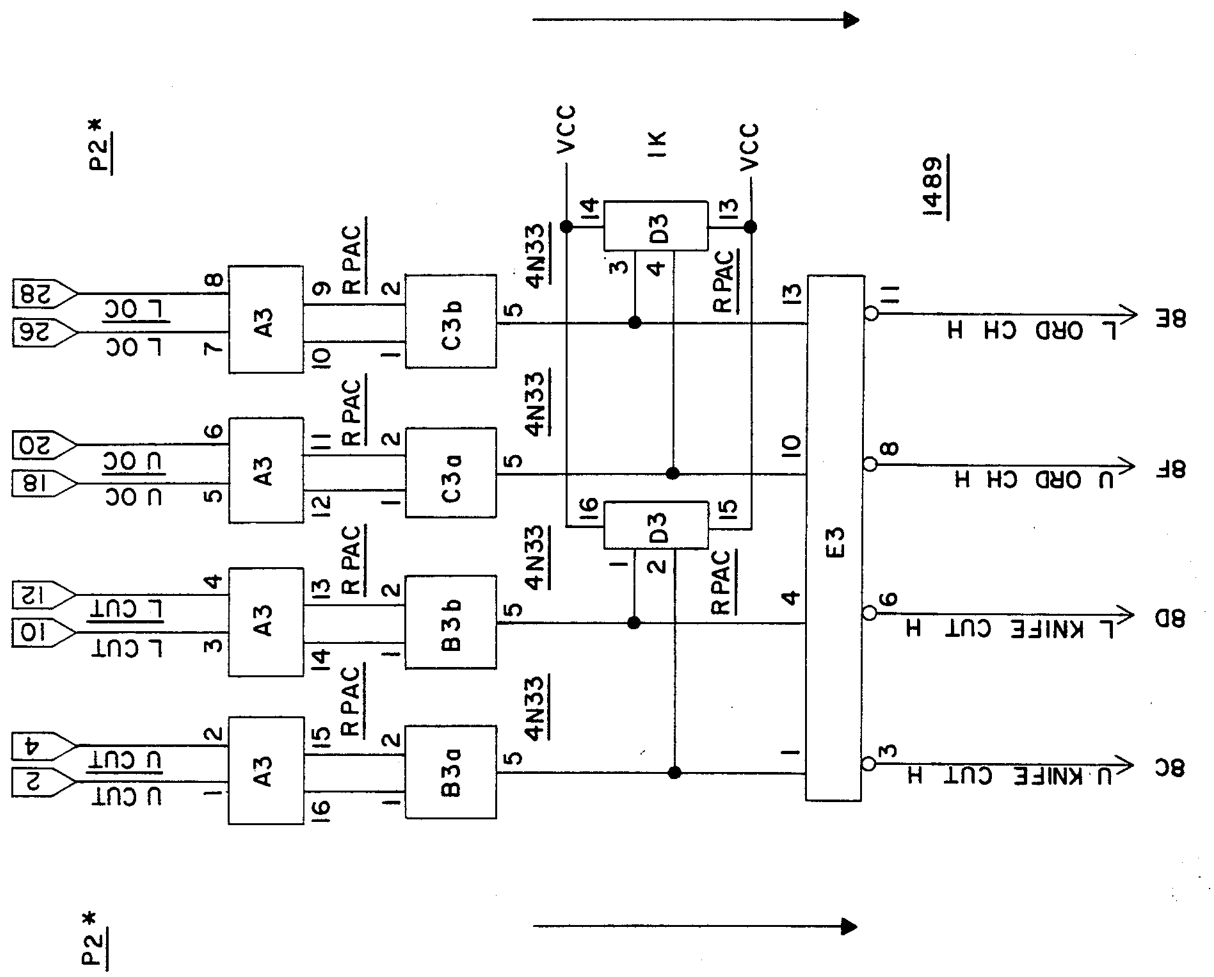
Figure 8H:
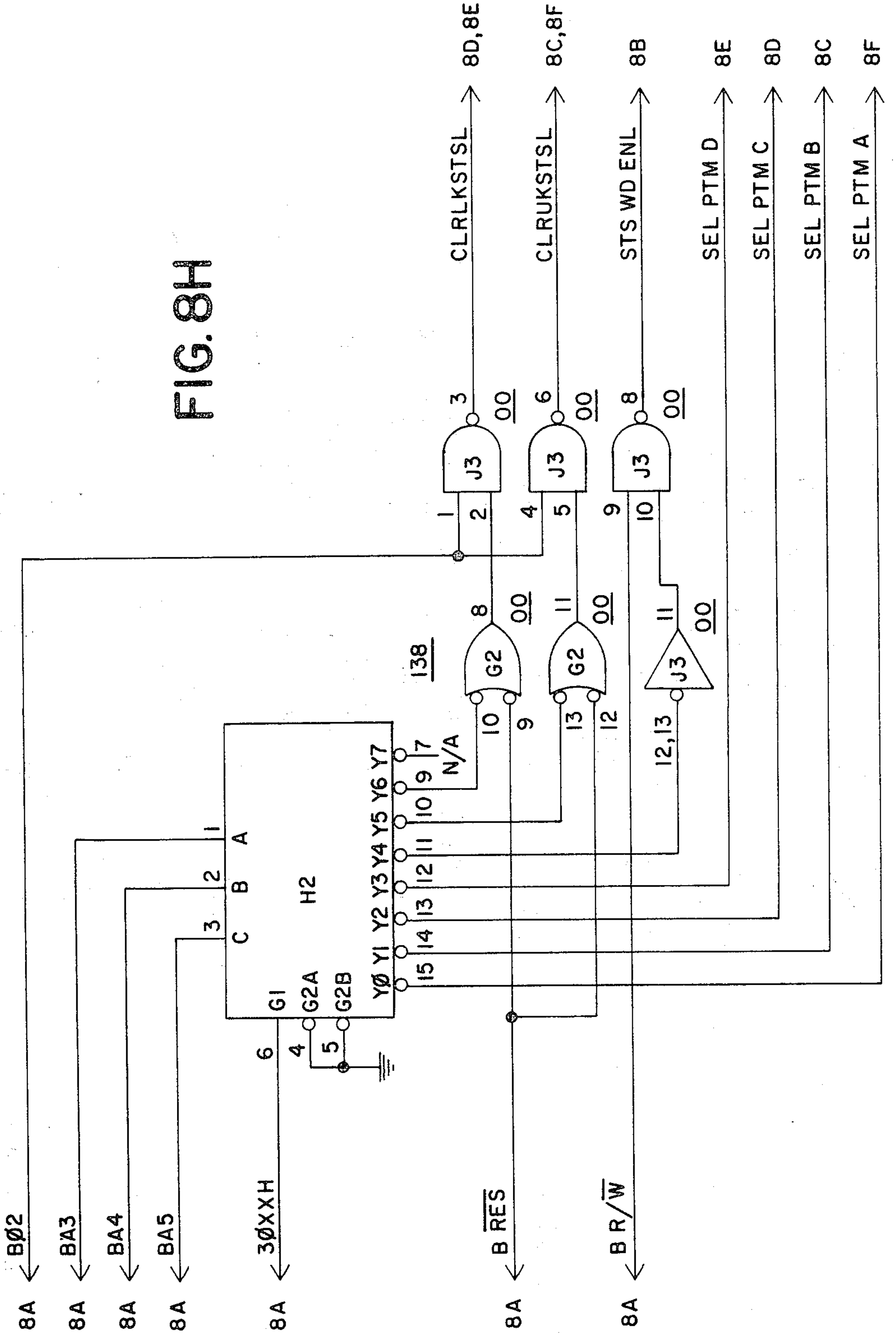
Figure 8I:
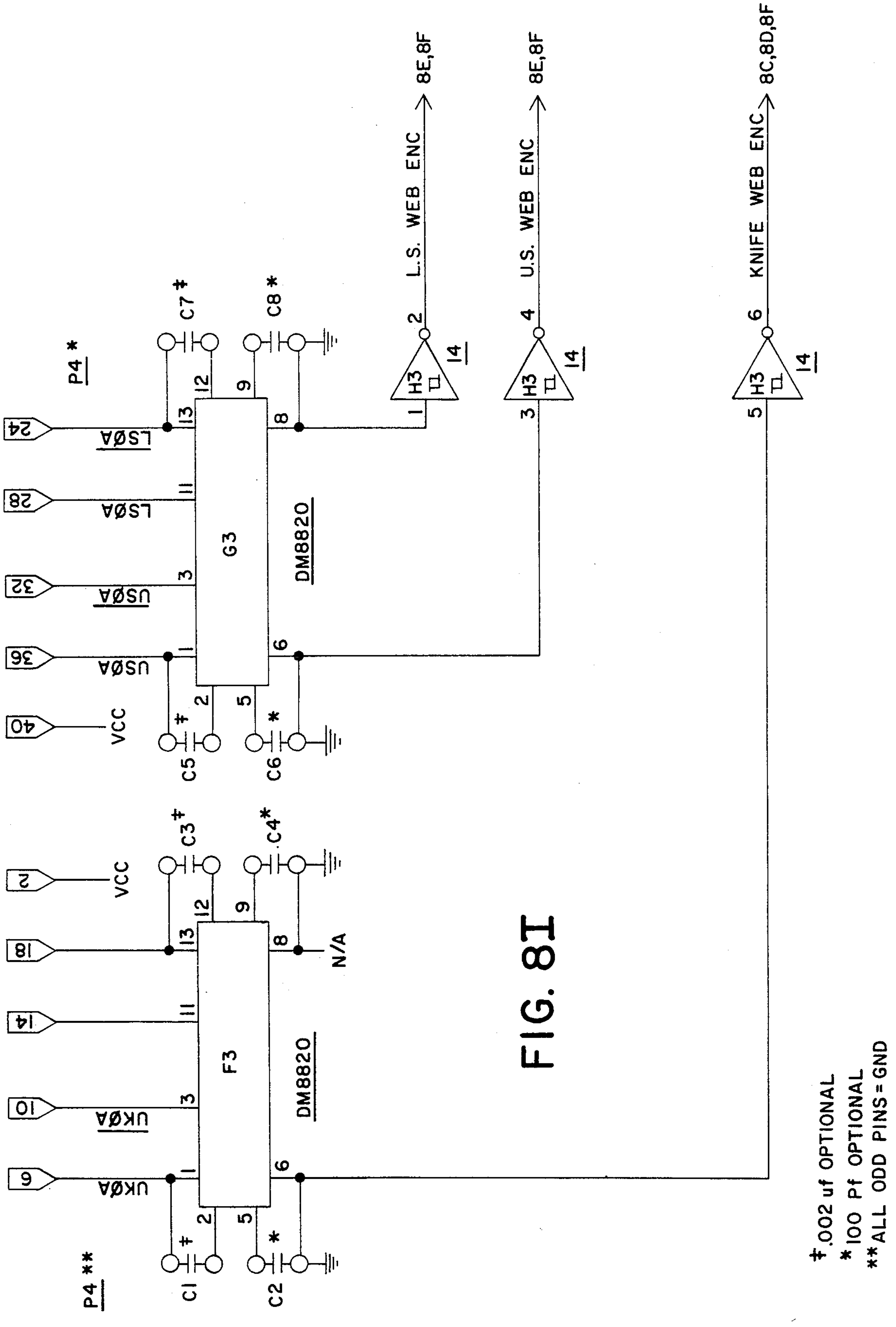
Figure 9A:
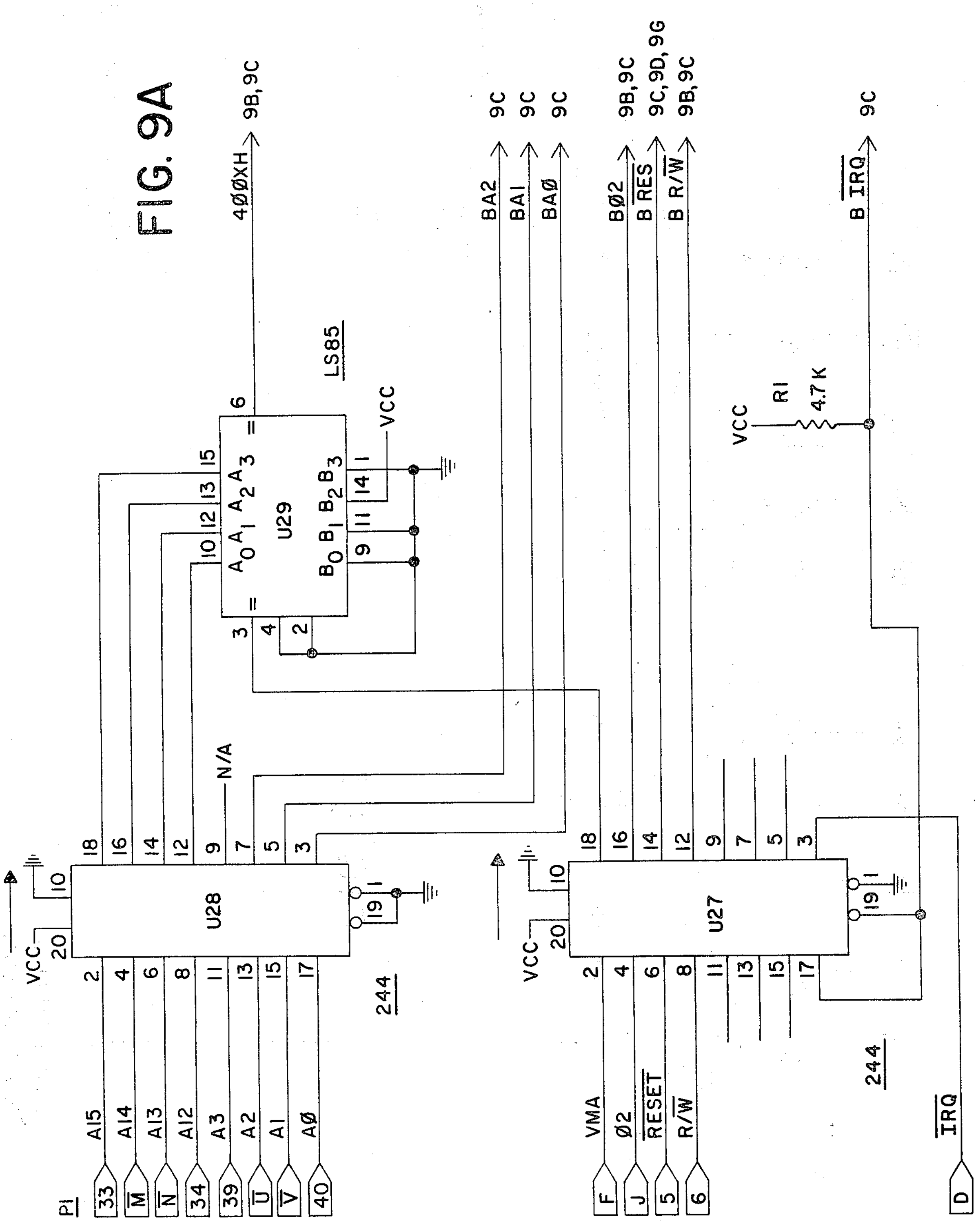
FIGS. 9A–9H are detailed schematic diagrams of the automatic warp prevention control panel circuitry (operator input/output module shown in FIG. 2), including the operator input/output controls for switch inputs and outputs for display lamp drivers and other related output devices.
Figure 9B:
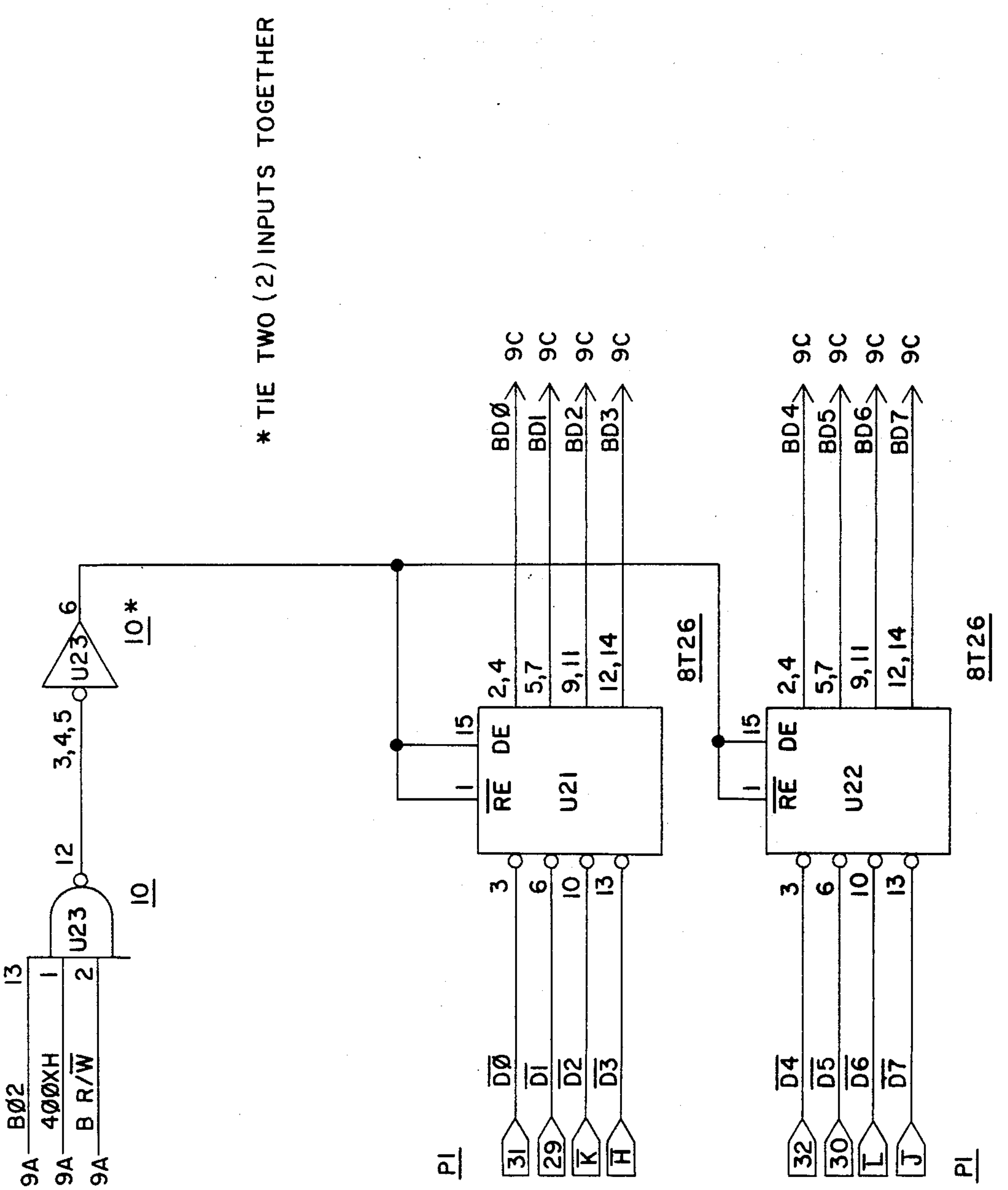
Figure 9C:
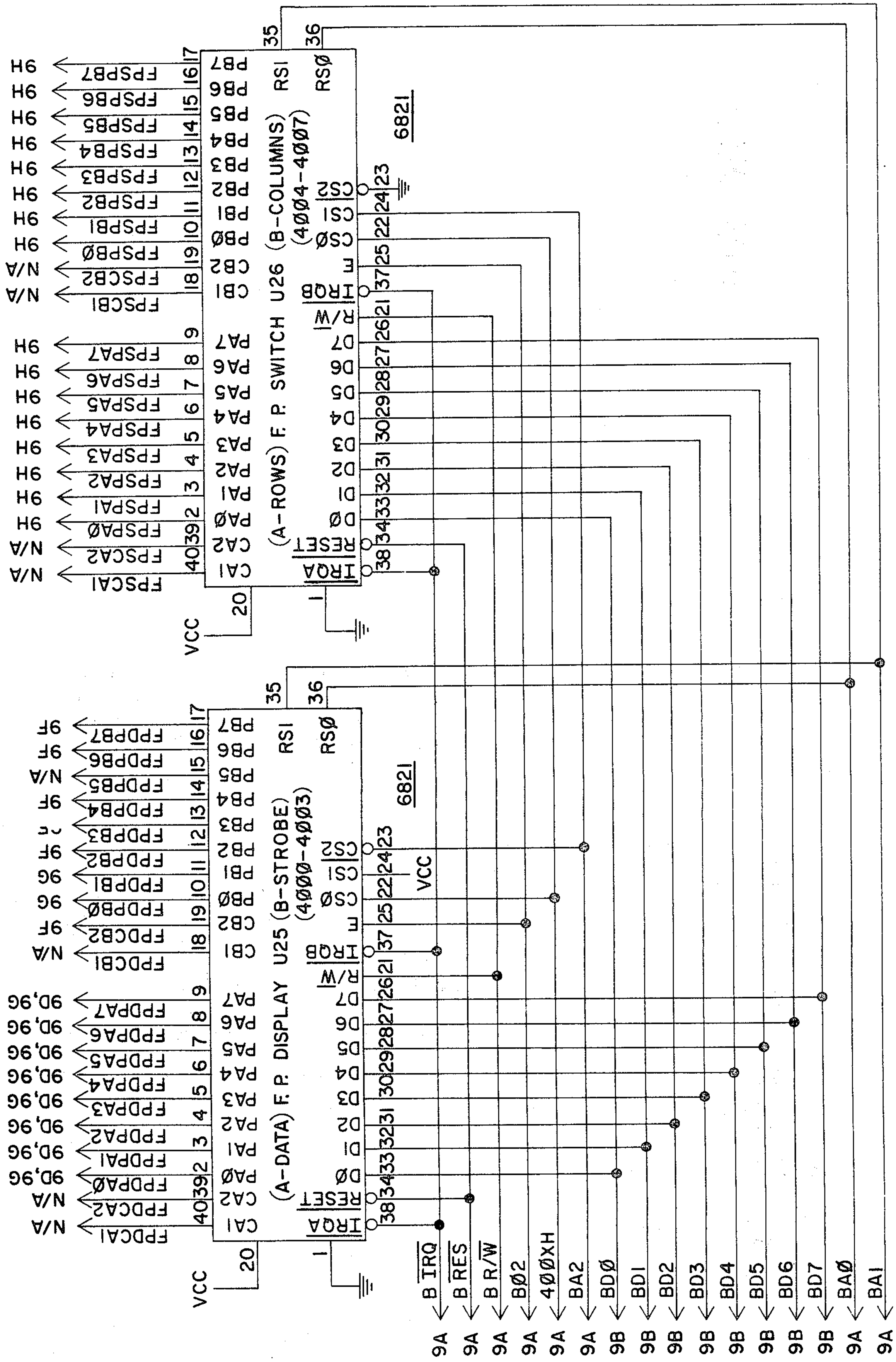
Figure 9D:
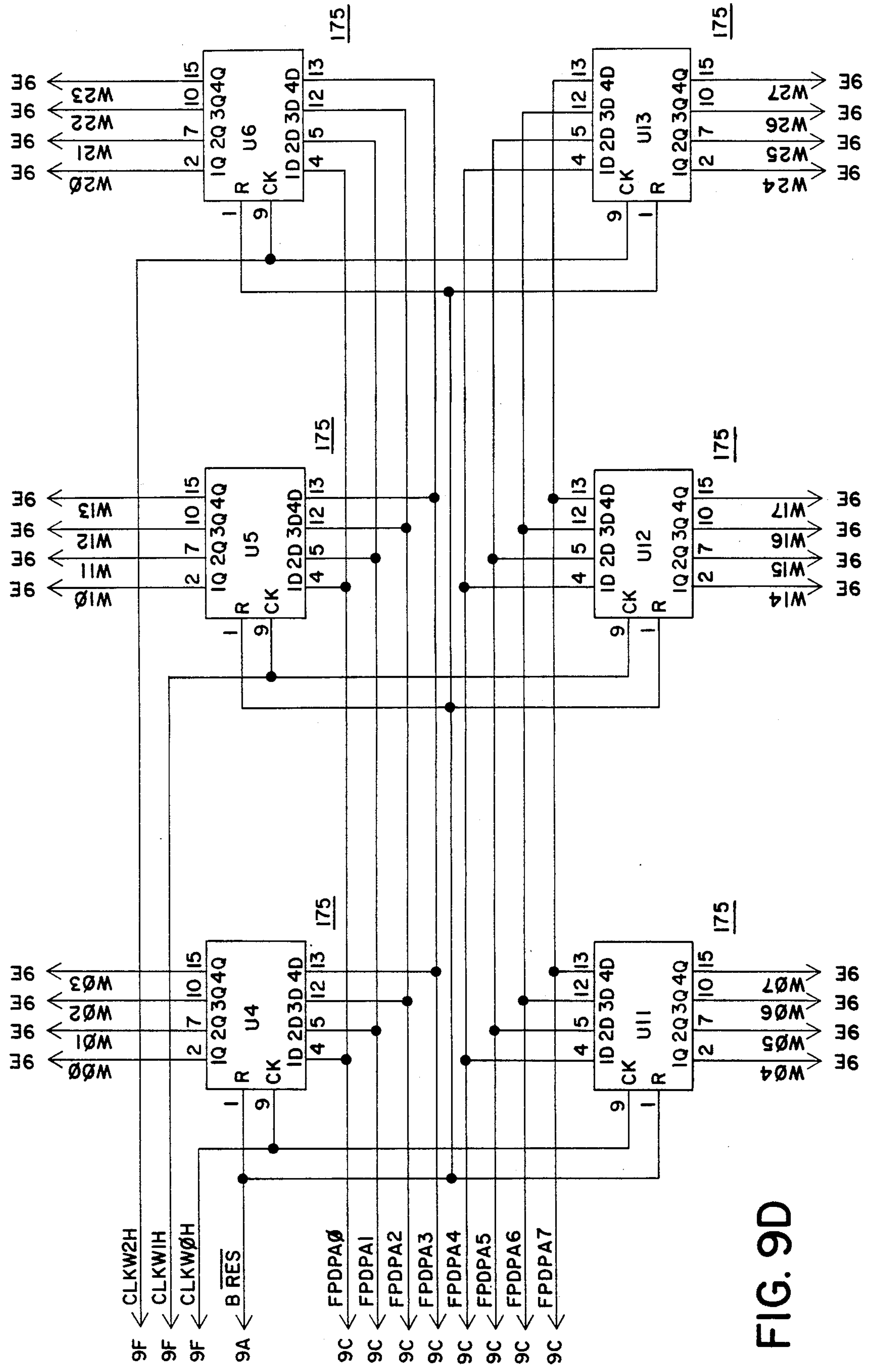
Figure 9E:
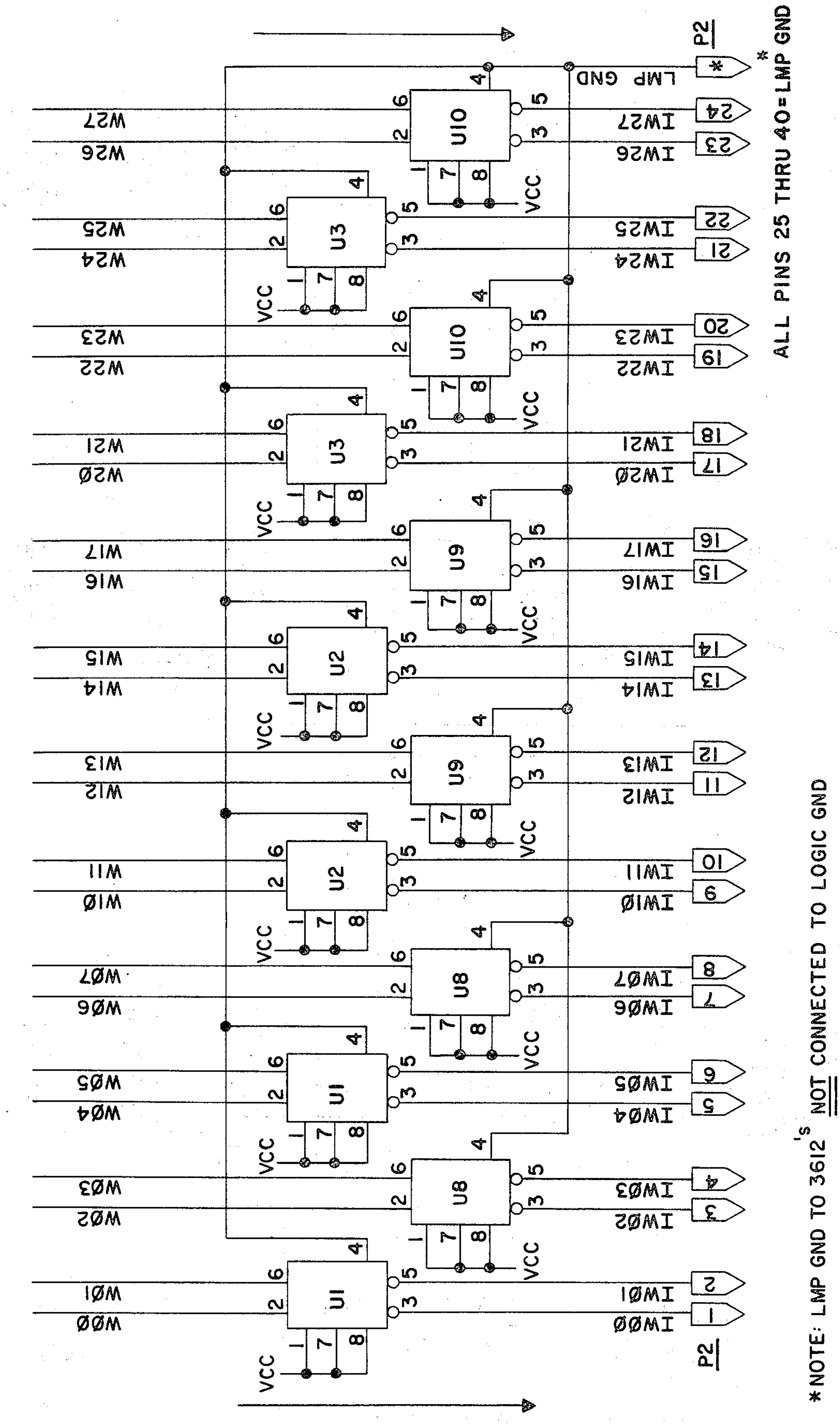
Figure 9F:
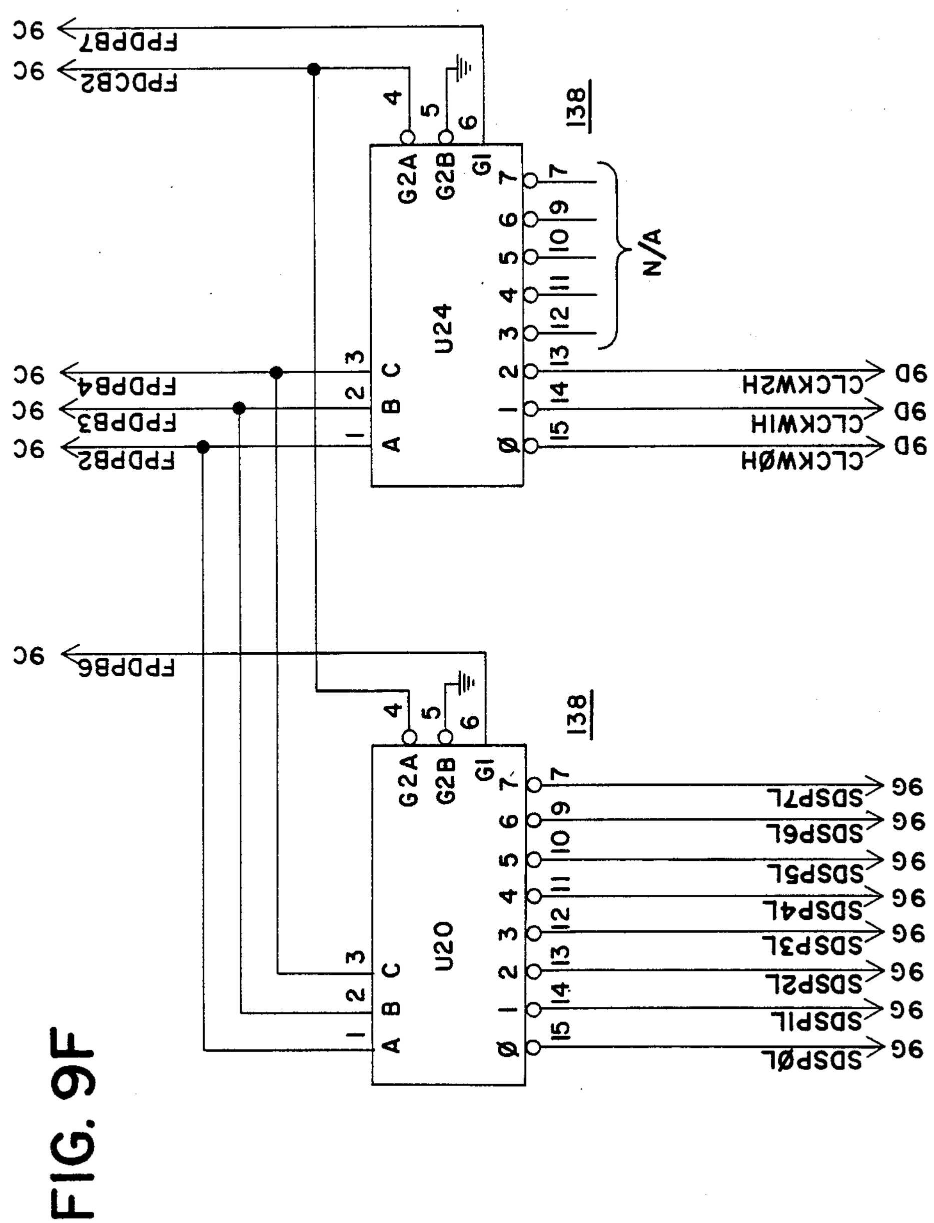
Figure 9G:
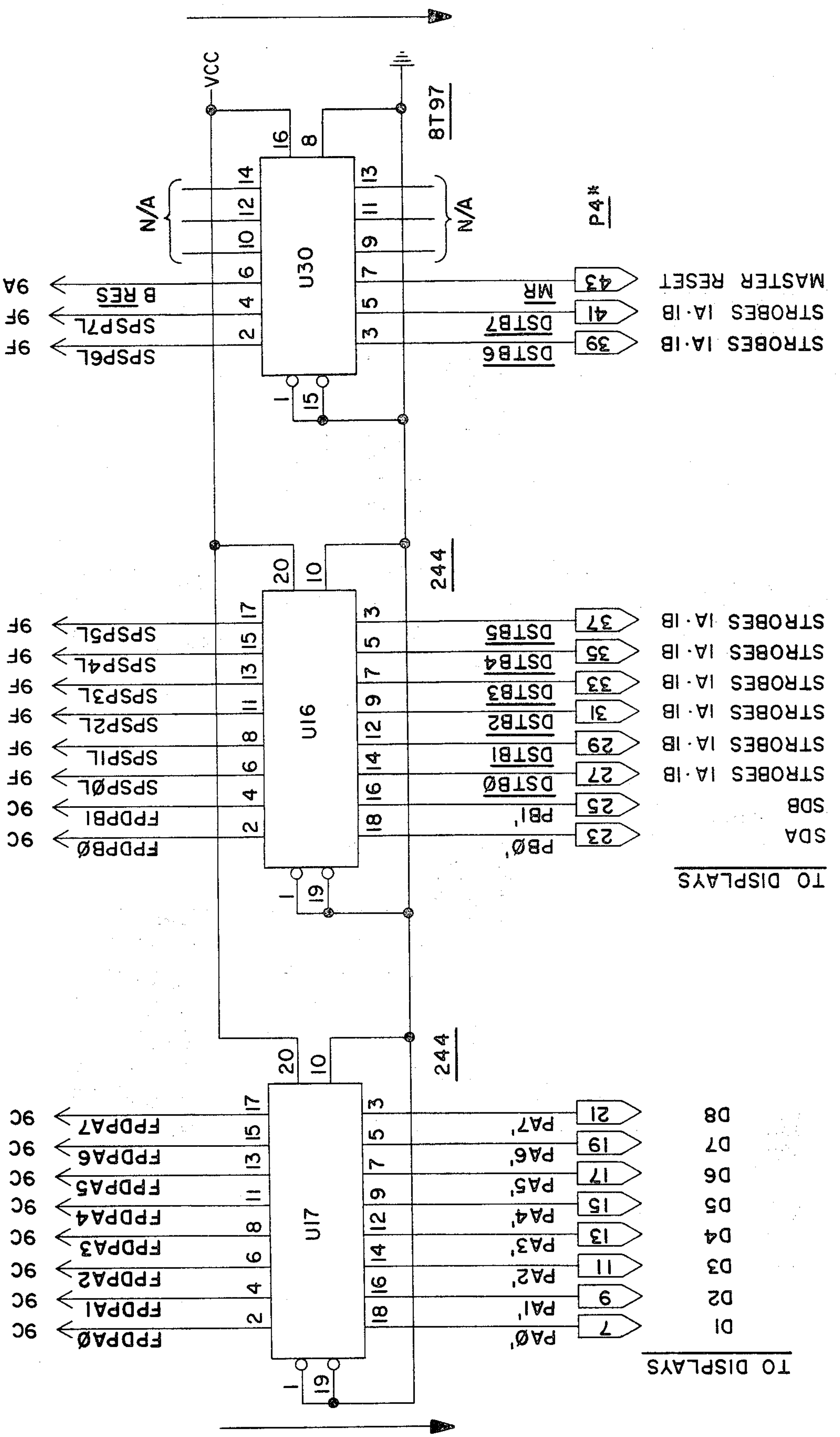
Figure 9H:
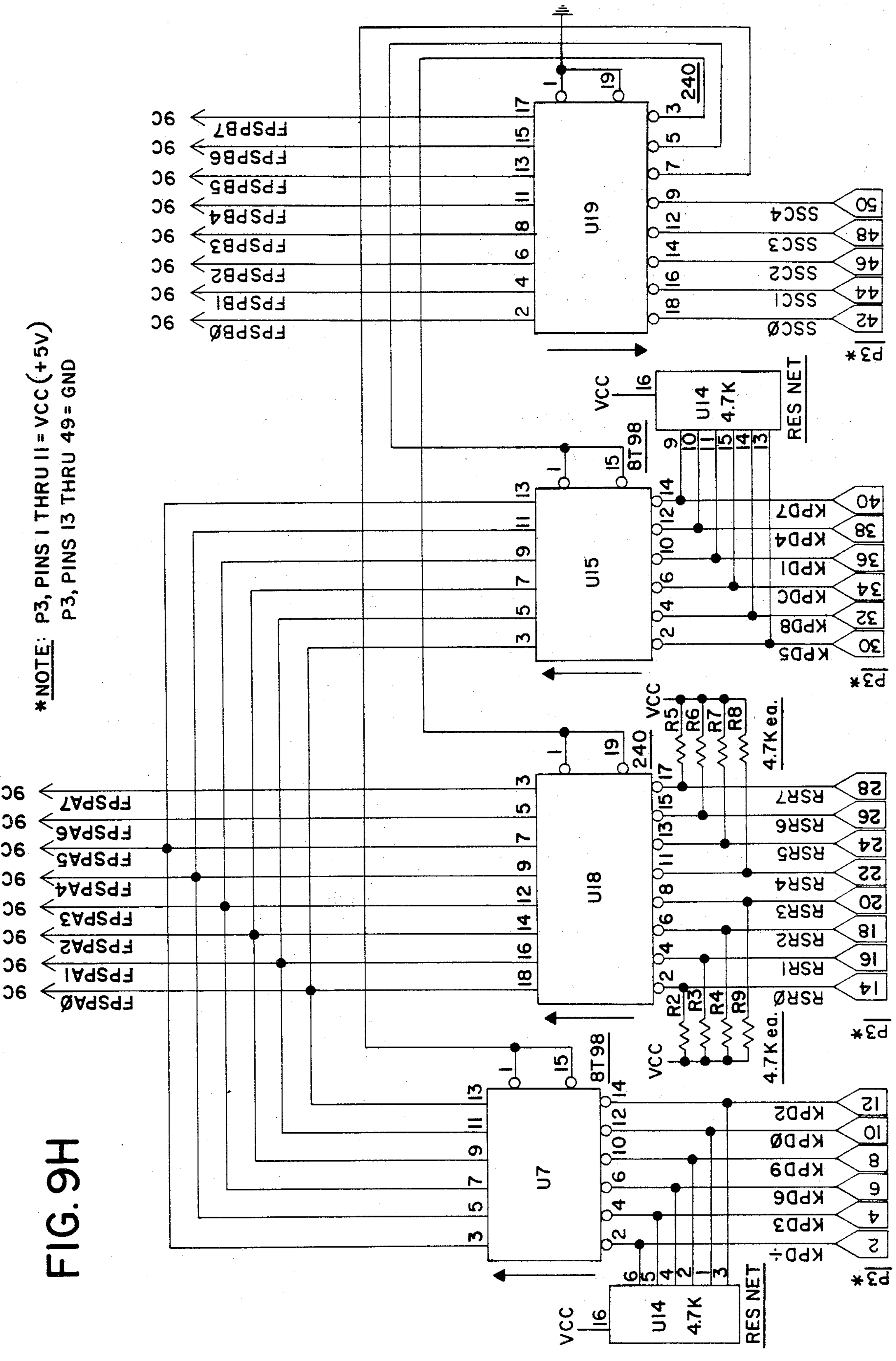

If the control system is in the manual mode by depression of key 121, a scan of the liner can be made to see its moisture content. As shown in FIG. 5A, this is initiated by depressing scan key 137 of keyboard 84. Depression of the scan key is detected by the central processing unit since all key positions are periodically checked by the CPU. The scan lamp 164 is then energized to inform the user that the key depression has been sensed and the scan cycle initiated. At this point, the control system via output module 130 energizes relay 5 CR (see FIG. 7D) and a timer cycle counter is initiated. Relay 5 CR is connected to the scan mechanism control module 73 (see FIG. 3) to initiate the transversal of moisture detector 70 across the path of the double face liner. At intervals of 0.1 seconds, the time cycle counter generated by the counter/timers module 132 (FIG. 2) is decremented by one count and checked to determine if it has reached zero. If zero has not been reached, the cycle continues with the central processing unit checking input data from the moisture detector and in particular sensing the presence of photocell 117 which informs the central processing unit that the beginning of liner readings are about to occur. Thus photocell 117 represents the start of the first zone 78' as shown in FIG. 3.

TABLE 1D

Console Display Format

| DISPLAY | DISPLAY USE: NORMAL USE | DISPLAY USE: SPECIAL USE |
|---|---|---|
| 1 | DFL % Moisture | Memory Address |
| 2 | SFW % Moisture | Memory Data |
| 3 | DFL Speed or Fault Code | Numeric Entry or Present Offset |
| **LED** | **LED USE: Wrap Condition** | |
| 55 | DFL FULL ON | Lit LED indicates the |
| 56 | DFL FULL OFF | preheater wrap con- |
| 57 | * SFL FULL ON | dition shown - |
| 58 | * SFL FULL OFF | "*" items only lit |
| 59 | * SFW FULL ON | if in "AUTO" mode |
| 100 | * SFW FULL OFF | for the SF liner in use. |

If the time cycle counter reaches zero before photocell 117 is detected, the cycle is aborted and an error code CCCC 13 is presented on display 33. This fault code and others used in the system are described in Table 7. If the system is operating correctly and photocell 117 is detected, the central processing unit starts to analyze the raw digital data received by analog to digital (A to D) converter module 126 (FIG. 2) representing the moisture measurements to be sensed from the liner.

The raw digital data has 12 bit resolution. When the A to D conversions for each analog reading are complete, the central processing unit proceeds to write the data into memory locations of RAM 124 (or the 1K RAM within the CPU module 120) which has previously been set aside for receipt of this data (for details see the program listing submitted herewith in microfiche). Such inputs occur at 0.1 second intervals with each moisture measurement placed in the sequential memory locations. The process continues until photocell 117' is detected on the far end of the liner indicating the end of the last zone. If the last available memory location has been used prior to detection of photocell 117', error code CCCC 12 is displayed and the cycle is aborted.

The converted digital data is stored in a form as generated by the A to D converter module 126. The smallest value corresponds to approximately zero volts analog and is represented by the binary number 000 000 000 000. The largest value corresponds to an analog voltage of 10 volts and is equal to the digital value of 111 111 111 111. Linear interpolation of the binary values is made for voltages between zero volts and ten volts. These digital readings therefore represent single moisture measurements and can be considered the raw digital moisture data.

TABLE 1E

Fault Code Chart - Warp Control

| Code | Fault Description |
|---|---|
| 01 | Below MINIMUM SPEED |
| 02 | Attempt SCAN manually while in AUTO mode |
| 03 | REMOTE MANUAL depressed |
| 04 | Out of balance and at limits |
| 05 | Single face liner and double face liner speeds out of tolerance |
| 06 | No web moisture detected above the threshold value |
| 07 | Attempted scan cycle while scan in progress |
| 08 | Illegal key depressed |
| 09 | Attempt to enter AUTO mode while scan in progress |
| 10 | Webs of different width or skewed |
| 11 | Analog/Digital converter not ready |
| 12 | Photo cell 2 (Operator side cell) not working |
| 13 | Photo cell 1 (Drive side cell) not working |
| 14 | Prom not clean. Cannot blow it. |
| 16 | Interrupt problem |
| 17 | Too few samples (photo cell 2 seen too soon) |
| 18 | Moisture exceeds maximum value |
| 19 | Grade data entered was incorrect |

Once the raw digital data for the moisture measurements has been stored, the central processing unit next determines where the edges of the liner actually occur. This process is somewhat involved since readings made by the moisture detector when beyond the liner generally produce negative voltages. Just before the edge of the liner, the voltage generally rises and oscillates until the detector moves inward for several more readings. Thus, the test is to take the raw digital data from the first sample forward to determine where the data value is above a certain threshold value (SFTHR or DFTHR as defined in Table 2) and then determine if there are at least a given number of consecutive readings (variable THRCNT, see Table 2) above this threshold value. The next raw digital data reading above the threshold value which meets this criteria is considered the edge of the liner.

Since the data just after the edge may not be reliable, the central processing unit further discards a certain number of samples after determination of the edge. This is done through use of the variable EDGES (Table 2) which defines the number of readings to discard. This procedure is repeated for the last sample in the reverse direction so as to establish edge placement (sometimes known as the USER or OPERATOR SIDE, see FIG. 3).

The actual value set for SFTHR, DFTHR, THRCNT, and EDGES is input to the control system by the operator at setup time so as to allow adjustments to be made at the installation. A complete list of all such variables used in the control program are presented in Table 2.

The central processing unit next determines whether the single face web and double face liner digital readings obtained have their edges skewed beyond a predetermined number of samples as defined by variable SKEW. If the samples are within allowable limits, the two outer edge zones are tested to see if there are a sufficient number of samples in each zone to be considered significant as defined by the variable ZNVAL. The outer edge zones are ignored if insufficient samples are obtained for these zones or if skewing is detected.

TABLE 2

Variables/Descriptions

Only the mnemonic name is given in this table. Capital "XX" in any variable name refers to single face liner ("SF") or double face liner ("DF"). Thus XXTHR means other SFTHR or DFTHR.

I VARIABLES PERTAINING TO SAMPLES

SFTHR Single-facer threshold value. A moisture reading above this value is considered a legitimate moisture reading, whereas a moisture reading below this value is considered a false reading. This allows the computer to determine if paper is beneath the moisture analyzer beam at any given time in a scan cycle. The moisture reading is normally a negative voltage when "no paper" is under the analyzer beam. The value used represents the digital equivalent of the voltage read by the computer via the analog to digital converter. The converter contains 12 bits making the highest possible value equal to 4095. This is equivalent to 10 volts. To set the threshold to a particular positive voltage level, the equation N=409.5 V is used where V is the desired threshold voltage, and N is the number to insert into SFTHR.

DFTHR Same as SFTHR except for the double-face liner moisture readings.

SAMPLS Represent the end counts in 1/10 second increments of each zone. There are generally 12 zones, each with a width of 8 inches (cm) to accommodate zonal water spray bar 28 (see FIGS. 1 and 4). The computer starts to make moisture readings at 1/10 second intervals when the input from photocell A (on drive side of scan mechanism, see FIG. 3A) is detected. Cell A is placed to coincide with the beginning of the first drive side spray zone (zone 1 shown in FIG. 4). To determine the correct number of moisture measurements for a particular zone, the following equation is used:

$$t_n = (S_n \div V)10$$

where $S_n$ equals the end of zone in inches

V equals velocity of scanner in inches per second and $t_n$ equals time in 1/10 seconds e.g. scan rate is 4 inches per second, 8-inch zones zone 1; $T_1 = (8 \div 4)10 = 20$ measurements zone 2; $T_2 = (16 \div 4)10 = 40$ measurements FDGSF Factor to convert the single face measured (through A/D converter module 126, see FIG. 2) digital moisture voltage valve (variable X) to moisture percent of the form M=A+Bx

| | | |
|---|---|---|
| where M | = | moisture in 1/100% increments |
| A | = | moisture sensing offset in 1/100% increments (variable SFMOFF for SF liner) |
| B | = | FDGSF multiplier factor (from lookup tables, see Section IV herein) |
| x | = | measured moisture digital value where full scale equals 20.48, |

The value of FDGSF used in the lookup tables can be experimentally determined as shown in the following examples:

Example 1. Offset factor is zero, full scale is 10% moisture, M is 10% moisture at full scale (10 volt reading)

$$10.00 = 0.00 + B\,(100\%)\,(20.48)$$
$$10.00 = 0.00 + 2048B = 2048B$$
$$B = 10.00/2048 = .0048828$$

enter 004882 (or 004883) into FDGSF

Example 2. Offset factor is +1.00%, full scale is 12% moisture, M is 10% moisture 75% full scale (7.5 volt reading)

$$10.00 = 1.00 + B(75\%)(20.48)$$

$$B = \frac{10.00 - 1.00}{(75)\,(20.48)} = \frac{9.00}{(75)\,(20.48)} = .0058593$$

enter 005859 into FDGSF

NOTE: 20.48 is obtained from highest equivalent digital value of 4095 divided by 2 divided by 100=20.475 rounded to 20.48

Same as FDGSF for the double face liner.

SCPULS Time the start scan pulse maintains the start scan relay (relay 5CR, see FIG. 7D) energized in 1/10 of a second increments. This is nominally set to 50 (5.0 seconds.0 Photocell 1, the drive side photocell must be detected by the computer within this time period or an error is considered to exist in the system.

ZNVAL This is the minimum number minus 1 of required acceptable samples (values above XXTHR) before samples of a given zone are used in the moisture calculations. For example if ZNVAL equals 16, then 17 acceptable samples must be available in any zone before that zone's data can be used. This variable permits judgment as to the reliability of data in the outer edge zones of the web and in particular can be used to establish whether water should be applied to the outer edges of the web by requiring at least a certain minimum amount of material in these outer zones. Each sample represents 0.1 second increments so that the amount of web within a zone is determined by the scan mechanism traversing rate. Typically, the web should fill at least ¾ of the zone before spray is permitted in the zone.

EDGES Number of sample readings to disregard at each edge of the web. Moisture readings obtained at the edges of the web are not reliable due to potential curling and flapping of the edges. See THRCNT for a more detailed description and example. The value of EDGES is nominally set at 4.

NXMOIS Maximum acceptable moisture reading in 1/100% moisture increments. It is generally adjusted to the highest possible reading obtainable as determined by the values used for FDGXX and XXMOFF. If a higher reading is measured, the computer generates an error code.

TDNMSC A time out in 1/10 of a second increments after detecting the drive side photocell 171 (see FIG. 3) on return to the home position by the moisture detector until the "scan complete" signal is generated (scan light de-energized.) This is used to allow sufficient time for the scan mechanism to reach its limit switch 82 (see FIG. 3) and stop. This prevents erroneous restarts of the scanners before they have "parked" at home. Nominal value is 50 (5.0 seconds).

SKEW Allowable skew period between the double face liner and single face liner edges in 1/10 of a second increments. This is used to determine if the scan mechanisms are starting and reaching their corresponding edges of the paper at similar times. If the difference between the corresponding edges fall outside this time period, an error is generated and the moisture readings are not used to make corrections. Improper park limit switch settings or different width rolls can cause this error to occur. A nominal value is 20 or 2.0 second increments.

THRCNT Consecutive acceptable readings required for detecting an edge. The computer examines the moisture readings and looks for consecutive readings, as determined by THRCNT, where the moisture is above XXTHR (where "XX" is SF or DF). After determining where these consecutive acceptable readings occur, it goes to the first nearest the edge and discards the number of samples as determined by the value in EDGES.

Example=Samples 1, 2 and 3 are below XXTHR. Samples 4 and 5 are above XXTHR, sample 6 is below, and samples 7 through n are above. If THRCNT is set to 5, and, EDGES set to 4, the computer will determine that sample 7 represents the edge of the web, discard samples 7, 8, 9 and 10 (because EDGES equals 4) and make use of the data starting at sample 11.

NOTE: If sample 11 through last sample of the same zone (SAMPIS) do not represent a sufficient number of samples for that zone (as determined by variable ZNVAL), all samples from that zone are disregarded.

AVGPCT Percent of old average zone reading to be used in each zone moisture calculation. Due to measurement inaccuracies and paper inconsistancy the small number of samples within a zone may not always be as consistent as desired for use of water spray. Therefore, to determine a trend in each zone an averaging technique is used. The averaging technique also tends to reduce over reaction by the system. The zonal time average moisture percentage ($TAVGSF_z$ or $TAVGDF_z$) is defined by the assignment statement, $TAVGXX_z$=[(AVGPCT)×(Last $TAVGXX_z$)+(100-AVGCT)×(New $MAVGXX_z$)]÷100

For example, if the last zonal time averaged moisture ($TAVGSF_6$) in singleface liner zone 6 was 5.05%, the new zonal count average percentage ($MAVGSF_6$) for the zone is 6.00% and AVGPCT is 55%, then the value used by the system is:

$TAVGSF_6$=[(55)(5.05)+(100−55)(6.00)]÷100=5.-47%

SFMOFF Moisture conversion offset factor in % moisture. This represents "A" in the conversion factor described for EDGSF.

DFMOFF Same as SFMOFF, but for the doublebacker liner.

II Variables Pertaining to Wrap Arm Adjustments

FLSON Time in seconds for the flashing lights MOVING WRAP ARMS 80 (see FIG. 1) to be energized during the total flashing period of FLSOFF. Nominally set to 5 seconds.

FLSOFF Total flashing period. Nominally set to 10 seconds. The nominal value stated allow the lights to be lit one half the time whenever the wrap arms are moving or are about to move.

SCNRATV Delay in 1/100 of a foot increment of the moving web (SF web or DF) before another scan is made when no correction was made on the present scan.

DLYSC1 Delay in 1/100 of a foot increment of the moving web (SF web or DF) before another scan is made when a correction is made during the present scan for the double face liner.

DLYSC2 Same as DLYSC1 except correction made at single face liner number 1 (roll 34, see FIG. 1).

DLYSC3 Same as DLYSC1 except correction made at single face liner number 2 (roll 34', see FIG. 1).

TOL Deadzone tolerance in increments of 1/100%. This variable provides an adjustable tolerance zone around the desired average moisture difference (AVG DIFF DF-SF) to prevent constant hunting motion of the wrap arms. This value is adjusted to provide nominally flat sheets without constant readjustment of wrap arms. A typical starting value is 40 (0.40%) which allows the average moisture liner difference (AVG DIFF DF-SF) to vary about a desired average offset moisture value (OFFST1 or OFFST2, see below) by an amount equal to plus or minus the deadzone tolerance before wrap arm adjustment is made. For example, if the average offset moisture value is 1.0% (that is the desired moisture of the double face liner is 1.0% moister than the single face liner) the actual average moisture liner difference (AVG DIFF DF-SF) can vary from 0.60% to 1.40% without wrap arm corrections.

SPDTAB Speed values in feet per minute for look up of wrap arm correction times. There are 10 speed values with piecewise linear interpolation. See DFTAB for example.

DFTAB Multiplying factor to determine amount of time to move wrap arm. There are 20 multiplying factors with piecewise linear interpolation.

For example, present double face liner speed is 450 feet per minute, average offset moisture value (OFFST1 or OFFST2) is +1.00%, present average moisture liner difference is +1.50%, TOL deadzone is 40 (0.4%)

Variation from desired average moisture difference=+1.50%−1.00%=+0.5%

Thus the double face liner has +0.5% more moisture than desired. This value is outside the deadzone tolerance (0.4%) and therefore wrap arm correction is made. If the following values are in SPDTAB and DFTAB,

SPDTAB4=325; SPDTAB5=400; SPDTAB6=475
DFTAB4=400; DFTAB5=500; DFTAB6=600 then the double face liner speed is between SPDTAB5 and SPDTAB6.

Therefore DFTAB5 and DFTAB6 are used to determine the multiplying factor:

$$\frac{450 - 400}{475 - 400} = \frac{x - 500}{600 - 500}$$

$$50/75 = (x - 500)/100$$

$$x - 500 = 100 \times 50/75 = 66.67$$

$$x = 500 + 66.67 = 566.67$$

Since present average moisture difference is incorrect by +0.50%, multiplying 0.0050 by 566.67 yields a correction time of 2.83 seconds to increase the wrap angle of the double face liner wrap arm 59 (see FIG. 1). A similar calculation is made to determine the wrap arm correction of the single face liner using variable SF1TAB or SF2TAB (see below) instead of DFTAB. If the single face liner wrap arm cannot move because it is at its minimum position (SF liner and SF web wrap arm minimum wrap limit switches 111 and 113—see FIGS. 1 and 2—are closed), the calculated value of time for the double face wrap arm is doubled. The doubling of the double face wrap arm value also occurs if the absolute moisture value of the double face liner is exceeded.

SF1TAB Same as DFTAB except for single face liner 1 correction.

SF2TAB Same as DFTAB except for single face liner 2 correction.

DLB4MV Delay in 1/10 of a second increments before movement of the wrap arms occur in order to allow warning lamps 80 (see FIG. 1) to flash before movement begins. Nominally set to 20 (2.0 sec).

AUMNSP Minimum automatic speed. If the double face liner is below this speed, the scans are made but no automatic wrap arm movements are made. When the double face liner speed reaches or exceeds this value, a scan is made after one SCNRAT footage delay (movement of the double face liner by this amount).

SPDTOL Speed tolerance. If the difference between the double face liner and single face liner speeds is greater than SPDTOL no corrections are made. An error signal is also generated on the display 33 (see FIG. 5B).

TOOWET Maximum desired moisture content. Moisture content greater than TOOWET in the double face liner generates a double face wrap arm correction to attempt to bring the moisture content below this value. The same type correction occurs for the single face liner except OFFSTX (the wrap arm offset factor) is subtracted from TOOWET to determine the maximum desired moisture content. For example, TOOWET is 7.5% and OFFSTX is −1.0%. If the single face liner overall average moisture exceeds 8.5%, single face liner or single face web wrap is increased to dry that liner.

TOODRY Minimum desired moisture content. Moisture content less than TOODRY in the double face liner generates a double face wrap arm correction to bring the moisture content above this value. Again, the same type correction occurs for the single face liner except that the offset factor is subtracted from TOODRY to determine the maximum desired moisture content.

OFFST1 Wrap arm overall average moisture offset factor for single face liner #1 (single face liner closest to glue machine). This factor determines the desired difference in the overall average moisture content of the double face liner compared to that of the single face liner (actual measurement of moisture is from the single face web).

OFFST2 Same as OFFST1, except it pertains to single face liner #2.

AMINTM Minimum correction of wrap arm if the moisture content of either liner is out of absolute tolerance; i.e. overall average moisture content is greater than TOOWET or less than TOODRY. Units are in 1/10 of a second. This variable normally has little effect on the system since the correction made when absolute moisture tolerance is exceeded trys to bring the moisture content mideway between TOOWET and TOODRY. This correction time is very large and consequently greater than AMINTM.

MXONTM Maximum wrap arm movement. If a calculated wrap arm correction is larger than MXONTM (in 1/10 of a second increments), the correction is made in stages consisting of one MXONTM correction amount, a pause as determined by PSBTWJ ( see below) and additional MXONTM corrections alternated with pauses until the full correction has been achieved. This method helps to reduce undue tension changes in the webs.

PSBTWJ Pause between wrap arm movements. See MXONTM for usage.

III VARIABLES PERTAINING TO WATER SPRAY

MAXSPR Maximum spray level. Regardless of the spray level required, this is the limiting value to which the level can be increased.

NOTE: Spray level is based on calculations made for adding a given amount of water to a type 42 pound liner (i.e., 42 pounds per 1000 square feet, 0.205 kilograms per square meter) to increase its moisture by a designated percent. For example, a spray level of 10 represents adding 10% moisture content to 42 pound liner. The actual water spray level is line speed dependent, the level indicated in the printouts are for a speed of 300 FPM (90 meters per minute).

The following explanation pertains to the damping coefficients and spray offsets listed below from OS1DMI through and including DS2DMD.

Whenever the warp control is in the AUTOMATIC mode and no spray is ON (that is the SPRAY OFF key 116—FIG. 5A—has been depressed), a spray level for each of the 12 spray zones is maintained in the computer memory and on each scan the level for each zone is added to (up to MAXSPR) or substracted from (down to 0.00) an amount to be described. Placing the system in MANUAL mode (depressing MANUAL key 121—FIG. 5A) resets all spray levels to 0.00.

The moisture deviation is determined from:

Moisture deviation $=(DF\%\text{-}SF\%)_n$-(OFFSTX+SPXDIM) where (DF%-SF%) is the zonal time average moisture difference (sometimes called Z Diff, see Table 1A) in zone #n, OFFSTX is the overall average moisture offset factor of the single face liner, (SF1 or SF2) and SPXDIM is the spray offset factor for the single face liner (SF1 or SF2).

For example, if the zonal time average moisture difference in zone 4 is +1.00%, OFFST1 is −1.00% and SP1DIM is +0.50% (assume single face liner #1 is in use) the moisture deviation is:

$$\text{Moisture deviation}_4 = (+1.00) - (-1.00 + 0.50) = +1.50$$

If the result is positive the spray level is increased by an amount equal to the moisture deviation multiplied by one of the increase damping (gain) coefficients. Conversely, if the result is negative, the spray level is decreased by an amount equal to the moisture deviation multiplied by one of the decrease damping (gain) coefficients. Which coefficient is used depends on which single face liner is in operation and whether an overall spray change is to occur (all zones require moisture) or only some zones require spray change (differential spray).

Continuing the example above, where the moisture deviation is +1.50 in zone 4, the gain factor (DS1DMI) is 1.500 (single face liner #1 differential spray increase) and the last spray level for zone 4 is 02.61, the spray level is then increased to:

$$\text{SPRAY LEVEL}_4 = (\text{DS1DMI})(\text{moisture deviation}_4) + (\text{SPRAY LEVEL}_4) = (1.500)(1.50) + (02.61) = 04.86$$

Spray level 4 is then transferred to the zone 4 portion of the spray bar 28 (see FIG. 4) and 4% moisture is applied to zone 4 (nozzle B is activated).

OS1DMI Damping coefficient (gain factor) for overall spray increase for SF1. P0 OS2DMI Damping coefficient (gain factor) for overall spray increase for SF2.

OS1DMD Damping coefficient (gain factor) for overall spray decrease for SF1.

OS2DMD Damping coefficient (gain factor) for overall spray decrease for SF2.

SP1DIM Spray offset for SF1 (applies to all zones).

SP2DIM Spray offset for SF2 (applies to all zones).

DS1DMI Damping coefficient (gain factor) for differential spray increase for SF1.

DS2DMI Damping coefficient (gain factor) for differential spray increase for SF2.

DS1DMD Damping coefficient (gain factor) for differential spray decrease for SF1.

DS2DMD Damping coefficient (gain factor) for differential spray decrease for SF2.

SF12MNS Minimum single face liner speed for spraying to be allowed for SF1. If at or above this speed spray is in the automatic mode. Below this speed spraying is stopped, but the "spray level" is retained. When the single face liner speed again reaches SF1MNS spraying is resumed at the value determined by the "spray level".

SF2MNS Minimum speed for spraying SF2. Same as SF1MNS except for single face liner 2.

IV VARIABLES PERTAINING TO GRADES

The operator has the capability of entering paper grade information into the system. The numbers entered correspond to any one of the numbers in variables labelled GRADES 1 through GRADES 4. Two different grades may be selected.

GRADES 1—one of the four available basis weights for paper used by the system. Normal numbers entered are "26", "33", "42", or "69".

GRADES 2—second of the four available grades.

GRADES 3—third of the four available grades.

GRADES 4—fourth of the four available grades.

If the two 2 digit grade numbers entered are in any of the GRADES variables, data is transferred from the following variables into the variables shown. An error is generated if either of the 2 digit grades entered is not valid. Of course, additional grades could be used by one skilled in the art in view of the present disclosure.

GFDGDF1 Variable transferred into FDGDF if GRADES1 selected for double face liner grade.

GFDGDF2 Variable transferred into FDGDF if GRADES2 selected for double face liner grade.

GFDGDF3 Variable transferred into FDGDF if GRADES3 selected for double face liner grade.

GFDGDF4 Variable transferred into FDGDF if GRADES4 selected for double face liner grade.

GFDGSF1 Variable transferred into FDGSF if GRADES1 selected for single face liner grade.

GFDGSF2 Variable transferred into FDGSF if GRADES2 selected for single face liner grade.

GFDGSF3 Variable transferred into FDGSF if GRADES3 selected for single face liner grade.

GFDGSF4 Variable transferred into FDGSF if GRADES4 selected for single face liner grade.

GDFMOF1 Variable transferred into DFMOFF if GRADES1 selected for double face liner grade.

GDFMOF2 Variable transferred into DFMOFF if GRADES2 selected for double face liner grade.

GDFMOF3 Variable transferred into DFMOFF if GRADES3 selected for double face liner grade.

GDFMOF4 Variable transferred into DFMOFF if GRADES4 selected for double face liner grade.

GSFMOF1 Variable transferred into SFMOFF if GRADESl selected for single face liner grade.

GSFMOF2 Variable transferred into SFMOFF if GRADES2 selected for single face liner grade.

GSFMOF3 Variable transferred into SFMOFF if GRADES3 selected for single face liner grade.

GSFMOF4 Variable transferred into SFMOFF if GRADES4 selected for single face liner grade.

One of the following variables is transferred into OFFST1 (overall average moisture offset factor for SF1) if the GRADES are entered for single face liner 1. Selection is from the matrix of grades entered for the double face liner and single face liner 1. For example, if the digits entered correspond to the data in GRADES3 for the double face liner and GRADES2 for the single face liner #1, then OFFSETS SF1-10 is transferred into OFFST1.

OFFSETS SF1-1 - variable for DF GRADES1, SF1 GRADES1
OFFSETS SF1-2 - variable for DF GRADES2, SF1 GRADES2
OFFSETS SF1-3 - variable for DF GRADES1, SF1 GRADES3
OFFSETS SF1-4 - variable for DF GRADES1, SF1 GRADES4
OFFSETS SF1-5 - variable for DF GRADES2, SF1 GRADES1
OFFSETS SF1-6 - variable for DF GRADES2, SF1 GRADES2
OFFSETS SF1-7 - variable for DF GRADES2, SF1 GRADES3
OFFSETS SF1-8 - variable for DF GRADES2, SF1 GRADES4
OFFSETS SF1-9 - variable for DF GRADES3, SF1 GRADES1
OFFSETS SF1-10 - variable for DF GRADES3, SF1 GRADES2
OFFSETS SF1-11 - variable for DF GRADES3, SF1 GRADES3
OFFSETS SF1-12 - variable for DF GRADES3, SF1 GRADES4
OFFSETS SF1-13 - variable for DF GRADES4, SF1 GRADES1
OFFSETS SF1-14 - variable for DF GRADES4, SF1 GRADES2
OFFSETS SF1-15 - variable for DF GRADES4, SF1 GRADES3

-continued

| |
|---|
| OFFSETS SF1-16 - variable for DF GRADES4, SF1 GRADES4 |

One of the following variables is transferred into OFFST2 if the GRADES entered are for single face liner 2. Again, the same matrix rule is used.

| |
|---|
| OFFSETS SF2-1 - variable for DF GRADES1, SF2 GRADES1 |
| OFFSETS SF2-2 - variable for DF GRADES1, SF2 GRADES2 |
| OFFSETS SF2-3 - variable for DF GRADES1, SF2 GRADES3 |
| OFFSETS SF2-4 - variable for DF GRADES1, SF2 GRADES4 |

-continued

| |
|---|
| OFFSETS SF2-5 - variable for DF GRADES2, SF2 GRADES1 |
| OFFSETS SF2-6 - variable for DF GRADES2, SF2 GRADES2 |
| OFFSETS SF2-7 - variable for DF GRADES2, SF2 GRADES3 |
| OFFSETS SF2-8 - variable for DF GRADES2, SF2 GRADES4 |
| OFFSETS SF2-9 - variable for DF GRADES3, SF2 GRADES1 |
| OFFSETS SF2-10 - variable for DF GRADES3, SF2 GRADES2 |
| OFFSETS SF2-11 - variable for DF GRADES3, SF2 GRADES3 |
| OFFSETS SF2-12 - variable for DF GRADES3, SF2 GRADES4 |
| OFFSETS SF2-13 - variable for DF GRADES4, SF2 GRADES1 |
| OFFSETS SF2-14 - variable for DF GRADES4, SF2 GRADES2 |
| OFFSETS SF2-15 - variable for DF GRADES4, SF2 GRADES3 |
| OFFSETS SF2-16 - variable for DF GRADES4, SF2 GRADES4 |

TABLE 3

| NAME | CPU STARTING ADDRESS | NUMBER OF BYTES | TYPE (BINARY OR DECIMAL) | UNITS OF MEASURE | VALUE | DESCRIPTION |
|---|---|---|---|---|---|---|
| | | | (A) VARIABLES PERTAINING TO SAMPLES | | | |
| SFTHR | 2052 | 2 | BIN | — | 0 to 4095 DEC user selected | SF threshold acceptance value. Uses raw A/D value, e.g., 10 volts = 4095, .5 volt = 205 |
| DFTHR | 2054 | 2 | BIN | — | 0 to 4095 DEC user selected | Same as SFTHR but for double face liner |
| SAMPLS | 2056 | 2 | BIN | 1/10 SEC | user selected see Table 2 | Zone 1 end count of number of samples per zone. Cumulative. |
| " | 2058 | 2 | BIN | 1/10 SEC | user selected see Table 2 | Zone 2 |
| " | 2060 | 2 | BIN | 1/10 SEC | user selected see Table 2 | Zone 3 |
| FDGDF | 2250 | 6 | DEC | — | user selected see Table 2 | Factor to convert RAW A/D value to percentage |
| FDGSF | 2256 | 6 | DEC | — | user selected see Table 2 | Same as FDGDF except for SF |
| SCPULS | 2279 | 1 | BIN | 1/10 SEC | Nominally 50 | Length of start scan pulse |
| ZNVAL | 2288 | 1 | BIN | — | Typically 15–17 | Minimum number of samples required to accept zone data. |
| EDGES | 2289 | 1 | BIN | — | Typically 4 | Number of reading to throw out of edges of web. |
| MXMOIS | 2290 | 2 | BIN | 1/100% | Typically ~ 10% | Maximum moisture reading to be believed. |
| TDNMSC | 2292 | 1 | BIN | 1/10 SEC | Nominally 50 | Time delay after seeing DRIVE SIDE CELL (Photocell 117) on return until "Scan Completed". |
| SKEW | 2297 | 1 | BIN | 1/10 SEC | Nominally 20 | Allowable skew between DF and SF edges. |
| THRCNT | 2298 | 1 | BIN | 1/10 SEC | Set by user. Typical values 3–5 | Consecutive readings required to detect edge. |
| AVGPCT | 2299 | 3 | DEC | | Set by user. Typical value 55% | Percentage of old AVG zone moisture used |
| DFMOFF | 2262 | 4 | DEC | 1/100% | Set by user based on paper grade and moisture detector, | DF offset for moisture percentage read |
| SFMOFF | 2266 | 4 | DEC | 1/100% | typical values 0–100 " | SF offset for moisture percentage read |
| | 2354 | 1 | BIN | | 0 or 1 | 0 = NORMAL, 1 = SPECIAL ROLL STUDY |
| | | | VARIABLES (B) VARIABLES PERTAINING TO WRAP ARM ADJUSTMENTS | | | |
| FLSON | 2050 | 1 | BIN | SEC | Nominally 5 | Flash on time (Lamps 80, FIG. 1) |
| FLSOFF | 2051 | 1 | BIN | SEC | Nominally 10 | Total flashing period. |
| SCNRAT | 2080 | 2 | BIN | 1/100 FT | Set by user, dependent on amount of checking desired | Delay before rescan in auto mode — no correction made. |
| DLYSC1 | 2082 | 2 | BIN | 1/100 FT | Set by user, dependent on distance between DF wrap arm from DF moisture detector. | Delay before rescan, correction at double face liner. |
| DLYSC2 | 2084 | 2 | BIN | 1/100 FT | Dependent on distance between SF1 spray bar from SF1 moisture detector. | Delay before rescan, correction at SF1. |
| DLYSC3 | 2086 | 2 | BIN | 1/100 FT | See directly above | Delay before rescan, correction at SF2. |
| TOL | 2088 | 2 | BIN | 1/100% | Typically 40 | Deadzone tolerance. If within tolerance — no |

TABLE 3-continued

| NAME | CPU STARTING ADDRESS | NUMBER OF BYTES | TYPE (BINARY OR DECIMAL) | UNITS OF MEASURE | VALUE | DESCRIPTION |
|---|---|---|---|---|---|---|
| | | | | | | wrap arm correction. |
| SPDTAB | 2090 | 4 × 10 | DEC | FT/MIN | Value set for particular installation | Speed value for lookup of correction factor. 10 points. Linear interpolation. |
| DFTAB | 2130 | 4 × 10 | DEC | — | Value set for particular installation | Doubleface liner correction factor table. |
| SF1TAB | 2170 | 4 × 10 | DEC | — | Value set for particular installation | SF1 correction factor table. |
| SF2TAB | 2210 | 4 × 10 | DEC | — | Value set for particular installation | SF2 correction factor table. |
| DLB4M4 | 2270 | 2 | BIN | 1/10 SEC | Nominally 20 | Delay before moving arms. |
| AUMNSP | 2272 | 2 | BIN | FPM | User selected | Automatic minimum speed — no scan and no correction if go below this value. |
| SPDTOL | 2274 | 2 | BIN | FPM | Typically 1-5% | DF liner speed to SF liner speed difference tolerance. If out of tolerance no correction is made. |
| TOOWET | 2280 | 4 | DEC | 1/100% | Typically 7-10% | Maximum allowable moisture — if above correct wrap arm. |
| TOODRY | 2284 | 4 | DEC | 1/100% | Typically 1-2% | Minimum allowable moisture — if below correct wrap arm. |
| OFFST1 | 2293 | 2 | BIN | 1/100% | Typical range ±2% | Offset in moisture for SF1. (Roll 34, FIG. 1) |
| OFFST2 | 2295 | 2 | BIN | 1/100% | Typical range ±2% | Offset in moisture for SF2. (Roll 34, FIG. 1) |
| AMINTM | 2302 | 2 | BIN | 1/10 SEC | Set by User typical 2.0 sec. | Minimum correction if out of absolute tolerance. |
| MXONTM | 2350 | 2 | BIN | 1/10 SEC | Typical | Maximum wrap arm movement in one shot. |
| PSBTWJ | 2352 | 2 | BIN | 1/10 SEC | Typical | Pause between wrap arm movement when required. |
| | | | VARIABLES (C) VARIABLE PERTAINING TO SPRAY BARS | | | |
| MAXSPR | 2304 | 2 | DEC | | Dependent on paper grade and spray nozzles used | Maximum allowed spray level. |
| OS1DMI | 2306 | 4 | DEC | A.AAA | Typical 1-2 | Damping coefficient for overall spray increase, SF1. |
| OS2DMI | 2310 | 4 | DEC | A.AAA | Typical 1-2 | Damping coefficient for overall spray increase, SF2. |
| OS1DMD | 2314 | 4 | DEC | A.AAA | Typical 1.5-2.5 | Damping coefficient for overall spray decrease, SF1. |
| OS2DMD | 2318 | 4 | DEC | A.AAA | Typical 1.5-2.5 | Damping coefficient for overall spray decrease, SF2. |
| SP1DIM | 2322 | 2 | BIN | 1/100% | Typical .5 | Offset for spray calculation, SF1. |
| SP2DIM | 2326 | 2 | BIN | 1/100% | Typical .5 | Offset for spray calculation, SF2. |
| DS1SMI | 2330 | 4 | DEC | A.AAA | Typical 1.5 | Damping coefficient for different spray increase, SF1. |
| DS2DMI | 2334 | 4 | DEC | A.AAA | Typical 1.8 | Damping coefficient for different spray increase, SF2. |
| DS1DMD | 2338 | 4 | DEC | A.AAA | Typical 1.5 | Damping coefficient for different spray decrease, SF1. |
| DS2DMD | 2342 | 4 | DEC | A.AAA | Typical 1.8 | Damping coefficient for different spray decrease, SF2. |
| SF1MNS | 2346 | 2 | BIN | FPM | Typical 150 | SF1 minimum speed for spray on. |
| SF2MNS | 2348 | 2 | BIN | FPM | Typical 150 | SF2 minimum speed for spray on. |

The raw digital moisture data, stored in binary form is now converted into decimal form and also adjusted to represent actual moisture percentage for each liner. The conversion is accomplished using a first order equation,

| | | |
|---|---|---|
| M = | A + Bx, | |
| where A = | a moisture reading offset factor (SFMOFF and DFMOFF for the SF and DF respectively) due to the fact that zero volts for a given moisture detector may not necessarily represent zero percent moisture especially in view of the various paper grades which can be used in the corrugating machinery; | |
| B = | a multiplying factore (FBGSF and FDGDF for the SF and DF respectively) which is used to convert the binary raw data into a decimal moisture percentage; | |
| x = | the raw digital data; and | |
| M = | the calculated decimal moisture percentage. | |

Values for A and B (SFMOFF, DFMOFF, FDGSF, and FDGDF) are dependent upon the paper grade as set forth more fully in Part IV of Table 2 and can vary even between the double face liner and the single face liner.

Based upon the computed moisture percentage for each reading made, the central processing unit then determines an overall average moisture percentage for the single face liner and double face liner, an overall average difference moisture percentage between the double face liner and single face liner, a zonal time average moisture percentage for the single face liner and double face liner for each zone having an appropriate number of readings, and a zonal time average moisture difference between the double face liner and single face liner for each such zonal time average measurement. In addition, the number of scans made (scan number) and the single face liner and double face liner speeds are determined and presented on displays associated with console 22 and, if desired, presented on printer 147 (FIG. 2). If the scan is made in manual mode, "SF0" is displayed indicating that no single face liner speed has been determined and no corrective action for wrap arm movement or spray levels has been made. Such a printout is shown in Table 1B.

The overall average moisture percentage for the single face liner and double face liner is computed differently than the zonal time average moisture readings. More particularly, the overall average moisture is based only on the data received during the present scan while zonal measurements are based upon a percentage of the present scan data and the previous scan data (see variable AVGPCT).

When a skewed condition is determined, all data samples are used in the calculation of moisture both for overall measurements and zonal measurements. These calculated values are presented on the display and/or printout. Under such conditions, no control action is taken and EDGES and previous zone values are ignored. This is done to aid in operator evaluation of the cause of the skewed condition where outer edge zone moisture readings may be significant in pinpointing the skewed problem.

As the moisture calculations are being processed, the moisture detector is returned to its parked position on the DRIVE SIDE of the liner (see FIG. 3). The SCAN cycle is considered to be in progress as indicated by the lit scan lamp 164 (FIG. 5A) until photocell 171 is crossed by the moisture detector, initiating a timeout. The SCAN lamp is then extinguished and the cycle is completed.

As seen in FIG. 5A, automatic mode operation is initiated by depressing switch 131 or 133 depending upon which single face liner is being used. In this automatic mode, scans are made on a periodic basis and after the moisture values are determined in a manner analagous to the manual scan, corrective action is taken if the moisture values are outside of predetermined tolerances.

Firstly, the overall average moisture of each liner is compared to absolute values (TOOWET and TOODRY for both the SF and DF) to see if the absolute average moisture values fall therebetween. If they do not, appropriate wrap arm adjustments are made to bring the particular liner's moisture content within the values defined by TOODRY and TOOWET. In the case of the DF liner, the only mechanism used is the DF preheater wrap arm 59. The arm is moved in the proper direction based upon the equation:

| | | |
|---|---|---|
| t = | [actual moisture −2 × (TOOWET + TOODRY)] × s | |
| where s = | a multiplying factore (variable DBTAB, see Table 2) based upon the liner's speed obtained from a lookup table, and t is the time in tenths of a second. | |

This equation indicates that the change in wrap arm position to obtain a desired moisture is equal to the mean of the TOOWET and TOODRY values. Further explanation of these variables is set forth in Table 2.

In the case of the SF liner, there are two wrap arms and water spray adjustments which can be used to adjust the moisture if outside of the maximum and minimum allowable values. If adjustment is necessary, the protocol is to increase the single face liner wrap arm initially if single face moisture is to be decreased. If the single face liner wrap arm is in the maximum wrapped position causing input signal 110 to be received at input module 128 (see FIG. 2), the single face web wrap arm 58 is increased until it is in the maximum position at which point the overall spray level for each zone of spray bar 28 is decreased. If moisture is to be increased, the criteria is to decrease the single face web wrap arm first until it is in the minimum position, then to decrease the single face liner wrap arm until it is in the minimum position, and finally to apply or increase the overall water spray. Such overall spray can only be initiated if the "spray on" key 109 is enabled.

If the overall average moisture content of the liners are within the TOOWET and TOODRY limits, the overall average moisture difference, "AVG DB - SF" is analyzed to determine if other wrap arm adjustments should be made. The analysis proceeds by calculation of a moisture deviation defined by the following equation, MOISTURE DEVIATION=DB - SF - OFFSET; where OFFSET is the overall average moisture offset factor (OFFST1 and OFFST2 for SF1 and SF2 respectively) used to obtain flat corrugated board for a given double face liner-single face liner grade and weight combination.

If the MOISTURE DEVIATION is outside of the desired moisture offset by a tolerance zone known as a deadband, correction is made using the following equation:

t=(MOISTURE DEVIATION)×s, where s is a speed multiplying factor.

Both the double face liner and one of the single face liner wrap arms are then moved in opposite directions.

If only one wrap arm is available for movement, the speed multiplying factor is doubled and only that wrap arm is moved. The SF wrap arm movement follows the same criteria as indicated above for the TOOWET/-TOODRY correction.

Water spray is modified for each individual zone based on a zonal time average moisture difference. A detailed analysis is presented in Table 2 and in the next subpart.

Corrections are not made to average and zonal moisture content differences if certain conditions are noted during the scan cycles. These conditions include (1) fault code 01, the double face liner is operating below a stated minimum speed;

(2) fault code 05, the single face liner and double face liner speeds are different by an amount greater that a predetermined tolerance level; and (3) fault code 10, the webs have different widths or are skewed.

Under condition (1) no further scans are made until the double face liner obtains a speed greater than the stated minimum and a predetermined amount of double face liner footage has passed measuring wheel 154 to insure that the liner being scanned has obtained the proper speed.

Under conditions (2) and (3), a rescan is made after a predetermined footage delay.

Certain other fault conditions cause the system to enter the MANUAL mode. These are (1) fault code 06, no liner moisture detected above the threshold value;

(2) fault code 11, the analog to digital converter is not ready for operation;

(3) fault code 12, photocell 171' on the operator side is not working properly;

(4) fault code 13, photocell 171 on the drive side is not working properly;

(5) fault code 17, too few samples have been obtained prior to sensing the presence of photocell 171'; and (6) fault code 18, the measured moisture exceeds the maximum value.

These conditions represent malfunctions which may require repair of the system and consequently the system exits from the automatic mode.

A final fault code 03 indicates that the manual key 121 (FIG. 5A) has been depressed. When depressed, the system returns to manual mode operation and no further corrective action is taken.

EXAMPLES OF AUTOMATIC WARP PREVENTION CONTROL OPERATION

To better understand the operation of the automatic warp prevention control system 20, an example as illustrated in Tables 1A and 1B is provided. The variables named in these tables are defined in Table 1C. Table 1A shows the type of display on console 22 (see FIGS. 5 and 5B) or the printout from printer 147 (see FIG. 2) if the control system is operating in the automatic mode with either roll 34 or 34' being used to supply the single face liner. Table 1B similarly shows the display or printout when the control system is separated in its manual mode.

As shown in Table 1A, one adjustment which is made by the present invention is to maintain the overall average moisture difference between the double-face liner and the single-face liner equal to some overall average offset value with control action to take place if the average moisture difference is outside of this offset value by some amount. The amount by which it must be outside the offset value is known as the dead zone which although not shown in Table 1A, is typically equal to plus or minus 0.3 percent moisture. Thus for the example shown in Table 1A, the average moisture content difference between the double-face liner (DF) and the single-face liner (SF) should be 1.5 percent, that is the offset value. If the measured double-face liner moisture content minus the measured single-face liner moisture content is greater than 1.5 percent plus 0.3 percent or 1.8 percent, or is less than 1.5 percent minus 0.3 percent or 1.2 percent, then wrap arm adjustments are made to bring the average moisture content difference equal to the offset value. In the preferred embodiment of the present invention, this is obtained by adjusting the double-face liner wrap arm 59 and the single-face liner wrap arm 57 in opposite directions. In a given example, if the computed adjustment based upon the measured overall average moisture content difference suggests that the double-face liner wrap arm adjustment should be moved for 0.1 seconds (a time movement is related to angular movement of the wrap arm) in the counterclockwise direction, then the single-face liner is similarly moved for a period of time in the clockwise direction. This example indicates that the double-face liner single-face liner moisture difference is greater than 1.8 percent and therefore the double-face liner should be made drier while the single face liner should be made wetter. This is accomplished by increasing the amount of time that the double-face liner is in contact with the double-face liner preheat drum 62 and decreasing the amount of time that the single-face liner is in contact with the single-face liner preheat drum 60. By adjusting the two wrap arms in opposite directions, the absolute moisture content difference is reduced, but the change in either of the liners is only changed by about one-half this amount so as to minimize rapid changes in the moisture content for either of the liners.

In alternate embodiments of the present invention, the average wrap arm adjustment could be made to either the double-face liner or the single-face liner rather than dividing it between the two liners.

If the single-face liner wrap arm is at a maximum or minimum value and no further adjustment can be made in the desired direction, then the single-face web wrap arm 58 is adjusted. In the example shown in Table 1A, the overall average moisture content difference between the double-face liner and the single face liner is 4.78 minus 3.57 or 1.21 (AVG DIFF DF - SF). The OFFSET value is 1.5 percent and the dead zone is equal to plus or minus 0.2 percent. This latter figure is not shown in Table 1A but is known by the automatic warp prevention system as set by the user.

In the example shown in Table 1A, the double-face liner wrap arm is adjusted by 1.8 seconds in the negative direction while the single-face liner at the double-face liner (that is the single-face web wrap arm 58) is adjusted 1.7 seconds in the opposite direction because the single-face wrap arm 57 is in the maximum or fully counterclockwise direction. Consequently no further drying at the single-face preheater could be obtained. The double-face liner wrap arm is adjusted in a clockwise direction to decrease its drying effect and thus makes the overall average difference between the double-face liner and the single-face liner closer to the desired 1.5 percent offset.

The actual amount of adjustment made to the wrap arms is actually based not only upon the difference between actual and desired overall moisture difference, but also upon the speed of the single-face liner and double-face liner. This is performed with look-up tables containing values dependent upon the speed of the liners. The need for such adjustments as a function of liner speed is that liner movement over the preheat drums is a function both of the angular displacement of the liner over the drum as well as the speed of the liner with respect to the drum. Consequently, a liner that is moving over the preheat drum faster than some other liner requires a greater angular distance to be traversed across the drum in order to obtain a similar drying effect.

Although not specifically shown in Table 1A, the automatic warp prevention system 20 also uses the overall average double-face liner moisture percentage (AVG DF) and the overall average single-face liner moisture percentage (AVG SF) to determine if these values are outside of allowable minimum and maximum absolute moisture content values. That is, when the system is initiated, values are set for the minimum and maximum moisture content for both the single-face liner and the double-face liner and if these values are exceeded by either of the liners, then wrap arm adjustments are made to that liner to bring it within the defined range. Such adjustments are made before any other adjustments are made by the system.

Table 2 contains all the variable names used by the present invention in the control program and further contains a description of these variables. Examples of variable use in the control system are also given in Table 2. The control system utilizes a program associated with the computer forming part of the control system (see FIG. 2) wherein the variables defined in Table 2 are used in the control program. The actual control program utilized by the present invention is presented in an appendix forming part of this application and submitted on microfiche in accordance with present Patent Office rules and regulations.

With respect to the minimum and maximum overall moisture content for the double-face liner and the single-face liner, the variable names are TOOWET and TOODRY. As shown in Table 2, if the double-face liner overall average moisture content reading is greater than the TOOWET value, then its wrap arm is adjusted in the counterclockwise direction to cause more drying to occur for the double-face liner. Similarly, if the single-face liner overall average absolute moisture content reading is greater than the TOOWET value minus the overall average moisture offset value (variable OFFSTX) then its wrap arm is adjusted in the counterclockwise direction to cause more drying to occur. Again, if the single-face wrap arm 57 is already in the maximum counterclockwise direction, then the single-face web wrap arm is moved.

If the double-face liner overall average moisture content is less than its TOODRY value, then its wrap arm 59 is adjusted in the clockwise direction to cause less drying. Similarly, if the single-face liner overall average moisture content is less than the TOODRY value minus the offset value, then either the single face-liner wrap arm 57 or the single-face web wrap arm 58 is adjusted in the clockwise direction to reduce the drying of the single-face liner.

Once the overall average absolute moisture content reading for the single-face liner and the double-face liner is within the values set for the system by the variables TOODRY and TOOWET, then the overall average moisture difference value is used as described above to effect further overall average moisture difference content.

In addition to adjusting the wrap arms for the single-face liner, single-face web and double-face liner, the present invention through use of the moisture scanning mechanisms 24 and 25 is able to compare the moisture content in the single-face liner and double-face liner to determine if zonal changes in the moisture content of the single-face liner should be made by the zonal spray bar 28 (see FIGS. 1, 4 and 4A). Although adjustments are made to the moisture content of the single-face liner over the zones comprising the single-face liner, it is also possible to modify the system and make the zonal moisture adjustments in the double-face liner or in both liners. The preferred embodiment of the present invention makes the adjustments in the single-face liner.

As mentioned earlier with respect to Table 1A, the scanning mechanisms 24 and 25 take multiple samples for each zone scanned across both the single-face web and the double-face liner. The values given in Table 1A represent a conversion of these values so as to better predict the type of control action necessary in order to maintain consistent zonal moisture for the single-face liner as it relates to the double-face liner. More specifically, for each zone and each liner, there are typically sixteen to twenty readings made by the moisture detector. A given example is presented in Table 4. It is there seen that for a particular zone such as zone 3, twenty readings have been made during each of four scans. The readings are the digital equivalents of analog voltages from the moisture detector mechanism (24 or 25), the digital values adjusted for characteristics of the detector and liner type. The moisture readings are then count averaged; that is, for each scan they are summed and divided by the total number of readings taken for that scan. This average is designated as the count average in Table 4 and in the given example is equal to 315.95 for scan number 1. This count average is not directly used to determine the zonal time average moisture percentage but is combined with the previously determined zonal time average moisture content for that zone multiplied by a fractional value (AVGPCT in Table 2) and that value added to one minus the fractional value times the new zonal count average value.

TABLE 4

| Scan | Zonal Moisture Measurements — Zone 3 readings (moisture percentage in 1/100 of a percent) | | | | | | | | | | | | | | | | | | | |
|---|---|---|---|---|---|---|---|---|---|---|---|---|---|---|---|---|---|---|---|---|
| # | 1 | 2 | 3 | 4 | 5 | 6 | 7 | 8 | 9 | 10 | 11 | 12 | 13 | 14 | 15 | 16 | 17 | 18 | 19 | 20 |
| 1 | 319 | 330 | 323 | 322 | 328 | 315 | 320 | 325 | 315 | 330 | 321 | 310 | 300 | 295 | 305 | 315 | 309 | 306 | 320 | 311 |
| 2 | 318 | 335 | 330 | 325 | 327 | 325 | 325 | 323 | 310 | 316 | 330 | 315 | 310 | 311 | 307 | 315 | 308 | 315 | 330 | 325 |
| 3 | 320 | 340 | 341 | 348 | 332 | 336 | 319 | 341 | 326 | 350 | 345 | 340 | 342 | 337 | 315 | 360 | 345 | 340 | 338 | 342 |
| 4 | 321 | 335 | 340 | 345 | 335 | 334 | 322 | 335 | 330 | 345 | 344 | 342 | 341 | 340 | 321 | 355 | 344 | 343 | 340 | 341 |

| Scan # | Total Zone 3 | Total Number of Readings | Count Average | Zonal Time Average (with AVG PCT = 55%) | Comment |
|---|---|---|---|---|---|
| 1 | 6319 | 20 | 315.95 | 315.55 | No previous time average |

TABLE 4-continued

| | | | | | |
|---|---|---|---|---|---|
| | | | | | reading for first scan |
| 2 | 6400 | 20 | 320 | 317.55 | (i.e., 315.55 (.55) + 320 (1-.55)) |
| 3 | 6757 | 20 | 337.85 | 326.68 | (i.e., 317.55 (.55) + 337.85 (1-.85)) |
| 4 | 6753 | 20 | 337.65 | 331.61 | (i.e., 326.68 (.55) + 337.65 (1-.55)) |

The assignment statement for calculating the zonal time average moisture percentage for both the double-facer and the single face liner is given by $M_Z$: =[(AVGPCT)×(Last $M_Z$)×(100-AVG PCT)×(New count average)]/100.

The example given in Table 2 for variable AVGPCT illustrates the situation where the single-face liner has a zonal time average moisture content of 5.05 percent and a new zonal count average moisture content of 6.00 percent. In that example the value of AVGPCT is 55 percent and thus the last zonal time average of 5.05 is multiplied by the 55 percent and added to the new count average of 6.0 percent multiplied by 45 percent; that is, 100 minus the 55 percent. The result is then divided by 100 to obtain a percent moisture reading, in that particular example equal to 5.47 percent. It is thus seen that the count average for a zone though weighted, is only added to the previous zonal time average reading for that zone and thus the zonal time average reading for the present scan is a function of all previous zonal time average readings plus the new count average reading for the present scan. The AVGPCT value of 55 percent is a typical value for weighting the previous zonal time average, although other percentages could be used depending upon the desirability of increasing or decreasing the weighted average of previous zonal time averages. In the example given in Table 4, the first zonal count average is 315.95 corresponding to 3.1555 percent moisture. The count average for scan number 2 is 320 or 3.2%. Since AVGPCT=55%, the zonal time average for scan #2=3.15.95(0.55)+320(1−0.55), or 317.55 (3.17%). Similar calculations are made for scans 3 and 4.

By utilizing the zonal time average measurements for previous scans of the same zone, the value calculated for the zone on the present scan is less likely to have erratic changes in its value due to a momentary wet or dry spot for that zone as sensed by the moisture sensors. In this way the control presented to the spray bar is less erratic than if no weighting factor for previous time average readings is used.

Referring again to Table 1A, after the zonal time average readings for the double-face liner and single-face liner are calculated, their difference (ZDIFF) is obtained. This difference is presented as a moisture percent difference between the two zones. A moisture deviation is then calculated by the following equation:

Moisture deviation=Z DIFF−(OFFSTX+SPXDIM); where Z DIFF is the actual zonal time average moisture difference for the zone in question, OFFSTX is the wrap arm offset factor for the single face liner and SPXDIM is the zonal spray offset factor for the single face liner.

Thus, OFFSTX represents the overall average moisture offset factor as illustrated in Table 1A under the name OFFSET. This number is added to the spray offset factor for the single face liner, the latter variable representing the amount of zone moisture difference for any given zone before corrective action is taken for that zone. This number is added to the overall average moisture difference (OFFSET) in order to determine when the moisture difference for a given zone exceeds a value at which zone correction should be taken. In the example given in Table 2 under part III entitled "Variables Pertaining to Water Spray" a Z DIFF in zone 4 is 1 percent, the overall average moisture difference between the double-face liner and the single-face liner is −1 percent, and the spray offset for zone 4 is +0.5 percent. Thus, the moisture difference for zone 4 is equal to 1−(−1+0.5), or 1.5 percent. This value is then used to determine the amount of spray to be applied by the spray bar 28 (see FIGS. 1, 4, and 4A) for that particular zone. If the moisture deviation number is positive, it is multiplied by an increase moisture content gain (or damping) factor (DSlDMI) and added to the previous spray level determined for that zone. Thus, the spray level for a given zone is equal to the previous value of the spray level for that zone plus the calculated moisture deviation times a gain factor, the gain factor (damping coefficient) being the increase moisture gain factor if the moisture deviation level is positive and a decrease moisture level gain factor if the moisture deviation is negative. Thus, the spray level for a particular zone can be defined by the following assignment statement:

SPRAY LEVEL:=(Moisture deviation)×(Moisture level gain factor)+previous spray level calculated.

In the example shown in Table 2, the moisture deviation is 1.5, and thus a moisture level increase gain factor is used. This increase gain factor is designated by the variable DS1DMI where the 1 stands for the first single-face liner (roll 34, FIG. 1). The value of this gain factor is 1.5, and in the given example shown in Table 2 the previous spray level is 2.61. Thus, the spray level for zone 4 in the given example is now 4.86.

The actual spray emitted by spray bar 28 for zone 4 can be from 0 to 15 percent moisture in 1 percent increments. The value calculated for the spray bar is truncated to an integer value with moisture of that percentage sprayed onto the liner for that zone. In the example shown in Table 2, this value is 4 percent moisture. The acutal nozzles activaged on the spray bar are determined by the spray bar controller 41 as a function of the single-face liner speed. The moisture percentages calculated are based on a single-face liner speed of 300 feet per minute (91.4 meters per minute) and a single-face paper grade of 42 pounds per 100 square feet (2.05 kilograms per square meter).

As moisture is applied to the zone, the moisture content for the zone increases. This increase is then sensed by the moisture sensors during the next scan which decreases the moisture difference between the double-face liner and the single-face liner for that zone; consequently causing a reduction in the Z difference value. At some point the moisture difference value may become negative and a moisture decrease gain factor (damping coefficient) is used which, when multiplied by the negative moisture deviation value, causes the spray value to be decreased. In the example shown in Table 2, the spray level is calculated at 4.86 percent. If, on the next scan, the moisture deviation is equal to −0.5 and if the moisture decrease gain factor is 1.8, the new spray level for zone 4 is given by the following equation:

SPRAY LEVEL=(1.8)×(0.5)+4.86 which equals 3.96. Since this value is less than four, 3 percent water is then used by the spray bar controller to calculate the spray for zone 4. If on the next scan, the moisture deviation is calculated at −1, the new spray level is:

SPRAY LEVEL=(1.8)×(−1)+3.96 which equals 2.16. This value is truncated to two, and thus 2 percent moisture is used by the spray bar controller to calculate the spray for zone 4. When the spray level value is less than 1, no spray is applied to the zone.

Thus, the spray level is automatically adjusted so as to bring the difference between the moisture content for corresponding zones in the double-face liner and single-face liner close to one another as determined by the overall offset and the zone difference offset values and further wherein average differences in the moisture content of the single-face liner and double-face liner are adjusted through adjustment of the wrap arms for the single-face liner, single-face web and double-face liner.

In addition to the overall and zonal moisture level adjustments made, the present invention also insures that adjustments are made only when conditions warrant. Thus, adjustments are not made if the single-face liner and double-face liner are moving at speeds which differ from one another by some predetermined amount. This prevents adjustments when it is apparent from the speed difference of the liners that the single-face liner is being spliced or some other condition exists which makes adjustments in the moisture levels inappropriate. These conditions are described in Table 7.

Furthermore, in order to insure that the moisture measurements for a zone are correct, threshold values for both the single-face (SFTHR) and the double-face liner (DFTHR) are used (see Table 2, part I). Thus only moisture readings above the threshold value are accepted as valid moisture readings.

To detect an edge of the liner, the control system examines the moisture readings and looks for consecutive readings, as determined by variable THRCNT, where the moisture is above that defined by either the SFTHR variable or the DFTHR variable of the single-facer and double-facer respectively. After determining where consecutive acceptable readings have occurred, the control system goes to the first nearest edge and discards a number of samples as defined by the variable EDGES.

The example given in Table 2, part II, illustrates a situation where three samples are below the threshold value while samples 4 and 5 are above the threshold value. Sample 6 is below and sample 7 through n are above the threshold value, where n is an integer. If the variable THRCNT is set to 5, and the EDGES variable set to 4, the computer determines that sample 7 represents the edge of the web and discards samples 7, 8, 9 and 10 due to the EDGES variable being equal to 4. The valid acceptable data then begins for sample 11 as read by the moisture detector.

As explained in Table 2, if the number of samples including sample 11 through the last sample n for the zone do not represent a sufficient number of acceptable samples for that zone as determined by the variable ZNVAL, all samples from that zone are disregarded. The variable ZNVAL represents one minus the number of acceptable (though not necessarily consecutively acceptable) samples required before a zonal count average is taken.

The overall thrust of using threshold values for acceptable moisture readings and for determining placement of an edge in a number of readings per zone which must exist before a measurement is taken is to insure that the moisture measurements do indeed represent accurate data.

In addition, as shown in FIG. 1, each wrap arm control and indicator module 30, 31, and 32 incorporates lights 80 and 81 which are flashed under control of the control system so as to indicate to operators and other personnel when the wrap arms are going to be moved. The ON and OFF times of these lights are controlled by variables FLSON and FLSOFF as set forth in Table 2, part II. A remote control box 79 forming part of each module allows operator selection of automatic or manual mode and also indicates wrap arm movement. In this way, changes to the wrap arms can be made at the wrap arm site.

As set forth in Table 2, part IV, variables are used by the control system regarding the grades of paper used to form the corrugated board. Typically these grades represent various weights such as 26 pounds per 1000 square feet (0.126 kiograms/$M^2$) of paper, 33 pounds per 1000 square feet (0.161 kiograms/$M^2$), 42 pounds per 1000 square feet (0.205 kilograms/$M^2$), and 69 pounds per 1000 square feet (0.336 kilograms/$M^2$). GRADES 1, 2, 3 and 4 correspond to one of four available grades. Of course, other basis weight paper may be used with the present controller.

SET UP AND DISPLAY OF INFORMATION TO THE OPERATOR

As best seen in FIGS. 1 and 5, the operator interfaces with the control system through console 22. The console includes a keyboard area 26 and displays 27, 29, and 33. In addition, a power on/off button 38 is provided. Details of the keyboard area 26 are shown in FIG. 5A and described in Table 6. It is there seen that the keyboard area comprises four rows of keys 84, a numeric keypad 86, increase and decrease offset buttons 87 and 88 and an enter button 90. Key 92 of the four rows of keys 84 allows the operator to select the double-face liner and single-face liner grades for the double-face liner, single-face liner No. 1 combination. As shown in FIG. 1, two single-face liners can be alternatively used and key 92 specifies the relationship of grades for the double-face liner and one of these two single-face liners. Key 93 specifies the grades for the double-face liner and the second single-face liner. The actual grade selection is entered through numeric keypad 86 and stored in the computer's memory by depressing enter key 90.

As shown in FIG. 5B and as described in Table 5, the information entered from the keyboard area 26 is displayed at display region 33 and there verified prior to depressing enter key 90. Display region 27, displays the double-face liner percent moisture when the system is in operation and when in a special data entry mode, displays a selected memory address. Display 29 shows the single-face liner moisture percentage and, when in the data entry mode, shows data to be stored in the system memory. Display 33 displays the double-face liner speed or a fault code when a faulty operation is sensed. In the data entry mode, it displays the numeric entry of information by keypad 86 such as discussed for the keys 92 and 93. It can also present the offset values entered by the user through keys 87 and 88.

TABLE 5

Special Operations

I. Changing variables in the WARP CONTROL system (see FIGS. 5A–5B).

1. To enter the CHANGE MODE state:
   (a) depress and maintain the "./16" key 102.
   (b) depress YELLOW key 104, release YELLOW key and then release "./16" key.
   The YELLOW lamp 105 will illuminate to indicate the CHANGE MODE is on.
2. To exit the CHANGE MODE state: Repeat the same key depressions as above. The YELLOW lamp will extinguish to indicate normal operating mode.
3. While in the CHANGE MODE state all operations are normal, except the information on display 27, 29 and 33. In the normal mode the display 27 shows the double-face liner liner average moisture, while display 29 shows the Single-Facer liner average moisture.
   In the CHANGE MODE state, display 27 shows the memory address location, while display 29 shows the contents of that memory location.
4. To go to a desired memory location:
   (a) enter the memory location digits via the keypad 86; and
   (b) depress GREEN key 106. That memory location will now be seen in the display 27 and the contents of the memory location will be seen in display 29.

4a. To go to the next memory location: just depress the GREEN key and release.

5. To change the contents of the memory location:
   (a) enter the digits via the keypad 86; and
   (b) depress RED key 108.
   Display 27 contents will change to the just-entered value.

Example of changing data:

The present value of memory location 2271 is to be changed from 100 to 25.

(a) enter the CHANGE MODE STATE.
   (b) enter the digits 2, 2, 7, 1 via the keypad 86 and depress the GREEN key. See 2271 in display 27 and 100 in display 29.
   (c) enter the digits 2, 5 via the keypad 86 and depress the RED key. See 2271 in display 27 and 25 in display 29.

6. Variables are entered in two different forms.
   Variables requiring two or less memory locations are in binary form while variables requiring three or more memory locations are entered in decimal ASCII form (see Table 3 for a description of all variables). Each form is described below.
   To convert to ASCII, add 48 to each digit to be entered. Enter each successive digit, starting at most significant (including leading zeroes), into successive memory locations. For example, if the number 840 is to be entered into a five-location ASCII form starting at memory location 2264, enter 2, 2, 6, 4 via keypad and depress GREEN key 106.
   Enter 4, 8 (most significant digit is leading zero) and depress RED key 108.
   Depress GREEN key to go to next memory location.
   Enter 4, 8 and RED key.
   Complete entries with GREEN 5, 6, RED; GREEN, 5, 2, RED; GREEN, 4, 8, RED.
   The binary form for each address location comprises decimal numbers. The maximum number is 255 for one location. A two-location binary form requires some calculation if the value is over 255. The maximum two-location value is 65,535. To find the digits to enter for each location:
   (a) divide the value by 256 to find the whole number quotient. The whole number quotient is entered in the first memory location. Now multiply the whole number quotient by 256. Subtract the result from the original value. The difference is entered into the second memory location.
   e.g. The value 44,500 is to be entered into memory locations 2290, 2291.
   (a) 44,500÷256=173.82812
   (b) enter "173" into location 2290
   (c) 173.×256=44,288;
   44,500−44,288=212
   (d) enter "212" into location 2291
   To decode the present value of a two-location binary form, multiply the contents of the first location by 256 and add the contents of the second location to the result.
   e.g., The values displayed at memory locations 2080, 2081 are 200 and 201, respectively. The decimal number is 200×256+201=51.401.
   Both ASCII and binary types may be of the SIGNED type; that is, they can represent positive or negative numbers. For ASCII signed numbers the last location of the entry represents the sign; for positive numbers enter "32"; for negative numbers enter "45."
   For two locations, binary signed negative numbers with absolute values less than 256, make the most significant location equal to "255" and the least significant location equal to "256−(VALUE")".
   e.g., The number −40 is to be in locations 2040, 2041. Enter "255" into location 2040. Enter 256−40="216" into location 2041.

II. Input debugging

7. Other data—It is possible to look at most of the data within the system; of particular interest are the external inputs (see FIG. 2).
   To view any input data, go into the CHANGE MODE state, enter the memory location digits for the particular input of interest and depress the GREEN switch. First, consider the wrap arm limit switches 110–115, photo detectors 117 and remote switches 120.
   The amount shown in VALUE is the amount display 27 changes for a change in state of the selected input ITEM. If the input is inverted, the VALUE amount is subtracted, while if non-inverted, the VALUE amount is added. e.g., check for the NO WRAP SF1 LINER limit switch operation. Enter 2, 0, 4, 8, 0 and depress GREEN key 106. Read 20480 in display 29 and some value in display 27. Manually operate the limit switch. The value in display 27 decreases by 8 when in the limit, versus not in the limit—Display 29 reads 124 when not in limit; reading changes to 116 when in limit.
   The operation of the measuring wheels can be checked by looking at the measuring wheel low byte (higher memory location) and seeing if display 29 decrements when the appropriate measuring wheel is rotating.

As shown in FIG. 5B, display areas 27 and 29 also comprise light-emitting diodes 95, 96, 97, 98, 99 and 100 whose display functions are also set forth in Table 1D.

A detailed description of changing from the normal operating mode to the special data entry mode is set forth in Table 5. As described there, it is readily possible for a user to define the type of corrugated board to be manufactured and controlled by the automatic warp prevention system as well as to monitor the system as it is operating under the control of the present invention.

CONTROL SYSTEM CIRCUITRY

Figure 6A:
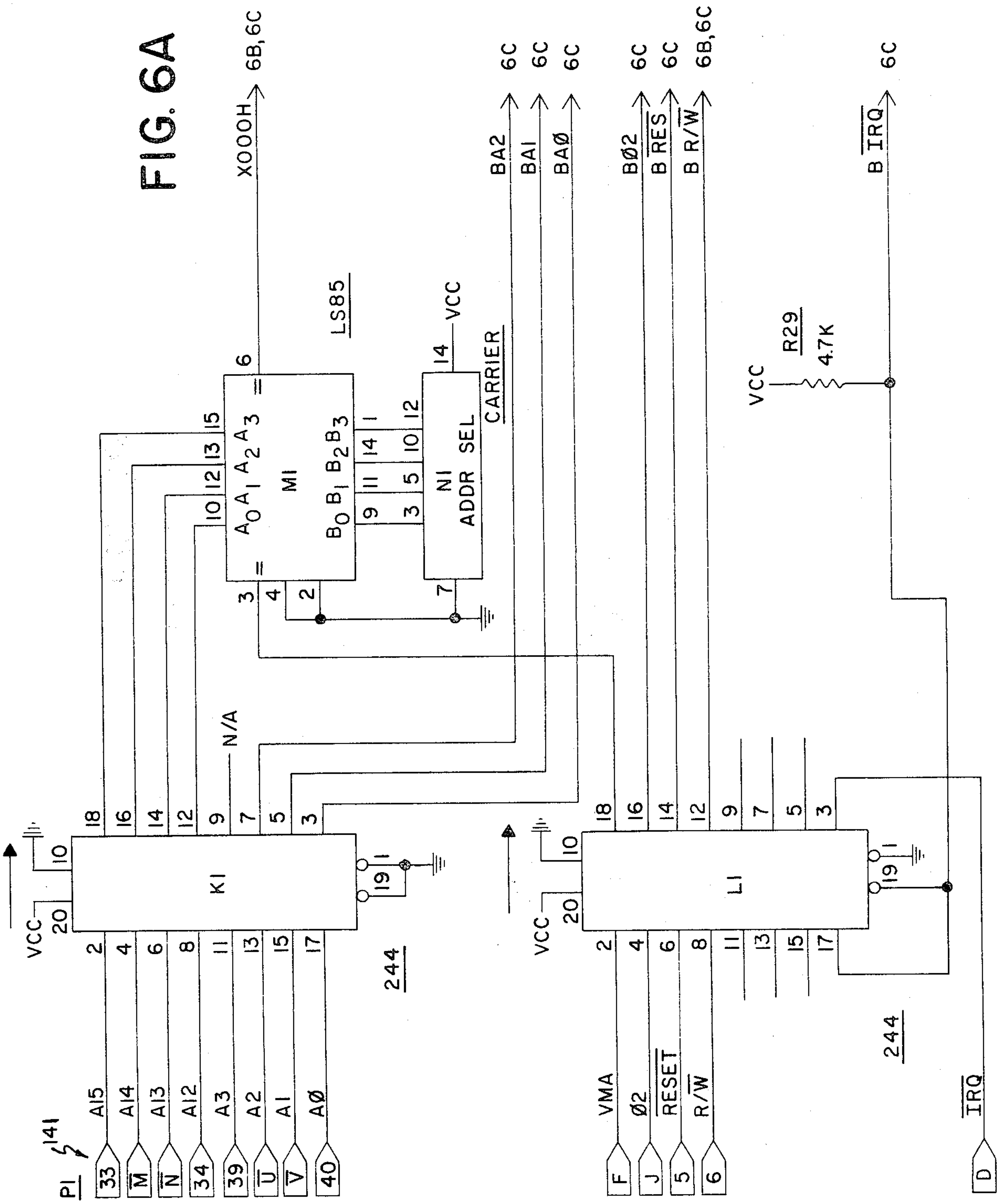
FIGS. 6A–6G are detailed schematic diagrams of the input module shown in FIG. 2.
Figure 6B:
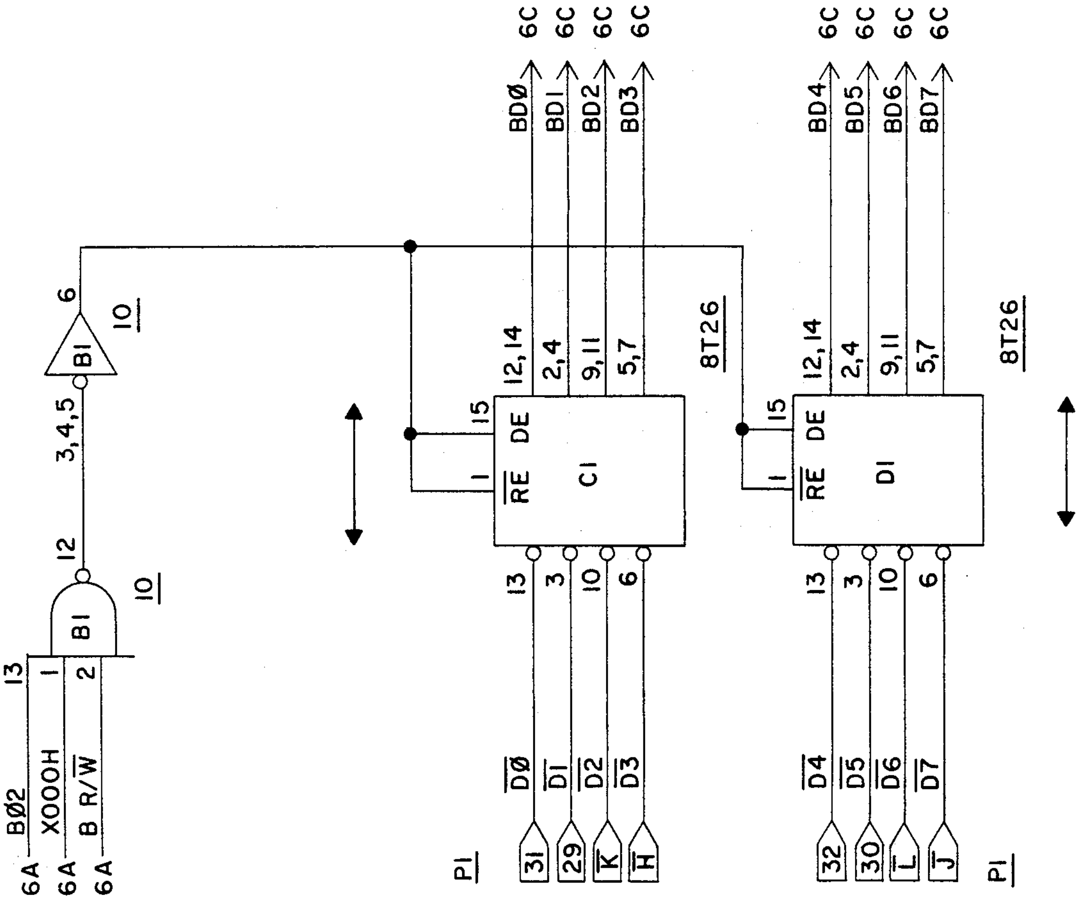
Figure 6C:
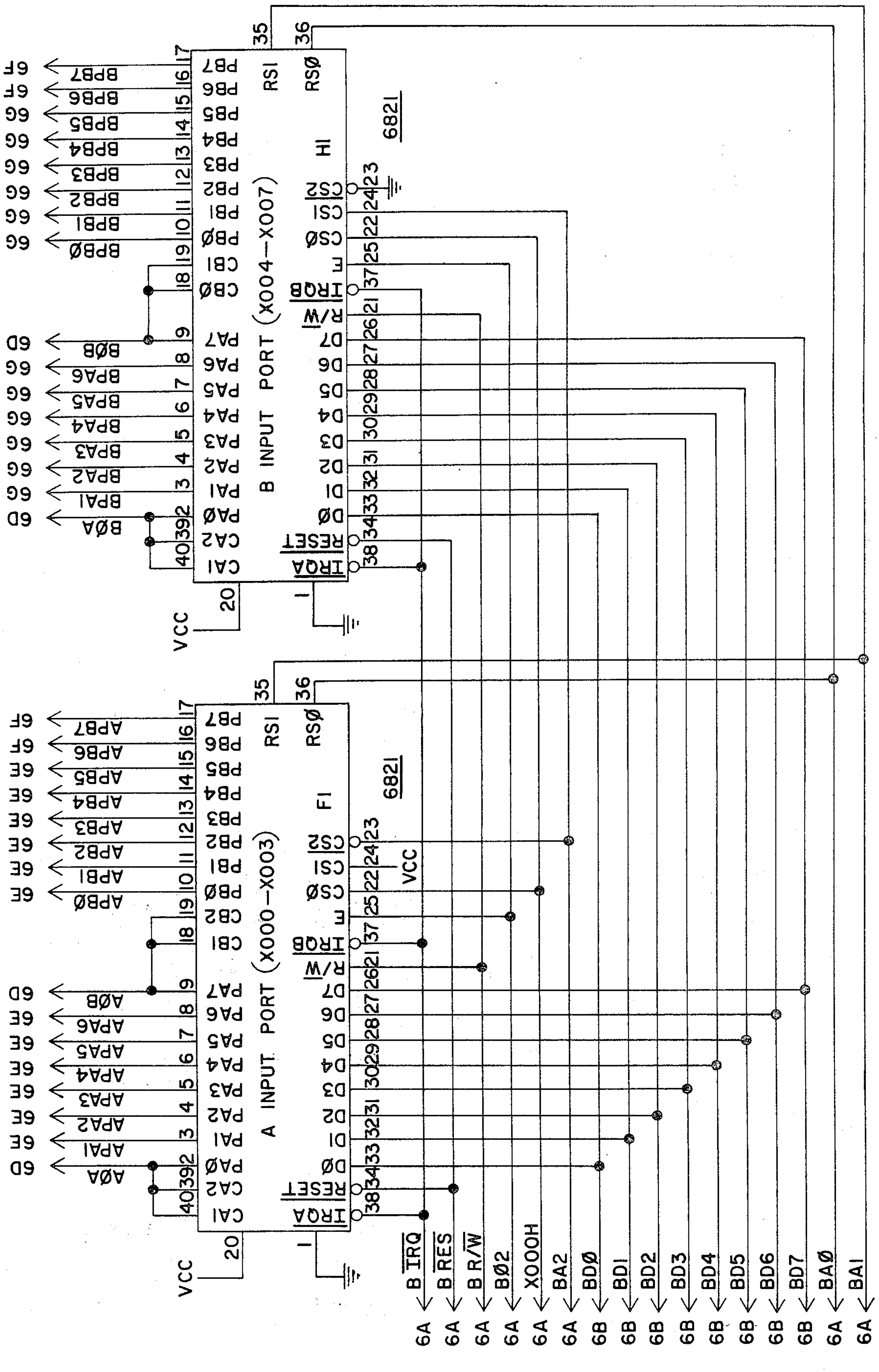
Figure 6D:
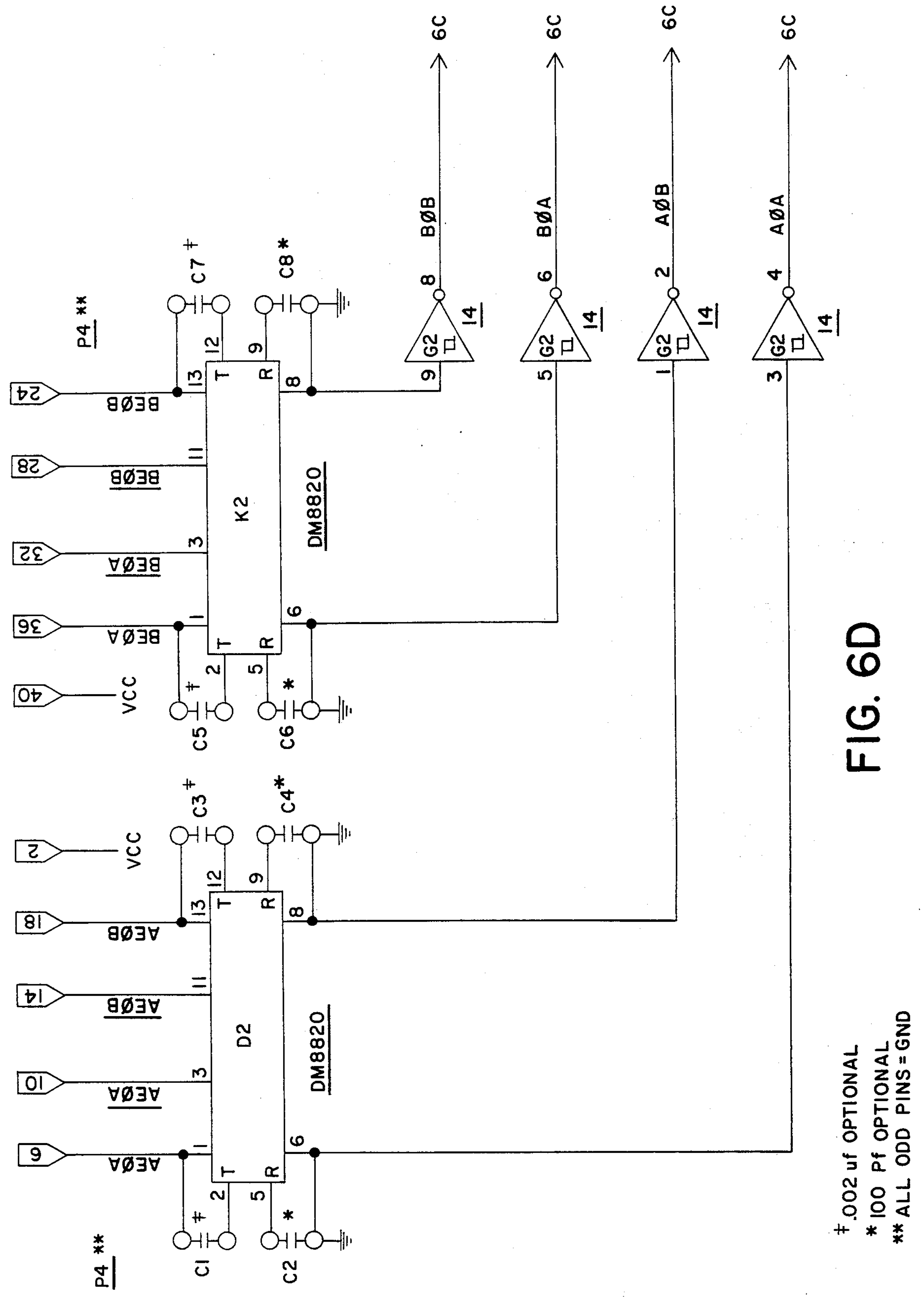
Figure 6E:
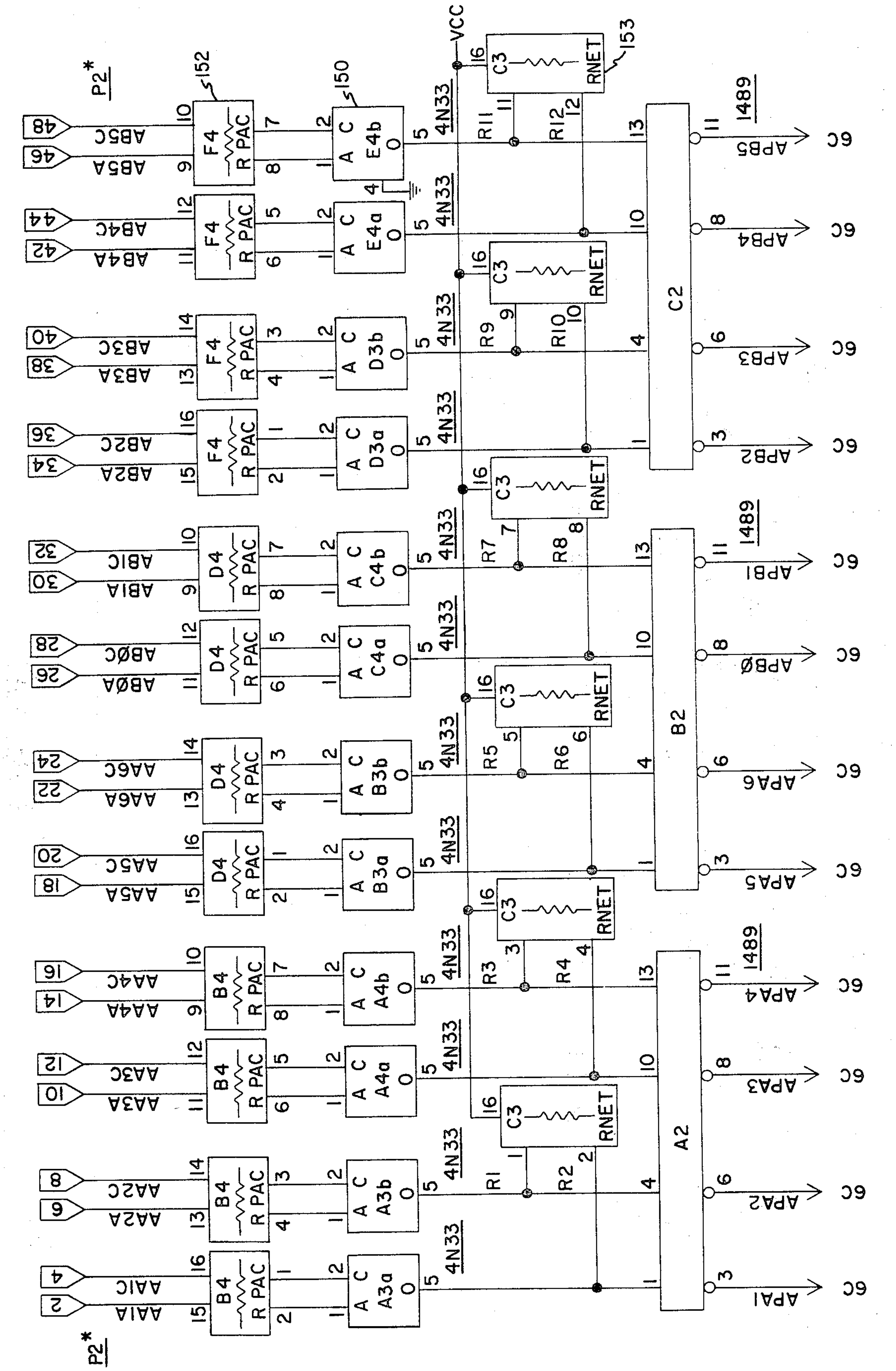
Figure 6F:
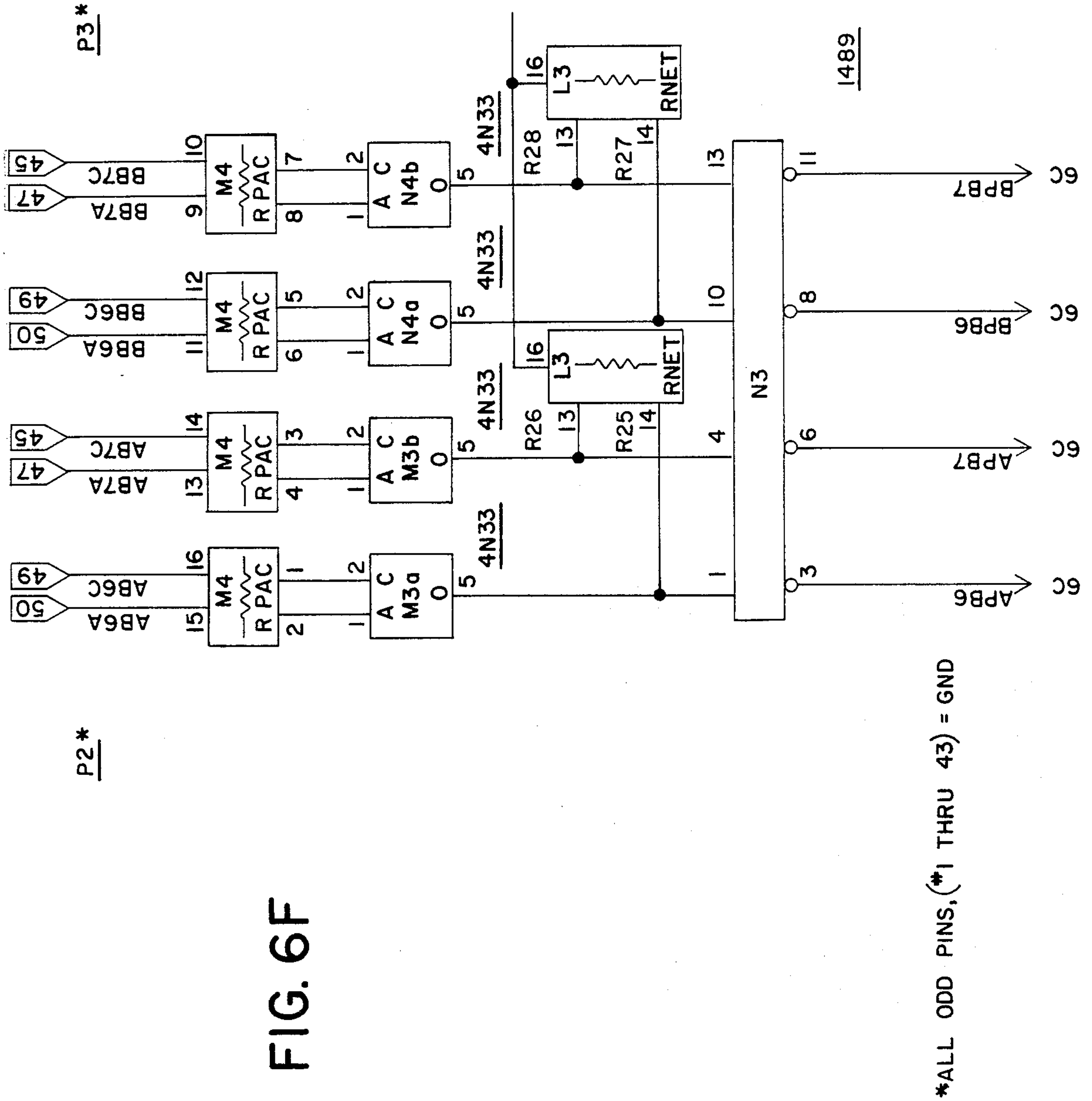
Figure 6G:
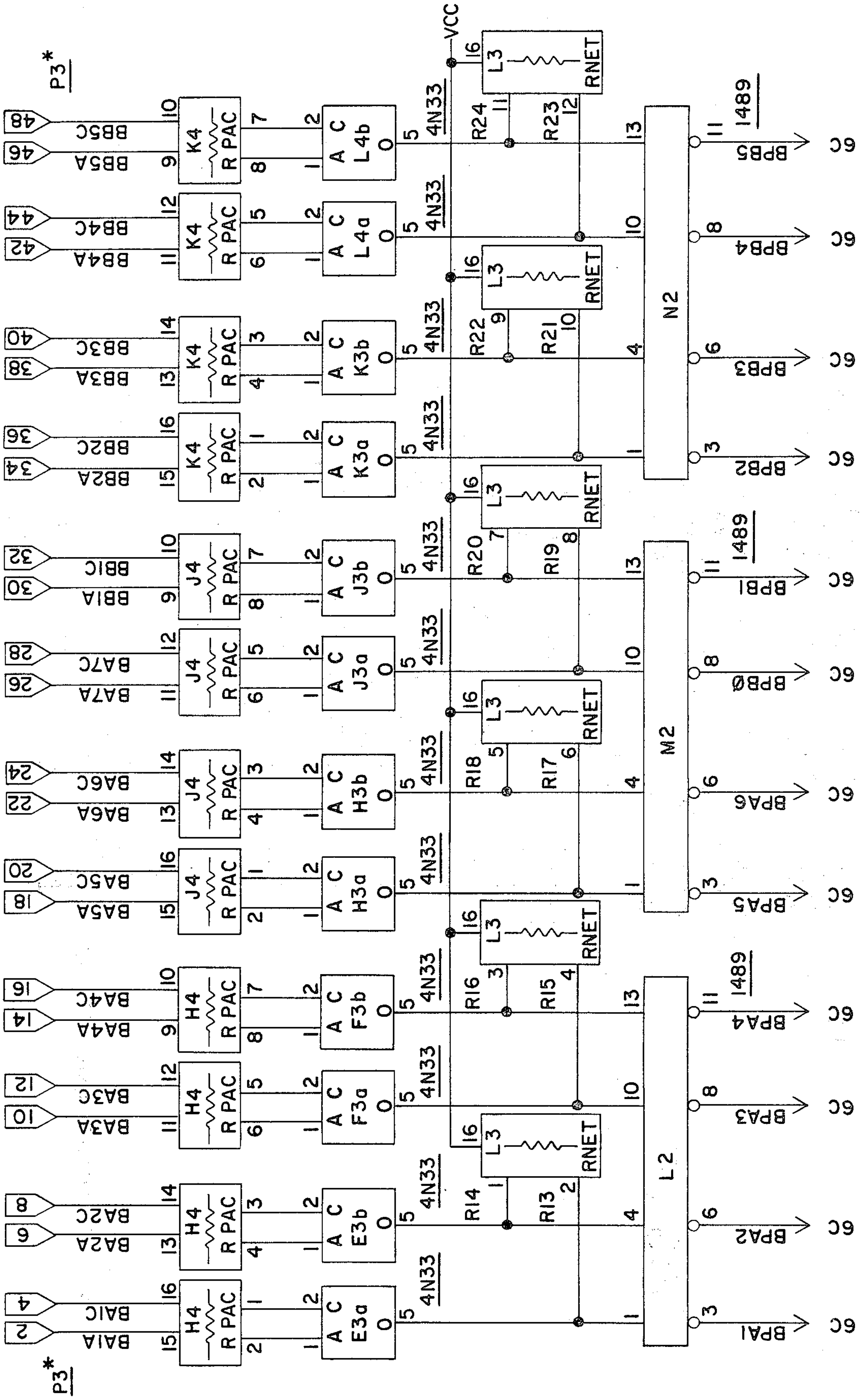

As best seen in FIG. 2, the overall automatic warp prevention control system 20 incorporates a CPU module 120, a clock 121 and control line interface, a read only memory module 122, a random access memory module 124, an analog to digital converter 126, an input module 128, an output module 130, a counter and timer module 132, an operator input/output module 134, a serial interface module 136, a power supply 138 for supplying the necessary direct current voltages for operating the other modules, and a systems bus 140 for interconnecting the various modules. As seen in FIG. 5C, each module shown in FIG. 2 is fabricated on a separate board, each connecting to a board connector 141 mounted on a ten-position mother board 142. The mother board is housed within console 22 along with the boards forming the modules shown in FIG. 2. The modules shown in FIG. 2 perform the overall control functions and operator interface as described above. Detailed schematic diagrams for the input module 128, output module 130, counter and timer module 132 and operator input/output (I/O) module 134 are presented in FIGS. 6A–6G, 7A–7E, 8A–8I, and 9A–9H, respectively. For each of these detailed circuit schematics, signals are designated by alphanumerics with their connection to other figures denoted by figure numbers adjacent the signal name. Thus in FIG. 6A, the signal designated as BA2 is transferred to the circuitry in FIG. 6C. FIG. 6C shows the signal received and also indicates from what figure the signal was transmitted. Each connector 141 by which the modules connect to the mother board 142 is designated in the detailed schematics as connector P1. The pin numbers for all these connectors correspond line for line. The other connectors shown in the detailed schematics, such as connectors P2, P3 and P4 for the input module 128, correspond to separate connectors for receiving external inputs or other signals (see FIG. 2).

Furthermore, each component shown in the detailed schematics is identified with a generic or specific manufacturer component part. For example in FIG. 6A, component K1 is a 74 LS244 octal buffer. All resistor values are denoted adjacent the component. All integrated circuit components are further identified and described in Tables 8, 9, 10 and 11 for the input module 128, output module 130, counter/timer module 132 and operator I/O module 134 respectively.

The CPU module 120, the ROM module 122, the RAM module 124, the A to D module 126, and the power supply 138 are modules purchased from outside vendors.

The following presents more detailed information regarding the modules shown in FIG. 2.

CPU-MODULE 120

This module contains a type 6800 Motorola microprocessor with 1K bytes of random access memory (RAM) and sockets for interconnecting with up to four programmable read only memories. There are two sockets used for each peripheral interface adaptor (PIA), one for each asynchronous communication interface adaptor (ACIA) used to operate an interconnected printer 147 or any other hardware which operates on the RS232C serial communication protocol. It includes the system clock 121 and control line interfacing.

The CPU module also includes address decoders and buffers utilized for printer connection with the system bus 140.

PROGRAMMABLE READ ONLY MEMORY MODULE 122

This module is manufactured by Motorola, part number M68MM04, and provides space for 16, 8 by 1K erasable programmable read only memory (EPROM) circuit components. It is used in conjunction with the four PROM spaces on the CPU module 120 so as to provide 20K of program space. The EPROMS are of the 2708 type. Each EPROM provides 1024 bytes of nonvolatile memory which contains the operating system program, control program, and the variables associated with each corrugated board physical manufacturing plant. The overall program listing is presented in a microfiche appendix. The programming language used is called MPL, and was developed by the Motorola Corporation. Other languages could, of course, be used for implementing the control tasks as enumerated in this application. As is well known in the art, the devices are cleared of data by placing them near ultraviolet rays. Programming the device is accomplished by using special circuitry, and then the EPROM chips are installed into the EPROM module 122. Once programmed, the EPROMS retain the data indefinitely. A quartz glass window is used to clear the data and is normally covered to prevent extraneous ultraviolet light rays from entering the device.

RAM MODULE 124

This device contains 2048 bytes of random access memory locations. It is used in conjunction with the 1K RAM resident on the CPU module 120 to provide 3K bytes of random access memory for the storage of variable data.

ANALOG TO DIGITAL CONVERTOR MODULE 26

This device is a Motorola M68MM15A. It contains 16 single ended input channels (although two are used in the preferred embodiment of the present invention) for converting high level (up to 10 volts DC) analog signals to 12 bit digital values. The module is used to convert the analog signals obtained from moisture analyzers 24 and 25 to a digital form for use by the computer module.

INPUT MODULE 128

Figure 6H:
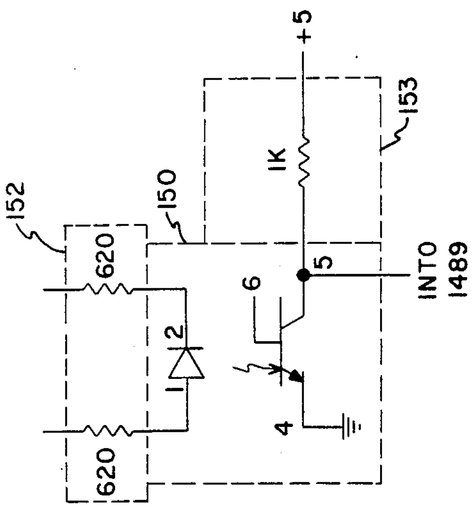
FIG. 6H is a detailed schematic diagram of the opto-isolators and resistor networks used in FIGS. 6E–6G.

As best seen in FIGS. 6A–6G, the input module connects with the system bus 141 and with external inputs including the single face liner maximum wrap input 110, the single face liner minimum wrap input 111, the single face web maximum wrap input 112, the single face web minimum wrap input 113, the double face liner maximum wrap input 114, the double face liner minimum wrap input 115, photodetector inputs 117 and remote inputs 120 (see FIG. 2). These inputs are optically isolated and buffered before presented on the system bus in response to CPU control. Details of the optical couplers 150 shown in FIGS. 6E, 6F and 6G and resistor packs 152 and 153 are shown in FIG. 6H. Each resistor pack 152 comprises two series resistors as shown in FIG. 6H as does the resistor packs 153, although only one is shown in FIG. 6H. The second resistor in each resistor pack 153 is connected to the next optical coupler, such as coupler E4a shown in FIG. 6E. The components used in FIG. 6 are presented in Table 8.

OUTPUT CONTROL MODULE 130

FIGS. 7A–7E are detailed schematics of the output module 130. This module is actually comprised of two boards, one used to control the outputs for nozzles A, B, C and D for zone 1–8 (see FIG. 4), and the second to control the outputs for nozzles A, B, C and D for zones 9–12. It also operates all relays, except relay 6CR. The components used in the output module are described in Table 9.

COUNTER/TIMER MODULE 132

The timer/counter module 132 is shown in FIGS. 8A–8I and contains four counter and timer circuits. The components are described in Table 10.

The counter and timer circuits are used to count pulses obtained from the single face web rider measuring wheel 152 and from the double face liner rider measuring wheel 154. These measuring wheels generate single face liner pulses 153 and double face liner pulses 155 (see FIGS. 1 AND 2) which are proportional to the speed of the respective liners. This information is then used to determine equipment running speed.

This module is also used to divide the system clock from its normal rate of approximately 1 megahertz to obtain a 0.1 second timing pulse which is used to provide an internal signal to read the counter status of the web rider devices and to initiate analog conversion routines in the analog to digital convertor 126, along with other low frequency type timekeeping functions.

TABLE 6

| FIG. | Reference Numeral | Item Type | Description |
|---|---|---|---|
| 6A | K1 | 74LS244 | Octal Buffer |
| | L1 | 74LS244 | Octal Buffer |
| | M1 | 74LS85 | 4-bit Comparator |
| 6B | B1-1 | 74LS10 | NAND Gate |
| | B1-5 | 74LS10 | Inverting Amplifier |
| | C1 | Signetics 8T26 | Bidirectional Buffer |
| | D1 | Signetics 8T26 | Bidirectional Buffer |
| 6C | F1 | Motorola 6821 | Peripheral Interface Adaptor (PIA) |
| | H1 | Motorola 6821 | PIA |
| 6D | D2 | National Semiconductor DM8820 | Differential Line Receiver |
| | K2 | National Semiconductor DM8820 | Differential Line Receiver |
| | G2 | 74LS14 | Inverting Amplifier |
| 6E | A3a–A3b | 4N33 | Optocoupler |
| | A4a–A4b | 4N33 | Optocoupler |
| | B3a–B3b | 4N33 | Optocoupler |
| | C4a–C4b | 4N33 | Optocoupler |
| | D3a–D3b | 4N33 | Optocoupler |
| | E42–E4b | 4N33 | Optocoupler |
| | A2 | Signetics 1489 | EIA Buffer |
| | B2 | Signetics 1489 | EIA Buffer |
| | C2 | Signetics 1489 | EIA Buffer |
| 6F | M3a–M3b | 4N33 | Optocoupler |
| | N4a–N4b | 4N33 | Optocoupler |
| | N3 | Signetics 1489 | EIA Buffer |
| 6G | E3a–E3b | 4N33 | Optocoupler |
| | F3a–F3b | 4N33 | Optocoupler |
| | H3a–H3b | 4N33 | Optocoupler |
| | J3a–J3b | 4N33 | Optocoupler |
| | K3a–K3b | 4N33 | Optocoupler |
| | L4a–L4b | 4N33 | Optocoupler |
| | L2 | Signetics 1489 | EIA Buffer |
| | M2 | Signetics 1489 | EIA Buffer |
| | N2 | Signetics 1489 | EIA Bufeer |

TABLE 7

| FIG. | Reference Numeral | Item Type | Description |
|---|---|---|---|
| 7A | G1 | 74LS244 | Octal Buffer |
| | H1 | 74LS244 | Octal Buffer |
| | K1 | 74LS85 | 4-Bit Comparator |
| | K2 | | Address Selector |
| | J1 | 74LS85 | 4-Bit Comparator |
| 7B | G2-1 | 74LS10 | NAND Gate |
| | G2-5 | 74LS10 | Inverying Amplifier |
| | B1 | Signetics 8T26 | Bidirectional Buffer |
| | C1 | Signetics 8T26 | Bidirectional Buffer |
| | C2 | 8T98 | Buffer |
| 7C | E1 | Motorola 6821 | PIA |
| | F1 | Motorola 6821 | PIA |
| 7D | A2 | 74LS244 | Octal Buffer |
| | A3a–A3b | DS3612 | Drivers |
| | B3a–B3b | DS3612 | Drivers |
| | B2 | 74LS244 | Octal Buffer |
| | D3a–D3b | DS3612 | Drivers |
| | C3a–C3b | DS3612 | Drivers |
| 7E | H2 | 74LS244 | Octal Buffer |
| | G3a–G3b | DS3612 | Drivers |
| | H3a–H3b | DS3612 | Drivers |
| | J2 | 74LS244 | Octal Buffer |
| | J3a–J3b | DS3612 | Drivers |
| | K3a–K3b | DS3612 | Drivers |

TABLE 8

| FIG. | Reference Numeral | Item Type | Description |
|---|---|---|---|
| 8A | H1 | 74LS244 | Octal Buffer |
| | J1 | 74LS244 | Octal Buffer |
| | J2 | 74LS85 | 4-Bit Comparator |
| | A2 | 74LS125 | Inverting Amplifier |
| 8B | B2-1 | 74LS10 | NAND Gate |
| | B2-5 | 74LS10 | Inverting Amplifier |
| | B1 | Signetics 8T26 | Bidirectional Buffer |
| | C1 | Signetics 8T26 | Bidirectional Buffer |
| | A1 | 74LS240 | Inverting Buffer |
| 8C | E1 | Motorola 6840 | Programmable Timer |
| | E2 | 7474 | Flip Flop |
| | C2 | 74LS07 | Inverting Amplifier |
| 8D | F1 | Motorola 6840 | Programmable Timer |
| | E2 | 7474 | Flip Flop |
| | C2 | 74LS07 | Inverting Amplifier |
| 8E | G1 | Motorola 6840 | Programmable Timer |
| | F2 | 7474 | Flip Flop |
| | D2 | 74LS07 | Inverting Amplifier |
| | C2 | 74LS07 | Inverting Amplifier |
| 8F | D1 | Motorola 6840 | Programmable Timer |
| | F2 | 7474 | Flip Flop |
| | D2 | 74LS07 | Inverting Amplifier |
| | C2 | 74LS07 | Inverting Amplifier |
| 8G | A3 | RPAC | 1K Resistor Pack |
| | B3a–B3b | 4N33 | Optocouplers |
| | C3a–C3b | 4N33 | Optocouplers |
| | D3 | RPAC | 1K Resistor Pack |
| | E3 | Signetics 1489 | EIA Buffer |
| 8H | H2 | 74138 | Decoder |
| | G2 | 74LS00 | OR Gates |
| | J3 | 74LS00 | Inverting Amplifier |
| | J3-1 | 74LS00 | NAND Gate |
| 8I | F3 | National Semiconductor DM8820 | Differential Line Receiver |
| | G3 | National Semiconductor DM8820 | Differential Line Receiver |
| | H3 | 74LS14 | Inverting Amplifier |

TABLE 9

| FIG. | Reference Numeral | Item Type | Description |
|---|---|---|---|
| 9A | U28 | 74LS244 | Octal Buffer |
| | U27 | 74LS244 | Octal Buffer |
| | U29 | 74LS85 | 4-Bit Comparator |
| 9B | U23-1 | 74LS10 | NAND Gate |
| | U23-5 | 74LS10 | Inverting Amplifier |
| | U21 | Signetics 8T26 | Bidirectional Buffer |

TABLE 9-continued

| FIG. | Reference Numeral | Item Type | Description |
|---|---|---|---|
| | U22 | Signetics 8T26 | Bidirectional Buffer |
| 9C | U25 | Motorola 6821 | PIA |
| | U26 | Motorola 6821 | PIA |
| 9D | U4 | 74175 | Quad Latches |
| | U5 | 74175 | Quad Latches |
| | U6 | 74175 | Quad Latches |
| | U11 | 74175 | Quad Ltaches |
| | U12 | 74175 | Quad Latches |
| | U13 | 74175 | Quad Latches |
| 9E | U1 | DS3612 | Drivers |
| | U2 | DS3612 | Drivers |
| | U3 | DS3612 | Drivers |
| | U8 | DS3612 | Drivers |
| | U9 | DS3612 | Drivers |
| | U10 | DS3612 | Drivers |
| 9F | U20 | 74138 | Decoder |
| | U24 | 74138 | Decoder |
| 9G | U17 | 74LS244 | Octal Buffer |
| | U16 | 74LS244 | Octal Buffer |
| | U30 | 8T97 | Buffer |
| 9H | U14 | ResNet | Buffer |
| | U7 | 8T98 | Buffer |
| | U18 | 74LS240 | Buffer |
| | U15 | 8T98 | Buffer |
| | U19 | 74LS240 | Buffer |

OPERATOR INPUT/OUTPUT MODULE 134

FIGS. 9A–9H are detailed schematics of the operator I/O module 134. This module interfaces with displays 27, 29 and 33, power on-off button 38, and keyboard area 26 in order to provide interaction between the automatic warp prevention control system and the user. The module thus contains all the inputs and outputs to operate the switches, lamps, displays associated with the control console 22. Component information for this module is given in Table 11.

POWER SUPPLY 138

The power supply is of conventional design such as those manufactured by Motorola and generates 3 voltages, +5 VDC, +12 VDC and −12 VDC, for use with the other modules. The output from the power supply is cabled to the mother board 142.

In addition, the present invention incorporates a relay panel 155 (see FIG. 5) which contains sockets for 18 relays as well as an unregulated 20 volt power supply to operate the relays and switch lamps. The relays are in turn driven by the outputs of the output module 130 for activating the wrap arm controls and spray nozzles.

SUMMARY

Thus, what has been described is an automatic warp prevention control system for corrugated board manufacture which maintains both overall average moisture content differences within prescribed limits as well as zonal time average moisture levels within other prescribed limits. Through this combined automatic control of both overall average and zonal time average moisture content differences between the liners, it has been experimentally found at recent test installations at Cameo Container Corporation in Chicago, Ill. and Mead Container Corporation in Covington, Ga. that significantly reduce warpage from the corrugated board occurs with use of the present invention.

Thus it will be seen that the objects set forth above, and those made apparent from the preceding description, are efficently attained, and since certain changes may be made in carrying out the above construction and method and without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An automatic warp prevention apparatus for use with a corrugator machine for fabricating corrugated board from at least a single-face liner, a medium, and a double-face liner, the corrugator machine including separate means responsive to at least a received adjusting signal, for adjusting the overall moisture content of at least the single-face liner and double-face liner, comprising:

(A) means for sensing the moisture content of the double-face liner across the liner's width so as to obtain a plurality of readings;

(B) means for sensing the moisture content of the single-face liner across the liner's width so as to obtain a plurality of readings; and (C) means for processing the sensed double-face liner and single-face liner moisture readings, including (1) averaging the double-face liner readings, (2) averaging the single-face liner readings, (3) determining the average moisture difference between the reading average of the double-face liner and single-face liner, and (4) if the average moisture content difference is outside of a predetermined band about a desired average moisture offset, said desired average moisture offset having any positive,. negative or zero value and said band having any positive, negative or zero value, then generating the adjusting signal with a magnitude proportional to the amount the average moisture content difference is different from the desired average moisture offset.

2. An automatic warp prevention apparatus as defined in claim 1, wherein the corrugator machine further comprises means responsive to at least a received adjusting signal for adjusting the overall moisture content of the single-face web and wherein the automatic warp prevention apparatus processing means includes first means for generating an adjusting signal to the single-face liner adjusting means if adjustment is needed with respect thereto, and if no further adjustment can be made by the single-face liner adjusting means, generating an adjusting signal to the single-face web adjusting means.

3. An automatic warp prevention apparatus as defined in claim 2, wherein the corrugator machine separate means for adjusting overall moisture content comprises preheaters with wrap arms and limit switches, the limit switches indicatin when no further adjustment can be made to the wrap arm, and wherein the automatic warp prevention apparatus processing means further comprises means for sensing the ON and OFF states of the limit switches so as to determine when no further adjustment can be made to the corresponding wrap arm.

4. An automatic warp prevention apparatus as defined in claim 1, wherein the corrugator machine separate means for adjusting overall moisture content comprises preheaters with wrap arms.

5. An automatic warp prevention apparatus as defined in claim 1, wherein the processing means further comprises means for generating an adjusting signal to the single-face liner adjusting means if the reading average of the single-face liner is above a maximum desired absolute moisture or below a minimum desired absolute moisture and for generating an adjusting signal to the double-face liner adjusting means if the reading average of the double-face liner is above a maximum desired absolute moisture or below a minimum desired absolute moisture.

6. An automatic warp prevention apparatus as defined in claims 1 or 5 wherein means for sensing the moisture contents of the single-face liner and the means for sensing the moisture of the double-face liner includes means for repetitively scanning the single-face liner and double-face liner.

7. An automatic warp prevention apparatus as defined in claim 6 further comprising means responsive to at least zone adjusting signals, for adjusting the moisture content to at least one of the liners over a plurality of zones and wherein the means for sensing the moisture content of the single-face liner and the double-face liner respectively include means for obtaining a plurality of readings over a plurality of zones corresponding to the zones used to adjust the moisture content, and further wherein the processing means includes means for determining the moisture difference between the double-face liner and single-face liner on a zone-by-zone basis and comparing each of these zone differences to at least one desired zone moisture difference, the zone moisture difference having any positive, negative or zero value, and if different from the desired zone moisture difference by a predetermined amount, generating a zone adjusting signal proportional to the difference between the actual and desired zone moisture difference.

8. An automatic warp prevention apparatus as defined in claim 7, wherein the means for adjusting the moisture content over a plurality of zones comprises a water spray bar and controller.

9. An automatic warp prevention apparatus as defined in claims 1, 3, 4 or 5, further comprising means for sensing the double-face liner speed and means for sensing the single-face liner speed and wherein the processing means generating of the adjusting signal is further proportional to the speed of the liner to which the mositure adjustment is to be made.

10. An automatic warp prevention apparatus as defined in claim 9 wherein means for sensing the moisture contents of the single-face liner and the means for sensing the moisture of the double-face liner includes means for repetitively scanning the single-face liner and the double-face liner.

11. An automatic warp prevention apparatus as defined in claim 9 further comprising means responsive to at least zone adjusting signals, for adjusting the moisture content to at least one of the liners over a plurality of zones and wherein the means for sensing the moisture content of the single-face liner and the double-face liner respectively include means for obtaining a plurality of readings over a plurality of zones corresponding to the zones used to adjust the moisture content, and further wherein the processing means includes means for determining the difference between the double-face liner and single-face liner on a zone-by-zone basis and comparing each of these zone differences to at least one desired zone moisture difference, the zone moisture difference having any positive, negative or zero value, and if different from the desired zone moisture, difference by a predetermined amount, generating a zone adjusting signal proportional to the difference between the actual and desired zone moisture difference.

12. An automatic warp prevention apparatus as defined in claim 11, wherein the processing means further comprises means for determining the edges of the single-face liner and double-face liner, said means receiving the sensed moisture content readings for the single-face liner and double-face liner, and for each liner determining when, if ever, the readings are consecutively greater than said corresponding threshold values and if such consecutive acceptable readings are obtained, determining the edge of the liner as the next acceptable reading for that liner.

13. An automatic warp prevention apparatus ad defined in claim 12, wherein a variable (EDGES) is defined related to the number of readings to discard after an edge has been determined, wherein the processing means further comprises means for discarding consecutive readings from the determined edge proportional to the value of variable EDGES so as to insure that the moisture readings for the edges of the liners are accurate.

14. An automatic warp prevention apparatus as defined in claim 13, wherein the apparatus further comprises a variable (ZNVAL) which is proportional to the number of acceptable readings, consecutive or otherwise, which must be sampled for each zone of a given liner before the readings for that zone can be used for processing zonal moistures and wherein the processing means further comprises means for reading the value of variable ZNVAL so as to accomplish said result.

15. An automatic warp prevention apparatus as defined in claim 14, wherein in the processing means generating of the zone adjusting signals comprises, for each zone, means for calculating a zonal adjusting value equal to the zonal difference value (Z DIFF), minus any desired zone moisture offset, the result times a first multiplying factor if the result is positive, and times a second multiplying factor if the result is negative, and adding the overall result to the previously calculated zonal adjusting value if such a value exists, and wherein if the zonal adjusting value is greater than a predetermined amount, generating the zone adjusting signal equal in value thereto.

16. An automatic warp prevention apparatus as defined in claim 15, further comprising means for sensing external parameters and wherein the processing means further comprises means for deactivating the generation of the adjusting signal and the zone adjusting signal if one or more sensed external parameters exceed predetermined values.

17. An automatic warp prevention apparatus as defined in claim 16, further comprising a console interconnected to the processing and moisture sensing means for user input of information and for display of at least some of the operating conditions of the apparatus.

18. An automatic warp prevention apparatus as defined in claim 17, wherein the means for adjusting the moisture content over a plurality of zones comprises a water spray bar and controller.

19. An automatic warp prevention apparatus as defined in claim 1, further comprising means for sensing external parameters and wherein the processing means further comprises means for deactivating the generation of adjusting signal and zone adjusting signal if one or more sensed external parameters exceed predetermined values.

20. An automatic warp prevention apparatus as defined in claim 1, further comprising a console interconnected to the processing and moisture sensing means for user input of information and for display of at least some of the operating conditions of the apparatus.

21. An automatic warp prevention apparatus for use with a corrugator machine for fabricating corrugated board from at least a single-face liner, a fluted medium, and a double-face liner, the single-face liner/fluted medium combination called a single-face web, comprising (A) means for sensing the moisture content of the double-face liner across the liner's width so as to obtain a plurality of readings over a plurality of zones of the double-face liner;

(B) means for sensing the moisture content of the single-face liner across the web's width so as to obtain a plurality of readings over a plurality of zones of the single-face web;

(C) means for adjusting the moisture content to at least one of the liners over a plurality of zones corresponding to the zones used to measure the moisture content in the single-face web and double-face liner, wherein the amount of moisture adjustment for each zone is variable from a first lower limit to a second upper limit; and (D) means for processing the sensed double-face liner and single-face web moistures and comparing the difference between these moistures on a zone by zone basis with at least one desired zone moisture difference, the zone moisture difference being any amount positive, negative or zero, and if different from the desired zone moisture difference by a predetermined amount, activating said zonal moisture applying means by an amount proportional to the difference between the actual and desired zone moisture difference.

22. An automatic warp prevention apparatus as defined in claim 21, wherein the moisture sensing means includes means for repetitively transversely scanning the single-face liner and double-face liner and providing a plurality of moisture readings for each zone of the single-face liner and double-face liner, and wherein the processing means further comprises means for discarding all readings for the single-face web and double-face liner if such readings are below corresponding threshold values.

23. An automatic warp prevention apparatus as defined in claim 22, wherein the processing means further comprises means for determining the edges of the single-face liner and double-face liner, said means receiving the sensed moisture content readings for the single-face liner and double-face liner, and for each liner determining when, if ever, the readings are consecutively greater than said corresponding threshold values and if such consecutive acceptable readings are obtained, determining the edge of the liner as the next acceptable reading for that liner.

24. An automatic warp prevention apparatus as defined in claim 23, wherein a variable (EDGES) is defined related to the number of readings to discard after an edge has been determined, wherein the processing means further comprises means for discarding consecutive readings from the determined edge proportional to the value of variable EDGES so as to insure that the moisture readings for the edges of the liners are accurate.

25. An automatic warp prevention apparatus as defined in claim 24, wherein the apparatus further comprises a variable (ZNVAL) which is proportional to the number of acceptable readings, consecutive or otherwise, which must be sampled for each zone of a given liner before the readings for that zone can be used for processing zonal moistures and wherein the processing means further comprises means for reading the value of variable ZNVAL so as to accomplish said result.

26. An automatic warp prevention apparatus defined in claims 21, 22, or 25, wherein the processing means further comprises means for calculating a zonal count average moisture content for the double-face liner and single-face web equal to the corresponding acceptable readings for each zone divided by the number of acceptable readings for that zone, and further comprising means for calculating for each zone of each liner a zonal time average moisture value equal to a fractional amount of the zonal count average plus a fractional amount of the previously calculated zonal time average moisture value if such a previous zonal time average moisture value exists; and wherein the difference between the zonal moistures is the difference between the corresponding zonal time average moisture values (Z DIFF).

27. An automatic warp prevention apparatus as defined in claim 26, further comprising means for sensing external parameters and wherein the processing means further comprises means for deactivating the generation of adjusting signal and zone adjusting signal if one or more sensed external parameters exceed predetermined values.

28. An automatic warp prevention apparatus as defined in claim 27, further comprising a console interconnected to the processing and moisture sensing means for user input of information and for display of at least some of the operating conditions of the apparatus.

29. An automatic warp prevention apparatus as defined in claim 28, wherein the means for adjusting the moisture content over a plurality of zones comprises a water spray bar and controller.

30. An automatic warp prevention apparatus as defined in claim 21, wherein the means for adjusting the moisture content over a plurality of zones comprises a water spray bar and controller.

31. An automatic warp prevention apparatus as defined in claim 21, further comprising means for sensing external parameters and wherein the processing means further comprises means for deactivating the generation of adjusting signal and zone adjusting signal if one or more sensed external parameters exceed predetermined values.

32. An automatic warp prevention apparatus as defined in claim 21, further comprising a console interconnected to the processing and moisture sensing means for user input of information and for display of at least some of the operating conditions of the apparatus.

33. An automatic warp prevention apparatus as defined in claim 21, wherein the means for sensing the single-face liner moisture and the means for sensing the double-face liner moisture further comprises means for increasing the value of the sensed moisture if the paper weight is less than a predetermined amount and if the sensed moisture reading is less than another predetermined amount.

34. An automatic warp prevention apparatus as defined in claim 21, wherein the means for sensing the single-face liner moisture and the means for sensing the double-face liner moisture generate analog type readings and further wherein an analog to digital converter generates a digital signal proportional to the analog moisture reading for interfacing to the processing means.

35. An automatic warp prevention apparatus for use with a corrugator machine for fabricating corrugated board from at least a single-face liner, a fluted medium, and a double-face liner, the single-face liner/fluted medium combination called a single-face web, comprising (A) means for sensing the moisture content of the double-face liner across the liner's width so as to obtain a plurality of readings over a plurality of zones of the double-face liner;

(B) means for sensing the moisture content of the single-face liner across the web's width so as to obtain a plurality of readings over a plurality of zones of the single-face web;

(C) means for sensing the double-face liner speed;

(D) means for sensing the single-face web speed;

(E) means for adjusting the moisture content to at least one of the liners over a plurality of zones corresponding to the zones used to measure the moisture content in the single-face web and double-face liner, wherein the amount of moisture adjustment for each zone is variable from a first lower limit to a second upper limit;

(F) means for processing the sensed double-face liner and single face web moistures, and the double-face liner and single-face web speeds, and comparing the difference between these moistures on a zone by zone basis with at least one desired zone moisture difference, the zone moisture difference being any amount positive, negative or zero, and if different from the desired zone moisture difference by a predetermined amount, activating said zonal moisture applying means by an amount proportional to the difference between the actual and desired zone moisture difference and proportional to the speed of the liner to which the spray is applied.

36. An automatic warp prevention apparatus as defined in claim 35, wherein the moisture sensing means includes means for repetitively transversely scanning the single-face liner and double-face liner and providing a plurality of moisture readings for each zone of the single-face liner and double-face liner, and wherein the processing means further comprises means for discarding all readings for the single-face liner and double-face liner if such readings are below corresponding threshold values.

37. An automatic warp prevention apparatus as defined in claim 36, wherein the processing means further comprises means for determining the edges of the single-face liner and double-face liner, said means receiving the sensed moisture content readings for the single-face liner and double-face liner, and for each liner determining when, if ever, the readings are consecutively greater than said corresponding threshold values and if such consecutive acceptable readings are obtained, determining the edge of the liner as the next acceptable reading for that liner.

38. An automatic warp prevention apparatus as defined in claim 37, wherein a variable (EDGES) is defined related to the number of readings to discard after an edge has been determined, wherein the processing means further comprises means for discarding consecutive readings from the determined edge proportional to the value of variable EDGES so as to insure that the moisture readings for the edges of the liners are accurate.

39. An automatic warp prevention apparatus as defined in claim 38, wherein the apparatus further comprises a variable (ZNVAL) which is proportional to the number of acceptable readings, consecutive or otherwise, which must be sampled for each zone of a given liner before the readings for that zone can be used for processing zonal moistures and wherein the processing means further comprises means for reading the value of variable ZNVAL so as to accomplish said result.

40. An automatic warp prevention apparatus defined in claims 35, 36 or 39 wherein the processing means further comprises means for calculating a zonal count average moisture content for the double-face liner and single-face web equal to the corresponding acceptable readings for each zone divided by the number of acceptable readings for that zone, and further comprising means for calculating for each zone of each liner a zonal time average moisture value equal to a fractional amount of the zonal count average plus a fractional amount of the previously calculated zonal time average moisture value if such a previous zonal time average moisture value exists; and wherein the difference between the zonal moistures is the difference between the corresponding zonal time average moisture values (Z DIFF).

41. An automatic warp prevention apparatus as defined in claim 40, wherein the processing means determination of the amount of activation to the zonal moisture applying means comprises, for each zone, means for calculating a zonal spray level value equal to the zonal difference value (Z DIFF) minus any desired zone moisture difference, the result times a first multiplying factor if the result is positive, and times a second multiplying factor if the result is negative, and adding the overall result to the previously calculated zonal spray level value if such a value exists, and wherein if the spray level value is greater than a predetermined amount, causing zonal spray to occur for that zone proportional to the spray level value.

42. An automatic warp prevention apparatus as defined in claim 41 wherein the processing means determination of the zonal time average moisture difference further comprises means for reducing the zonal time average moisture difference value by an overall average moisture offset factor.

43. An automatic warp prevention apparatus as defined in claim 35, wherein the means for sensing the single-face liner moisture and the means for sensing the double-face liner moisture further comprises means for increasing the value of the sensed moisture if the paper weight is less than a predetermined amount and if the sensed moisture reading is less than another predetermined amount.

44. An automatic warp prevention apparatus as defined in claim 35, wherein the means for sensing the single-face liner moisture and the means for sensing the double-face liner moisture generate analog type readings and further wherein an analog to digital converter generates a digital signal proportional to the analog moisture reading for interfacing to the processing means.

45. An automatic warp prevention apparatus for use with a corrugator machine for fabricating corrugated board from at least a single-face liner, a fluted medium, and a double-face liner, comprising:

(A) means for sensing the moisture content of the double-face liner across the liner's width so as to obtain a plurality of readings over a plurality of zones of the double-face liner;

(B) means for sensing the moisture content of the single-face liner across the liner's width so as to obtain a plurality of readings over a plurality of zones of the single-face liner;

(C) means for processing the sensed double-face liner and single face-liner moisture readings so as to determine, (1) a zonal moisture count average value for at least some of the zones of each liner wherein the count average value is equal to the number of readings made for a particular zone divided by the total number of said readings;

(2) determining a zonal time average moisture percentage for each zone of each liner for which a count average value has been determined wherein the zonal time average moisture percentage is assigned the value of the latest zonal moisture count average value times a weighting factor plus one minus the weighting factor times the previously calculated zonal time average moisture percentage; where the weighting factor is a number between 0 and 1; and (3) determining a zonal time average moisture difference value equal to the difference between the zonal time average moisture percentage for the double-face liner and the single-face liner on a corresponding zone by zone basis; and (D) means for applying moisture to one of the liners over a plurality of said zones wherein the amount of moisture for each zone is proportional to the zonal time average moisture difference value for that zone.

46. An automatic warp prevention apparatus as defined in claim 45, wherein the processing means further determines a zonal spray level value for each zone equal to the zonal time average moisture difference value (Z DIFF value) times a first multiplying factor if the Z DIFF value is positive and times a second multiplying factor if the Z DIFF value is negative, and adding this result to the previously calculated zonal spray level value if such a value exists, and wherein the zonal moisture applying means applies moisture to each zone proportional to the spray level value for that zone.

47. An automatic warp prevention apparatus as defined in claims 45 or 46, wherein the zonal time average moisture difference value is further dependent upon an overall average moisture offset factor.

48. An automatic warp prevention apparatus as defined in claim 47, wherein the zonal time average moisture difference value is further dependent upon a spray offset factor.

49. An automatic warp prevention apparatus as defined in claim 48, wherein the processing means determination of the zonal time average moisture difference value is equal to the zonal time average moisture value of the double-face liner minus the zonal time average moisture value of the single-face liner minus the overall average moisture offset factor minus the spray offset factor.

50. An automatic warp prevention apparatus as defined in claim 45, wherein the processing means further comprises means for discarding all moisture content readings for the double-face liner and single-face liner if said readings are below corresponding threshold values.

51. An automatic warp prevention apparatus defined in claim 50, wherein the processing means further comprises means for determining the edges of the single-face liner and double-face liner by receiving the sensed moisture content readings for the single-face liner and double-face liner, and for each of said liners determining when, if ever, the readings are consecutively greater than said corresponding threshold values for a number of readings where n is an integer greater than one, and if such consecutive acceptable readings are obtained, determining the edge of the liner as the next acceptable reading for that liner.

52. An automatic warp prevention apparatus as defined in claim 51, wherein a variable (EDGES) is defined as the number of readings to discard after an edge has been determined and wherein the processing means further comprises means for discarding the number of readings equal to the variable EDGES.

53. An automatic warp prevention apparatus as defined in claim 52, wherein the apparatus further comprises a variable (ZNVAL) which is proportional to the number of acceptable readings, consecutive or otherwise, which must be sampled for each zone of a given liner before the readings for that zone can be used for processing zonal moistures, and wherein the processing means further comprises means for reading the variable ZNVAL and generating a zonal count average moisture value if the number of acceptable readings is greater than this variable value.

54. An automatic warp prevention apparatus as defined in claims 51 or 52, wherein the processing means further comprises means for determining if the edges of the single-face liner and the double-face liner are aligned with each other within a tolerance band, and if the edges are not within this band preventing activation of the moisture applying means.

55. An automatic warp prevention apparatus as defined in claim 54, further comprising means for sensing external parameters and wherein the processing means further comprises means for deactivating the moisture applying means if one or more external parameters exceed predetermined values.

56. An automatic warp prevention apparatus as defined in claim 55, further comprising a console interconnected to the processing means, the moisture sensing means, and the moisture applying means for user input of information and for display of at least some of the operating conditions of the apparatus.

57. An apparatus for controlling the characteristic of at least two sheets with respect to each other comprising:

(A) means for sensing the characteristic for the first sheet across the sheet's width so as to obtain a plurality of readings;

(B) means for sensing the characteristic for the second sheet across the sheet's width so as to obtain a plurality of readings;

(C) means for processing the sensed first sheet and second sheet readings, including (1) averaging the first sheet's readings, (2) averaging the second sheet's readings, (3) determining the average difference between the reading average of the first and second sheets, and (4) if the average difference is outside of a predetermined band about a desired offset, said desired offset having any value positive, negative, or zero value and said band having any positive, negative or zero value, then generating an adjusting signal with a magnitude proportional to the amount the average difference is different from the desired average offset, and (D) means, responsive to the adjusting signal, for adjusting the characteristic of the first or second sheet, or both sheets, so as to reduce the difference between the average difference and the desired offset.

58. An apparatus as defined in claim 57, wherein the processing means further comprises means for generating an adjusting signal to the first sheet adjusting means if the reading average of the first sheet is above a maximum desired absolute value or below a minimum desired absolute value and for generating an adjusting signal to the second sheet adjusting means if the reading average of the second sheet is above a maximum desired absolute value or below a minimum desired absolute value.

59. An apparatus as defined in claims 57 or 58 wherein the means for sensing the characteristic of the first sheet and the means for sensing the characteristic of the second sheet includes means for repetitively scanning the first sheet and the second sheet.

60. An apparatus as defined in claim 59, further comprising means responsive to at least zone adjusting signals, for adjusting the characteristic to at least one of the sheets over a plurality of zones and wherein the means for sensing the characteristic of the first sheet and the second sheet respectively include means for obtaining a plurality of readings over a plurality of zones corresponding to the zones used to adjust the characteristic, and further wherein the processing means includes means for determining the difference between the first sheet and the second sheet on a zone-by-zone basis and comparing each of these zone differences to at least one desired zone difference, the zone difference having any positive, negative or zero value, and if different from the desired zone difference by a predetermined amount, generating a zone adjusting signal proportional to the difference between the actual and desired zone difference.

61. An automatic warp prevention apparatus as defined in claim 60, further comprising means for sensing the speed of the first sheet and means for sensing the speed of the second sheet and wherein the processing means generating of the adjusting signal is further proportional to the speed of the sheet to which the adjustment is to be made.

62. An apparatus as defined in claim 61, wherein the processing means further comprises means for determining the edges of the first sheet and the second sheet, said means receiving the readings for the first sheet and the second sheet, and for each sheet determining when, if ever, the readings are consecutively greater than said corresponding threshold values and if such consecutive acceptable readings are obtained, determining the edge of the sheet as the next acceptable reading for that liner.

63. An automatic warp prevention apparatus as defined in claim 57, further comprising means for sensing the speed of the first sheet and means for sensing the speed of the second sheet and wherein the processing means generating of the adjusting signal is further proportional to the speed of the sheet to which the adjustment is to be made.

64. A method of improving corrugated board manufactured from a corrugating machine using at least a single-face liner, a medium, and a double-face liner, the corrugator machine including separate means responsive to at least a received adjusting signal, for adjusting the overall moisture content of at least the single-face liner and double-face liner, comprising the steps of:

(A) sensing the moisture content of the double-face liner across the liner's width so as to obtain a plurality of readings;

(B) sensing the moisture content of the single-face liner across the liner's width so as to obtain a plurality of readings; and (C) processing the sensed double-face liner and single-face liner moisture readings, including (1) averaging the double-face liner readings, (2) averaging the single-face liner readings, (3) determining the average moisture difference between the reading average of the double-face liner and single-face liner, and (4) if the average moisture content difference is outside of a predetermined band about a desired average moisture offset, said desired average moisture offset having any value positive, negative, or zero value and said band having any positive, negative or zero value, then generating the adjusting signal with a magnitude proportional to the amount if the average moisture content difference is different from the desired average mositure offset.

65. A method of improving corrugated board as defined in claim 64 wherein the corrugating machine further comprises means responisve to at least a received adjusting signal for adjusting the overall moisture content of the medium, and wherein the method's processing step further comprises the substeps of generating an adjusting signal to the single-face liner adjusting means if adjustment is needed with respect thereto, and if no further adjustment can be made by the single-face liner adjusting means, generating an adjusting signal to the medium adjusting means.

66. A method of improving corrugated board as defined in claim 65, wherein the corrugator machine separate means for adjusting overall mositure content comprises preheaters with wrap arms and limit switches, the limit switches indicating when no further adjustment can be made to the wrap arm, and wherein the method's processing step further comprises the substeps of sensing the ON and OFF states of the limit switches so as to determine when no further adjustment can be made to the corresponding wrap arm.

67. A method of improving corrugat.de board as defined in claim 66, wherein the processing step further comprises the substeps of generating an adjusting signal to the single-face liner adjusting means if the reading average of the single-face liner above a maximum desired absolute moisture or below a minimum desired absolute moisture and for generating an adjusting signal to the double-face liner adjusting means if the reading average of the double-face liner is above a maximum desired absolute moisture or below a minimum desired absolute moisture.

68. A method of improving corrugated board as defined in claims 64 or 67 wherein the steps of sensing the moisture contents of the single-face liner and the double-face liner include the respective substep of repetitively scanning the single-face liner and double-face liner.

69. A method of improving corrugated board as defined in claim 68 wherein the corrugator machine further comprising means responsive to at least zone adjusting signals, for adjusting the moisture content to at least one of the liners over a plurality of zones and wherein the method's steps of sensing the moisture content of the single-face liner and the double-face liner respectively include the substeps of obtaining a plurality of readings over a plurality of zones corresponding to the zones used to adjust the moisture content, and further wherein the processing step further includes the substeps of determining the moisture moisture difference between the double-face liner and single-face liner on a zone-by-zone basis and comparing each of these zone differences to at least one desired zone moisture difference, the zone moisture difference having any positive, negative or zero value, and if different from the desired zone moisture difference by a predetermined amount, generating a zone adjusting signal proportional to the difference between the actual and desired zone moisture difference.

70. A method of improving corrugated board as defined in claim 64 further comprising the steps of sensing the double-face liner speed and sensing the single-face liner speed and wherein the processing step generating of the adjusting signal is further proportional to the speed of the liner to which the moisture adjustment is to be made.

71. A method of improving corrugated board as defined in claim 64, further comprising the step of sensing external parameters and wherein the processing step further comprises the substep of deactivating the generation of adjusting signals if one or more sensed external parameters exceed predetermined values.

72. A method of improving corrugated board manufactured from a corrugator machine using a single-face liner, single-face web, and double-face liner, the corrugator machine including wrap arms associated with preheaters for the liners and webs, comprising the steps of:

(1) scanning the double-face liner and single-face liner;
(2) for each scan, measuring the moisture content of the double-face liner over a plurality of transverse zones by a plurality of readings;
(3) for each scan, measuring the moisture content of the single-face liner over a plurality of transverse zones by a plurality of readings;
(4) defining a desired average moisture offset between the double-face liner and single-face liner;
(5) defining a desired tolerance zone with respect to the desired average moisture offset;
(6) for each scan, calculating the average moisture difference between the average moisture content of the double-face liner with the average moisture content of the single-face liner and if the average moisture difference is outside of the tolerance zone about the desired average moisture offset, initiating control of the wrap arms for the single-face liner, single-face web or double-face liner or combination thereof so as to cause the average moisture control difference between the double-face liner and single-face web to enter the tolerance zone of the desired average moisture offset;
(7) for each scan and for each moisture content reading of each liner with respect to each zone, calculating a zonal count average moisture value;
(8) for each scan and for each zone of each liner, weighting the zonal count average;
(9) for each scan and for each zone of each liner, calculating a zonal time average moisture value by adding the weighted zonal count average of the present scan to a weighted average of the previously calculated zonal time average moisture value if such a previous zonal time average moisture value exists;
(10) for each scan and for each zone, calculating a zonal time average moisture difference value (Z DIFF) as the difference between corresponding double-face liner and single-face web zonal time average moisture values;
(11) for each scan and for each zone, calculating a zonal spray level value equal to the zonal difference value (Z DIFF) times a first multiplying factor if the Z DIFF value is positive, or times a second multiplying factor if the Z DIFF value is negative, and adding this result to the previously calculated zonal spray level value if such a value exists;
(12) if the spray value level is greater than a predetermined level causing zonal spray to occur for that zone of one liner proportional to the spray level value for that zone;

whereby both average moisture content deviations between the double-face liner and the single-face liner are kept within predetermined limits and zonal moisture variations between the double-face liner and single-face liner are kept within other predetermined limits so as to minimize corrugated board warpage.

73. A method of improving corrugated board as defined in claim 72, where-in a plurality of moisture sensor readings are made for each zone of both the single-face liner and double-face liner and if these values are correspondingly above predetermined levels, treating these values as valid readings and using them for calculating the zonal count average moisture values, and otherwise not using them for this purpose.

74. A method of improving the manufacture of corrugated board as defined in claim 73, wherein the zonal count average moisture measurement comprises a count average for each valid reading for that zone divided by the number of valid readings for that zone.

75. A method of improving the manufacture of corrugated board as defined in claim 74, wherein the zonal count average weighting factor is approximately 0.45 and the weighted value of the previously calculated zonal time average moisture value is approximately 0.55.

76. A method of improving the manufacture of corrugated board as defined in claim 72, further comprising the steps of sensing a speed proportional to the single-face liner and a speed proportional to the double-face liner and based upon these speeds determining in combination with the average moisture difference between the double-face liner and single-face liner the amount of wrap arm adjustment to be made in the single-face liner wrap arm, the single-face web wrap, or and the double-face liner wrap arm, or a combination of these wrap arms.

77. A method of improving the manufacture of corrugated board as defined in claim 72, wherein a plurality of moisture content readings include a smaller plurality of moisture sensor readings for each zone of the single-face web and double-face liner so as to obtain a plurality of readings for each zone of the single-face liner and double-face liner.

* * * * *